United States Patent
Kluever et al.

(10) Patent No.: US 10,564,306 B2
(45) Date of Patent: Feb. 18, 2020

(54) METHODS AND SYSTEMS TO EVALUATE NOISE CONTENT IN SEISMIC DATA

(71) Applicant: PGS Geophysical AS, Oslo (NO)

(72) Inventors: Tilman Kluever, Oslo (NO); Hocine Tabti, Oslo (NO); Neil Turnbull, Oslo (NO)

(73) Assignee: PGS Geophysical AS, Oslo (NO)

( * ) Notice: Subject to any disclaimer, the term of this patent is extended or adjusted under 35 U.S.C. 154(b) by 355 days.

(21) Appl. No.: 15/504,733

(22) PCT Filed: Aug. 28, 2015

(86) PCT No.: PCT/EP2015/069750
§ 371 (c)(1),
(2) Date: Feb. 17, 2017

(87) PCT Pub. No.: WO2016/030508
PCT Pub. Date: Mar. 3, 2016

(65) Prior Publication Data
US 2017/0269245 A1 Sep. 21, 2017

Related U.S. Application Data

(60) Provisional application No. 62/043,792, filed on Aug. 29, 2014.

(51) Int. Cl.
G01V 1/36 (2006.01)
G01V 1/32 (2006.01)
G01V 1/38 (2006.01)

(52) U.S. Cl.
CPC .................. G01V 1/36 (2013.01); G01V 1/32 (2013.01); G01V 1/38 (2013.01); *G01V 2210/32* (2013.01); *G01V 2210/34* (2013.01); *G01V 2210/56* (2013.01)

(58) Field of Classification Search
CPC .......... G01V 2210/32; G01V 2210/34; G01V 2210/56
See application file for complete search history.

(56) References Cited

U.S. PATENT DOCUMENTS

| | | | |
|---|---|---|---|
| 5,682,357 | A | 10/1997 | Rigsby |
| 6,208,587 | B1 | 3/2001 | Martin |
| 7,548,487 | B2 | 6/2009 | Barnes |
| 7,672,195 | B2 | 3/2010 | Barnes |
| 8,427,901 | B2 | 4/2013 | Lunde |

(Continued)

*Primary Examiner* — Elias Desta

(57) ABSTRACT

This disclosure is directed to methods and systems to evaluate noise contend of seismic data received during a marine survey. The seismic data includes pressure and particle motion data generated by collocated pressure and particle motion sensors of a seismic data acquisition system. The pressure and particle motion data are cross ghosted and temporal and spatial wavelet transforms are applied to the cross-ghosted pressure and particle motion data in order to compute pressure energies and particle motion energies in temporal and spatial scales of a temporal and spatial scale domain. The pressure and particle motion energies may be compared to evaluate noise content in the pressure and particle motion data, evaluate changes in the noise content during the marine survey, and adjust marine survey parameters to reduce the noise content.

28 Claims, 35 Drawing Sheets

(56) References Cited

U.S. PATENT DOCUMENTS

| | | |
|---|---|---|
| 8,649,980 B2 * | 2/2014 | Gulati .............. G01V 1/28 |
| | | 702/11 |
| 8,650,963 B2 | 2/2014 | Barr |
| 8,811,115 B2 | 8/2014 | Cambois |
| 2013/0173169 A1 | 7/2013 | Pan |
| 2014/0153362 A1 | 6/2014 | Tenghamn |
| 2014/0266215 A1 | 9/2014 | Bjornemo |
| 2014/0340987 A1 | 11/2014 | Kluver |
| 2016/0187513 A1 * | 6/2016 | Poole .............. G01V 1/362 |
| | | 702/16 |

* cited by examiner

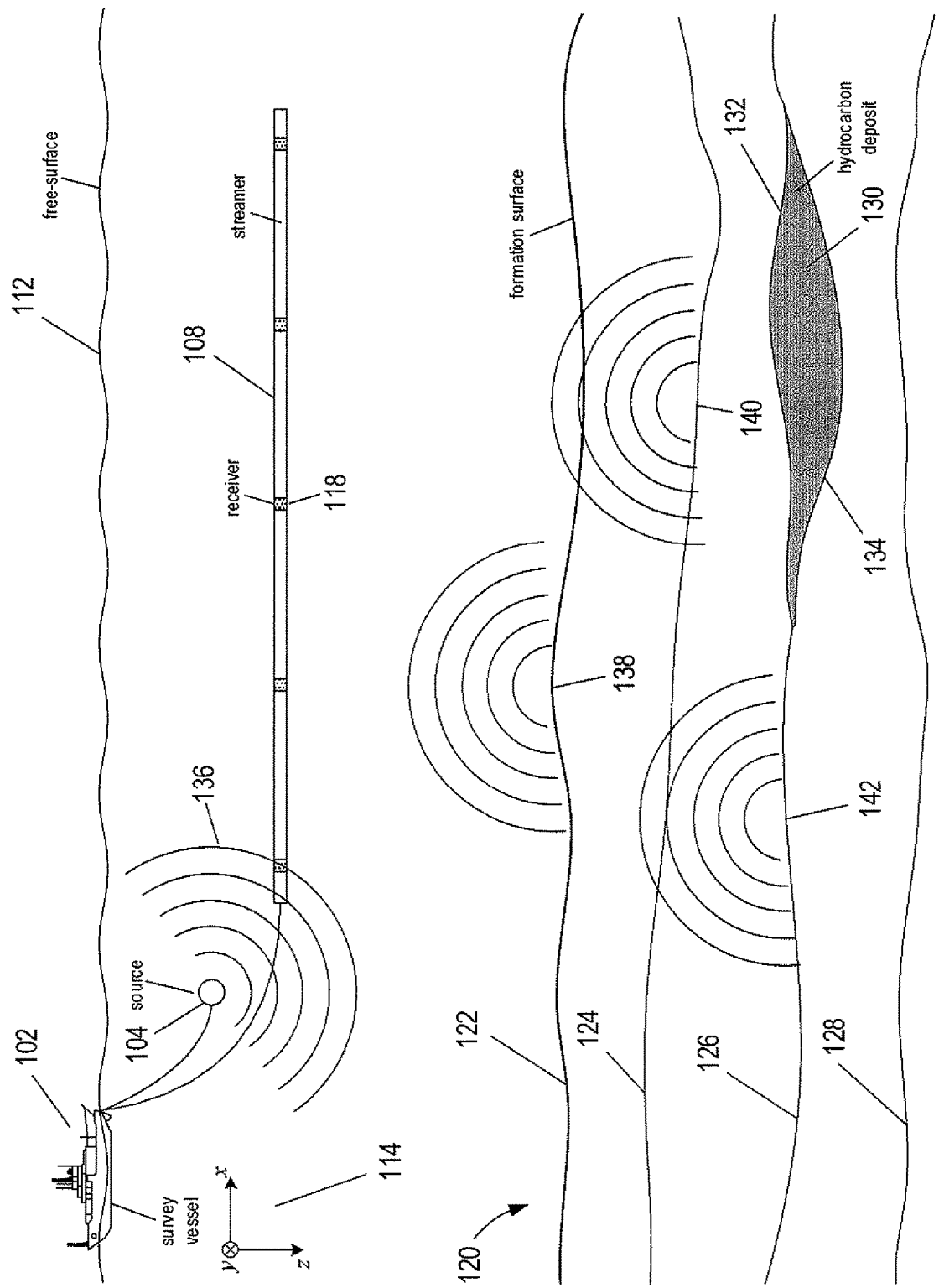

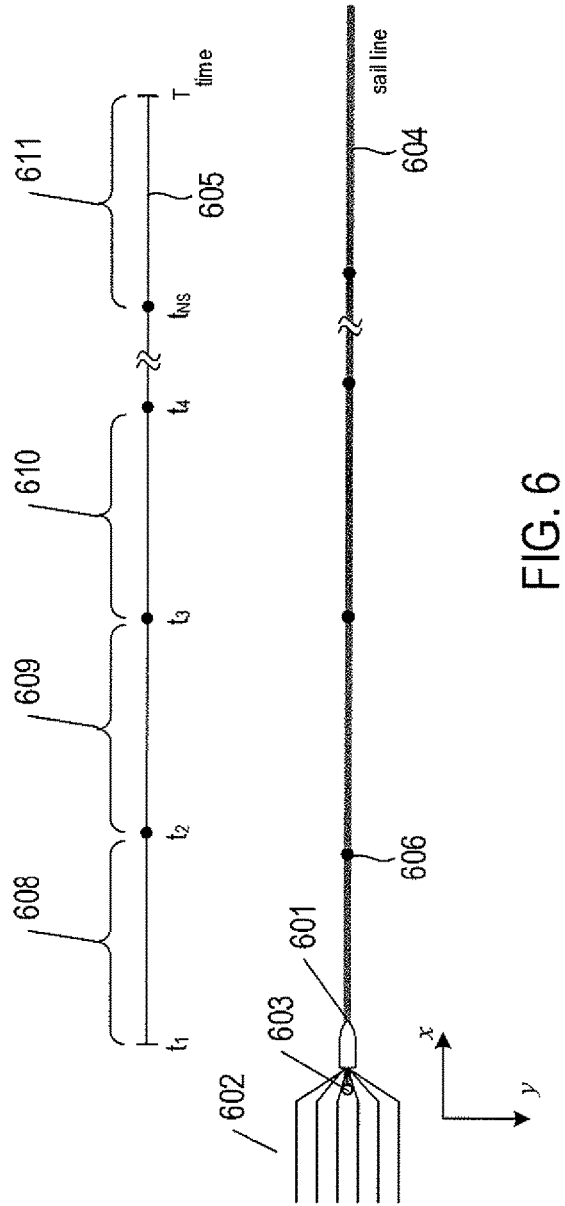
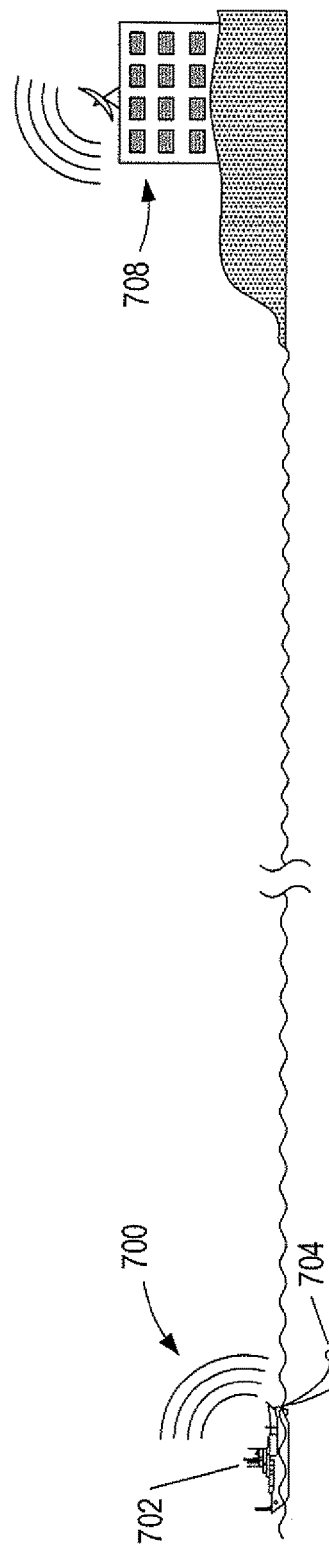
FIG. 6
FIG. 7

| | spatial scales | | | | |
|---|---|---|---|---|---|
| | $e_0^{4'}$ | $e_0^4$ | $e_0^3$ | $e_0^2$ | $e_0^1$ |
| $a_0^{5'}$ | $\{^pE_{4',r}^{5',n}\}$ | $\{^pE_{4,r}^{5',n}\}$ | $\{^pE_{3,r}^{5',n}\}$ | $\{^pE_{2,r}^{5',n}\}$ | $\{^pE_{1,r}^{5',n}\}$ |
| $a_0^5$ | $\{^pE_{4',r}^{5,n}\}$ | $\{^pE_{4,r}^{5,n}\}$ | $\{^pE_{3,r}^{5,n}\}$ | $\{^pE_{2,r}^{5,n}\}$ | $\{^pE_{1,r}^{5,n}\}$ |
| $a_0^4$ | $\{^pE_{4',r}^{4,n}\}$ | $\{^pE_{4,r}^{4,n}\}$ | $\{^pE_{3,r}^{4,n}\}$ | $\{^pE_{2,r}^{4,n}\}$ | $\{^pE_{1,r}^{4,n}\}$ |
| $a_0^3$ | $\{^pE_{4',r}^{3,n}\}$ | $\{^pE_{4,r}^{3,n}\}$ | $\{^pE_{3,r}^{3,n}\}$ | $\{^pE_{2,r}^{3,n}\}$ | $\{^pE_{1,r}^{3,n}\}$ |
| $a_0^2$ | $\{^pE_{4',r}^{2,n}\}$ | $\{^pE_{4,r}^{2,n}\}$ | $\{^pE_{3,r}^{2,n}\}$ | $\{^pE_{2,r}^{2,n}\}$ | $\{^pE_{1,r}^{2,n}\}$ |
| $a_0^1$ | $\{^pE_{4',r}^{1,n}\}$ | $\{^pE_{4,r}^{1,n}\}$ | $\{^pE_{3,r}^{1,n}\}$ | $\{^pE_{2,r}^{1,n}\}$ | $\{^pE_{1,r}^{1,n}\}$ |

FIG. 25

2200 spatial scales

|  | $e_0^{4'}$ | $e_0^4$ | $e_0^3$ | $e_0^2$ | $e_0^1$ |
|---|---|---|---|---|---|
| $a_0^{5'}$ | $\{^vE_{4',r}^{5',n}\}$ | $\{^vE_{4,r}^{5',n}\}$ | $\{^vE_{3,r}^{5',n}\}$ | $\{^vE_{2,r}^{5',n}\}$ | $\{^vE_{1,r}^{5',n}\}$ |
| $a_0^5$ | $\{^vE_{4',r}^{5,n}\}$ | $\{^vE_{4,r}^{5,n}\}$ | $\{^vE_{3,r}^{5,n}\}$ | $\{^vE_{2,r}^{5,n}\}$ | $\{^vE_{1,r}^{5,n}\}$ |
| $a_0^4$ | $\{^vE_{4',r}^{4,n}\}$ | $\{^vE_{4,r}^{4,n}\}$ | $\{^vE_{3,r}^{4,n}\}$ | $\{^vE_{2,r}^{4,n}\}$ | $\{^vE_{1,r}^{4,n}\}$ |
| $a_0^3$ | $\{^vE_{4',r}^{3,n}\}$ | $\{^vE_{4,r}^{3,n}\}$ | $\{^vE_{3,r}^{3,n}\}$ | $\{^vE_{2,r}^{3,n}\}$ | $\{^vE_{1,r}^{3,n}\}$ |
| $a_0^2$ | $\{^vE_{4',r}^{2,n}\}$ | $\{^vE_{4,r}^{2,n}\}$ | $\{^vE_{3,r}^{2,n}\}$ | 2202 $\{^vE_{2,r}^{2,n}\}$ / 2601 | $\{^vE_{1,r}^{2,n}\}$ |
| $a_0^1$ | $\{^vE_{4',r}^{1,n}\}$ | $\{^vE_{4,r}^{1,n}\}$ | $\{^vE_{3,r}^{1,n}\}$ | $\{^vE_{2,r}^{1,n}\}$ | $\{^vE_{1,r}^{1,n}\}$ | temporal scales

FIG. 26 spatial scales

| | $e_0^{4'}$ | $e_0^4$ | $e_0^3$ | $e_0^2$ | $e_0^1$ |
|---|---|---|---|---|---|
| $a_0^{5'}$ | $p_{n_{4'}^{5'}}$ | $p_{n_4^{5'}}$ | $p_{n_3^{5'}}$ | $p_{n_2^{5'}}$ | $p_{n_1^{5'}}$ |
| $a_0^5$ | $p_{n_{4'}^5}$ | $p_{n_4^5}$ | $p_{n_3^5}$ | $p_{n_2^5}$ | $p_{n_1^5}$ |
| $a_0^4$ | $p_{n_{4'}^4}$ | $p_{n_4^4}$ | $p_{n_3^4}$ | $p_{n_2^4}$ | $p_{n_1^4}$ |
| $a_0^3$ | $p_{n_{4'}^3}$ | $p_{n_4^3}$ | $p_{n_3^3}$ | $p_{n_2^3}$ | $p_{n_1^3}$ |
| $a_0^2$ | $p_{n_{4'}^2}$ | $p_{n_4^2}$ | $p_{n_3^2}$ | $p_{n_2^2}$ | $p_{n_1^2}$ |
| $a_0^1$ | $p_{n_{4'}^1}$ | $p_{n_4^1}$ | $p_{n_3^1}$ | $p_{n_2^1}$ | $p_{n_1^1}$ | temporal scales

FIG. 28A

|  | spatial scales | | | | |
|---|---|---|---|---|---|
|  | $e_0^{4'}$ | $e_0^4$ | $e_0^3$ | $e_0^2$ | $e_0^1$ |
| $a_0^{5'}$ | $^v n_{4'}^{5'}$ | $^v n_4^{5'}$ | $^v n_3^{5'}$ | $^v n_2^{5'}$ | $^v n_1^{5'}$ |
| $a_0^5$ | $^v n_{4'}^5$ | $^v n_4^5$ | $^v n_3^5$ | $^v n_2^5$ | $^v n_1^5$ |
| $a_0^4$ | $^v n_{4'}^4$ | $^v n_4^4$ | $^v n_3^4$ | $^v n_2^4$ | $^v n_1^4$ |
| $a_0^3$ | $^v n_{4'}^3$ | $^v n_4^3$ | $^v n_3^3$ | $^v n_2^3$ | $^v n_1^3$ |
| $a_0^2$ | $^v n_{4'}^2$ | $^v n_4^2$ | $^v n_3^2$ | $^v n_2^2$ | $^v n_1^2$ |
| $a_0^1$ | $^v n_{4'}^1$ | $^v n_4^1$ | $^v n_3^1$ | $^v n_2^1$ | $^v n_1^1$ |

(temporal scales on vertical axis)

FIG. 28B spatial scales

|  | $e_0^{4'}$ | $e_0^4$ | $e_0^3$ | $e_0^2$ | $e_0^1$ |
|---|---|---|---|---|---|
| $a_0^{5'}$ | $^b n_{4'}^{5'}$ | $^b n_4^{5'}$ | $^b n_3^{5'}$ | $^b n_2^{5'}$ | $^b n_1^{5'}$ |
| $a_0^5$ | $^b n_{4'}^5$ | $^b n_4^5$ | $^b n_3^5$ | $^b n_2^5$ | $^b n_1^5$ |
| $a_0^4$ | $^b n_{4'}^4$ | $^b n_4^4$ | $^b n_3^4$ | $^b n_2^4$ | $^b n_1^4$ |
| $a_0^3$ | $^b n_{4'}^3$ | $^b n_4^3$ | $^b n_3^3$ | $^b n_2^3$ | $^b n_1^3$ |
| $a_0^2$ | $^b n_{4'}^2$ | $^b n_4^2$ | $^b n_3^2$ | $^b n_2^2$ | $^b n_1^2$ |
| $a_0^1$ | $^b n_{4'}^1$ | $^b n_4^1$ | $^b n_3^1$ | $^b n_2^1$ | $^b n_1^1$ | temporal scales

FIG. 28C

METHODS AND SYSTEMS TO EVALUATE NOISE CONTENT IN SEISMIC DATA

BACKGROUND

In recent years, the petroleum industry has invested heavily in the development of improved marine survey techniques and seismic data processing methods in order to increase the resolution and accuracy of seismic images of subterranean formations. Marine surveys illuminate a subterranean formation located beneath a body of water with acoustic energy produced by one or more submerged seismic sources. The acoustic energy travels down through the water and into the subterranean formation. At interfaces between different types of rock or sediment of the subterranean formation, a portion of the acoustic energy may be refracted, a portion may be transmitted, and a portion may be reflected back toward the subterranean formation surface and into the body of water. A typical marine survey is carried out with a survey vessel that passes over the illuminated subterranean formation while towing elongated cable-like structures called streamers. Some marine surveys utilize receivers attached to ocean bottom nodes or cables, either in conjunction with, or in lieu of, receivers on towed streamers. The streamers may be equipped with a number of collocated, dual pressure and particle motion sensors that detect pressure and particle motion wavefields, respectively, associated with the acoustic energy reflected back into the water from the subterranean formation. The pressure sensors generate seismic data that represents the pressure wavefield, and the particle motion sensors generate seismic data that represents the particle motion (e.g., particle displacement, particle velocity, or particle acceleration) wavefield. The survey vessel receives and records the seismic data generated by the sensors.

One aspect of marine survey seismic data collection is near real-time onboard quality control ("QC"). Onboard QC is often carried out on the survey vessel and may be used to evaluate noise content in seismic data collected during a marine survey. However, the capacity of typical onboard computational resources may be an order of magnitude less than the computational capacity of resources used to process the same set of seismic data onshore, and start-of-survey delays due to QC parameter testing are typically not permitted. As a result, noise-evaluation results produced in near real-time by onboard QC may be less accurate than results produced by onshore seismic data processing. The noise-evaluation results produced onboard may be used to adjust marine survey parameters, such as changing survey vessel speed, discarding seismic data, or scraping the streamers. Decisions to adjust survey parameters are typically taken on a short, fixed timescale according to the survey plan. Any decisions to adjust survey parameters or otherwise delay the survey based on unreliable noise-evaluation results may reduce survey efficiency, could further reduce the quality of the seismic data collected afterward, and potentially compromise crew safety. Those working in the petroleum industry continue to seek near real-time onboard QC methods and systems to efficiently and accurately evaluate the noise content in seismic data collected while conducting a marine survey.

DESCRIPTION OF THE DRAWINGS

FIGS. 1A-1B show side-elevation and top views of an example seismic data acquisition system.

FIG. 6 shows an example survey vessel towing streamers and a source along a sail line.

FIG. 7 shows a side-elevation view of an example seismic data acquisition system that transmits seismic data to an onshore seismic data processing facility.

FIG. 25 shows pressure energies associated with temporal and spatial scales.

FIG. 26 shows vertical velocity energies associated with temporal and spatial scales.

FIGS. 28A-28C show separate example pressure, vertical velocity, and balance energy scores, respectively, for representative temporal and spatial scales.

DETAILED DESCRIPTION

This disclosure is directed to methods and systems to evaluate noise content in seismic data collected during a marine survey. The seismic data includes pressure and particle motion data generated by collocated pressure and particle motion sensors located in streamers of a seismic data acquisition system. The particle motion data may be particle displacement data, particle velocity data, or particle acceleration data. The pressure and particle motion data are cross-ghosted to generate cross-ghosted pressure data and cross-ghosted particle motion data. Wavelet transforms are applied to the cross-ghosted pressure data to generate pressure approximation coefficients and wavelet coefficients in temporal and spatial scales of a temporal and spatial scale domain. The wavelet transforms are also applied to the cross-ghosted particle motion data to generate particle motion approximation and wavelet coefficients in the temporal and spatial scales of the temporal and spatial scale domain. Pressure energies are computed from the pressure approximation and wavelet coefficients in the temporal and spatial scales, and particle motion energies are computed from the particle motion approximation and wavelet coefficients in the same temporal and spatial scales. Pressure energy scores may be computed from the pressure energies in the temporal and spatial scales, and particle motion energy scores may be computed from the particle motion energies in the same temporal and spatial scales. The pressure and particle motion energy scores may be compared and compared with pressured and particle motion energies scores of previous shot records to evaluate noise content and changes in noise content of the pressure and particle motion data.

The pressure and particle motion energy scores may be calculated from the pressure and particle motion data in near real-time onboard a survey vessel or calculated onshore and sent back to the survey vessel in near real-time, enabling onboard personnel to reduce noise levels by adjusting marine survey parameters. For example, decisions to adjust streamer depth, change survey vessel speed, or scrape streamer cables may be determined based on comparisons between pressure and particle motion energy scores.

Figure 1B:
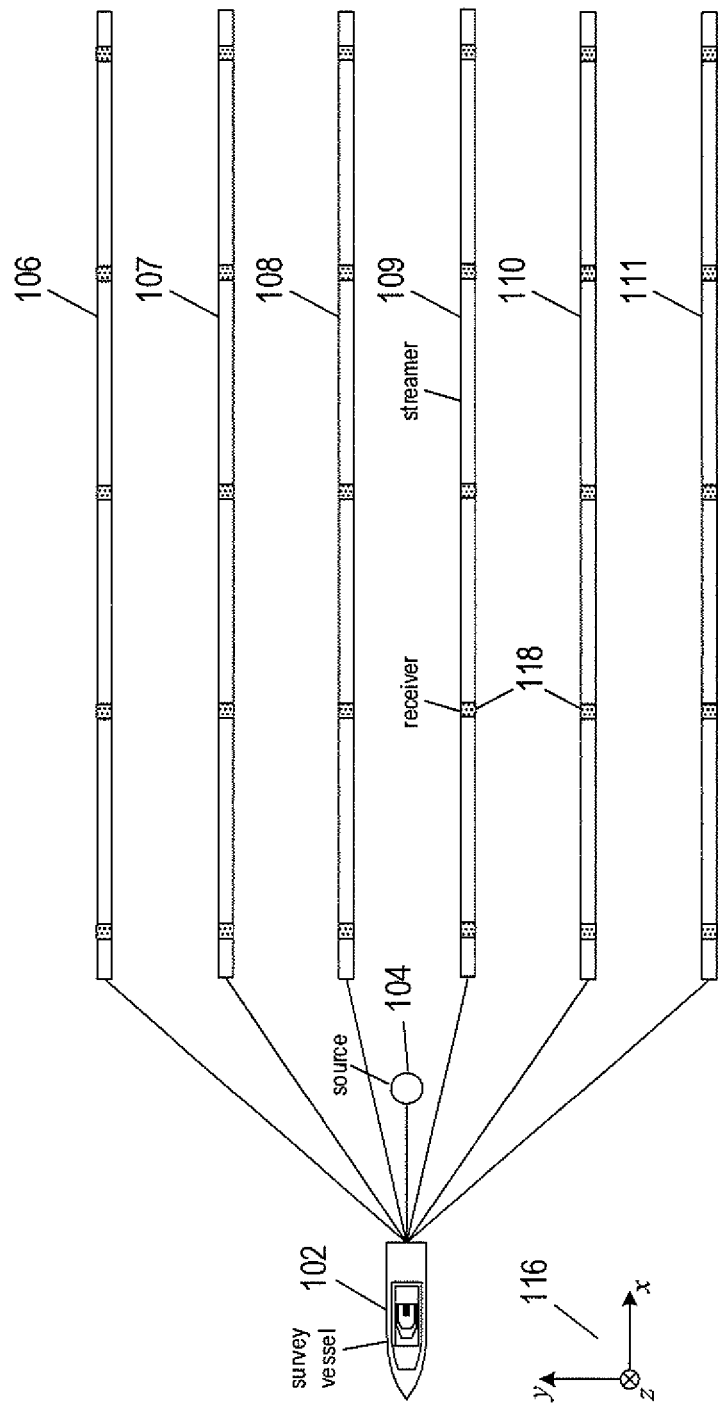

FIGS. 1A-1B show side-elevation and top views, respectively, of an example seismic data acquisition system composed of a survey vessel 102 towing a source 104 and six separate streamers 106-111 beneath a free surface 112 of a body of water. The body of water can be, for example, an ocean, a sea, a lake, or a river, or any portion thereof. In this example, each streamer is attached at one end to the survey vessel 102 via a streamer-data-transmission cable. The illustrated streamers 106-111 form a planar horizontal data acquisition surface with respect to the free surface 112. However, in practice, the data acquisition surface may be smoothly varying due to active sea currents and weather conditions. In other words, although the streamers 106-111 are illustrated in FIGS. 1A and 1B and subsequent figures as straight and substantially parallel to the free surface 112, in practice, the towed streamers may undulate as a result of dynamic conditions of the body of water in which the streamers are submerged. A data acquisition surface is not limited to having a planar horizontal orientation with respect to the free surface 112. The streamers may be towed at depths that angle the data acquisition surface with respect to the free surface 112 or one or more of the streamers may be towed at different depths. A data acquisition surface is not limited to six streamers as shown in FIG. 1B. In practice, the number of streamers used to form a data acquisition surface can range from as few as one streamer to as many as 20 or more streamers. It should also be noted that the number of sources is not limited to a single source. In practice, the number of sources selected to generate acoustic energy may range from as few as one source to three or more sources, and the sources may be towed in groups by one or more survey vessels.

FIG. 1A includes an xz-plane 114, and FIG. 1B includes an xy-plane 116 of the same Cartesian coordinate system, having three orthogonal, spatial coordinate axes labeled x, y and z. The coordinate system is used to specify orientations and coordinate locations within the body of water. The x-direction specifies the location of a point in a direction parallel to the length of the streamers (or a specified portion thereof when the length of the streamers are curved) and is referred to as the "in-line" direction. The y-direction specifies the location of a point in a direction perpendicular to the x-axis and substantially parallel to the free surface 112 and is referred to as the "cross-line" direction. The z-direction specifies the location of a point perpendicular to the xy-plane (i.e., perpendicular to the free surface 112) with the positive z-direction pointing downward away from the free surface 112. The streamers 106-111 are long cable-like structures containing power and data-transmission lines that connect receivers represented by shaded rectangles, such as receiver 118, spaced-apart along the length of each streamer to seismic data acquisition system and equipment, such as data-storage devices, located on board the survey vessel 102.

Streamer depth below the free surface 112 can be estimated at various locations along the streamers using depth-measuring devices (e.g., attached to the streamers). For example, the depth-measuring devices can measure hydrostatic pressure or utilize acoustic distance measurements. The depth-measuring devices can be integrated with depth controllers, such as paravanes or water kites that control and maintain the depth and location of the streamers as the streamers are towed through the body of water. The depth-measuring devices are typically placed at intervals (e.g., about 300 meter intervals in some implementations) along each streamer. Note that in other implementations buoys may be attached to the streamers and used to maintain the orientation and depth of the streamers below the free surface 112.

FIG. 1A shows a cross-sectional view of the survey vessel 102 towing the source 104 above a subterranean formation 120. Curve 122, the formation surface, represents a top surface of the subterranean formation 120 located at the bottom of the body of water. The subterranean formation 120 may be composed of a number of subterranean layers of sediment and rock. Curves 124, 126, and 128 represent interfaces between subterranean layers of different compositions. A shaded region 130, bounded at the top by a curve 132 and at the bottom by a curve 134, represents a hydrocarbon deposit, the depth and location coordinates of which may be determined, at least in part, by analysis of seismic data collected during a marine survey. As the survey vessel 102 moves over the subterranean formation 120, the source 104 may be activated to produce acoustic energy at spatial and/or temporal intervals. The nature and location of hydrocarbon deposit 130 can be better understood by determining the response of subterranean formation 120 to the acoustic energy produced by source 104. Activation of the source 104 is often called a "shot." In other implementations, the source 104 may be towed by one survey vessel and the streamers 106-111 may be towed by a different survey vessel. The source 104 may be any source of acoustic energy, such as an air gun, marine vibrator, or an array of air guns and/or marine vibrators. FIG. 1A illustrates a source wavefield expanding outward from the source 104 as a pressure wavefield 136 represented by semicircles of increasing radius centered at the source 104. The outwardly expanding wavefronts from the source 104 may be spherical but are shown in vertical plane cross section in FIG. 1A. The outward and downward expanding portion of the pressure wavefield 136 and any portion of the pressure wavefield 136 reflected from the free surface 112 are called the "source wavefield." The source wavefield eventually reaches the formation surface 122 of the subterranean formation 120, at which point the source wavefield may be partially reflected from the formation surface 122 and partially refracted downward into the subterranean formation 120, becoming elastic waves within the subterranean formation 120. In other words, in the body of water, the source wavefield is composed primarily of compressional pressure waves, or P-waves, while in the subterranean formation 120, the waves include both P-waves and transverse waves, or S-waves. Within the subterranean formation 120, at each interface between different types of materials or at discontinuities in density or in one or more of various other physical characteristics or parameters, downward propagating waves may be partially reflected and partially refracted. As a result, each point of the formation surface 122 and each point of the interfaces 124, 126, and 128 may be a reflector that becomes a potential secondary point source from which acoustic energy may emanate upward toward the receivers 118 and downward. As shown in FIG. 1A, waves of significant amplitude may be generally reflected from points on or close to the formation surface 122, such as point 138, and from points on or very close to interfaces in the subterranean formation 120, such as points 140 and 142. The upward expanding waves reflected from the subterranean formation 120 are collectively the "reflected wavefield."

The waves that compose the reflected wavefield may be generally reflected at different times within a range of times following the initial shot. A point on the formation surface 122, such as the point 138, may receive a pressure disturbance from the source wavefield more quickly than a point within the subterranean formation 120, such as points 140 and 142. Similarly, a point on the formation surface 122 directly beneath the source 104 may receive the pressure disturbance sooner than a more distant-lying point on the formation surface 122. Thus, the times at which waves are reflected from various points within the subterranean formation 120 may be related to the distance, in three-dimensional space, of the points from the activated source 104.

Acoustic and elastic waves, however, may travel at different velocities within different materials as well as within the same material under different pressures. Therefore, the travel times of the source wavefield and reflected wavefield may be functions of distance from the source 104 as well as the composition and physical characteristics of the materials through which the wavefields travel. In addition, expanding wavefronts of the wavefields may be altered as the wavefronts cross interfaces and as the velocity of sound varies in the media traversed by the wavefield. The superposition of waves reflected from within the subterranean formation 120 in response to the source wavefield may be a generally complicated wavefield that includes information about the shapes, sizes, and material characteristics of the subterranean formation 120, including information about the shapes, sizes, and locations of the various reflecting features within the subterranean formation 120 of interest to exploration seismologists (e.g., hydrocarbon deposit 130).

Figure 2:
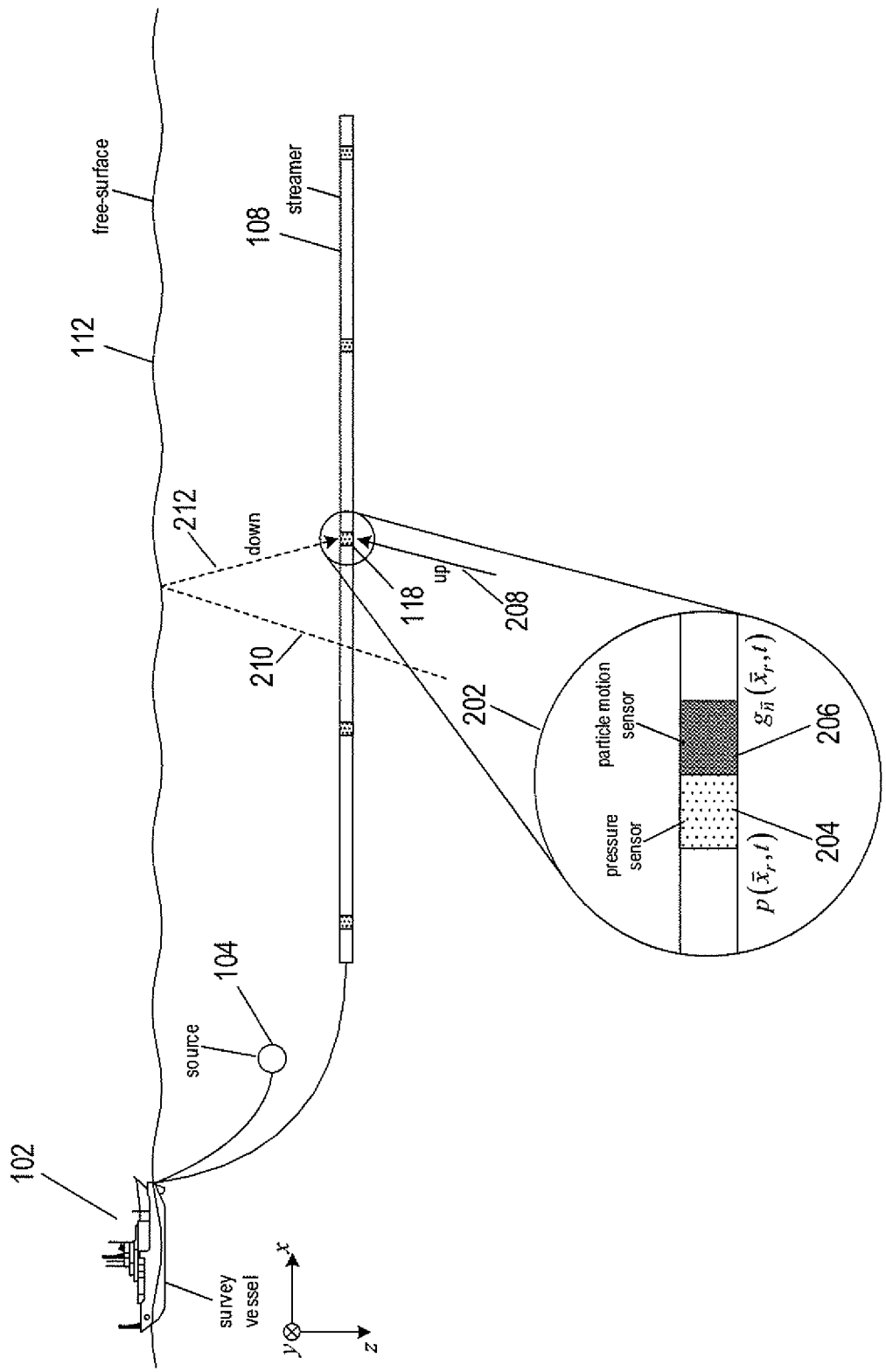
FIG. 2 shows a side-elevation view of a seismic data acquisition system with a magnified view of a receiver.

Each receiver 118 may be a pressure sensor, a particle motion sensor, a multi-component sensor (including particle motion sensors and/or a pressure sensor), or any combination thereof. A pressure sensor detects variations in water pressure over time. The term "particle motion sensor" is a general term used to refer to a sensor that may be configured to detect particle motion (e.g., particle displacement, particle velocity, or particle acceleration) over time. FIG. 2 shows a side-elevation view of the seismic data acquisition system with a magnified view 202 of the receiver 118. In this example, the magnified view 202 reveals that the receiver 118 is a multi-component sensor composed of collocated pressure sensor 204 and particle motion sensor 206. The pressure sensor may be, for example, a hydrophone. Each pressure sensor may measure changes in hydrostatic pressure over time to produce pressure data denoted by $p(\vec{x}_r,t)$, where $\vec{x}_r$ represents the Cartesian coordinates $(x_r,y_r,z_r)$ of a receiver, where superscript r is a receiver index, and t represents time. The particle motion sensors may be responsive to water particle motion. In general, particle motion sensors detect particle motion (i.e., displacement, velocity, or acceleration) and may be responsive to such directional displacement of the particles, velocity of the particles, or acceleration of the particles. A particle motion sensor that measures particle displacement generates particle displacement data denoted by $g_{\vec{n}}(\vec{x}_r,t)$, where the vector ii represents the direction along which particle displacement is measured. A particle motion sensor that measures particle velocity (i.e., particle velocity sensor) generates particle velocity data denoted by $v_{\vec{n}}(\vec{x}_r,t)$. A particle motion sensor that measures particle acceleration (i.e., accelerometer) generates particle acceleration data denoted by $a_{\vec{n}}(\vec{x}_r,t)$. The data generated by one type of particle motion sensor may be converted to another type. For example, particle displacement data may be differentiated to obtain particle velocity data, and particle acceleration data may be integrated to obtain particle velocity data. The term "particle motion data"

is a general term used to refer to particle displacement data, particle velocity data, or particle acceleration data, and the term "seismic data" is used to refer to pressure data and/or particle motion data.

The particle motion sensors are typically oriented so that the particle motion is measured in the vertical direction (i.e., $\vec{n}=(0,0,z)$) in which case $a_z(\vec{x}_r,t)$ is called vertical displacement data, $v_z(\vec{x}_r,t)$ is called vertical velocity data, and $a_z(\vec{x}_r,t)$ is called vertical acceleration data. Alternatively, each receiver may include two additional particle motion sensors that measure particle motion in two other directions, $\vec{n}_1$ and $\vec{n}_2$ that are orthogonal to $\vec{n}$ (i.e., $\vec{n}\cdot\vec{n}_1=\vec{n}\cdot\vec{n}_2=0$, where "." is the scalar product) and orthogonal to one another (i.e., $\vec{n}_1\cdot\vec{n}_2=0$). In other words, each receiver may include three particle motion sensors that measure particle motion in three orthogonal directions. For example, in addition to having a particle motion sensor that measures particle velocity in the z-direction to give $v_z(\vec{x}_r,t)$, each receiver may include a particle motion sensor that measures the wavefield in the in-line direction in order to obtain the inline velocity data, $v_x(\vec{x}_r,t)$, and a particle motion sensor that measures the wavefield in the cross-line direction in order to obtain the cross-line velocity data, $v_y(\vec{x}_r,t)$. In certain implementations, the receivers may by composed of only pressure sensors, and in other implementations, the receivers may be composed of only particle motion sensors.

The streamers 106-111 and the survey vessel 102 may include sensing electronics and seismic data processing facilities that allow seismic data generated by each receiver to be correlated with the time the source 104 is activated, absolute locations on the free surface 112, and absolute three-dimensional locations with respect to an arbitrary three-dimensional coordinate system. The pressure data and particle motion data may be stored at the receiver, and/or may be sent along the streamers and data transmission cables to the survey vessel 102, where the data may be stored (e.g., electronically or magnetically) on data-storage devices located onboard the survey vessel 102. The pressure data represents a pressure wavefield, and particle displacement data represents a particle displacement wavefield, particle velocity data represents a particle velocity wavefield, and particle acceleration data represents particle acceleration wavefield. The particle displacement, velocity, and acceleration wavefields are referred to as particle motion wavefields.

Returning to FIG. 2, the free surface 112 of a body of water serves as a nearly perfect acoustic reflector, creating "ghost" effects that contaminate seismic data generated by the receivers 118. Each receiver 118 measures not only the portion of reflected wavefield that travels directly from the subterranean formation 120 to the streamer, called the up-going wavefield, but also measures a time-delayed reflection of the reflected wavefield from the free surface 112, called a "receiver ghost." Directional arrow 208 represents the direction of an up-going wavefield at receiver 118, and dashed-line arrows 210 and 212 represent a down-going wavefield produced by reflection from the free surface 112 before reaching the receiver 118. In other words, the pressure wavefield measured by the receivers 118 includes an up-going pressure wavefield component and a down-going pressure wavefield component, and the particle motion wavefield includes an up-going particle motion wavefield component and a down-going particle motion wavefield component. The down-going wavefield interferes with the pressure and particle motion data generated by the receivers and creates notches in the seismic data spectral domain.

Each pressure sensor and particle motion sensor may include an analog-to-digital converter that converts time-dependent analog data into discrete time series that consist of a number of consecutively measured values called "amplitudes" separated in time by a sample rate. The time series generated by a pressure or particle motion sensor is called a "trace," which may consist of thousands of samples collected at a typical sample rate of about 1 to 5 ms. A trace records variations in a time-dependent amplitude that corresponds to fluctuations in acoustic energy of the wavefield measured by the sensor. In general, each trace is an ordered set of discrete spatial and time-dependent pressure or motion sensor amplitudes denoted by:

$$tr(\vec{x}_r,t)=\{A(\vec{x}_r,t_n)\}_{n=0}^{N-1} \tag{I}$$

where
A represents pressure or particle motion amplitude;
$t_n$ is a sample time; and
N is the number of time samples in the trace.

The coordinate location $\vec{x}_r$ of each receiver may be calculated from global position information obtained from one or more global positioning devices located along the streamers, survey vessel, and buoys, and the known geometry and arrangement of the streamers and receivers. Each trace may also include a trace header not represented in Equation (1) that identifies the specific receiver that generated the trace, receiver GPS spatial coordinates, and may include time sample rate and the number of samples.

As explained above, the reflected wavefield typically arrives first at the receivers located closest to the sources. The distance from the sources to a receiver is called the "source-receiver offset," or simply "offset." A larger offset generally results in a longer arrival time delay. The traces are collected to form a "gather" that can be further processed using various seismic data processing techniques in order to obtain information about the structure of the subterranean formation. A gather may be composed of traces generated by one or more pressure sensors or traces generated by one or more particle motion sensors.

Figure 3:
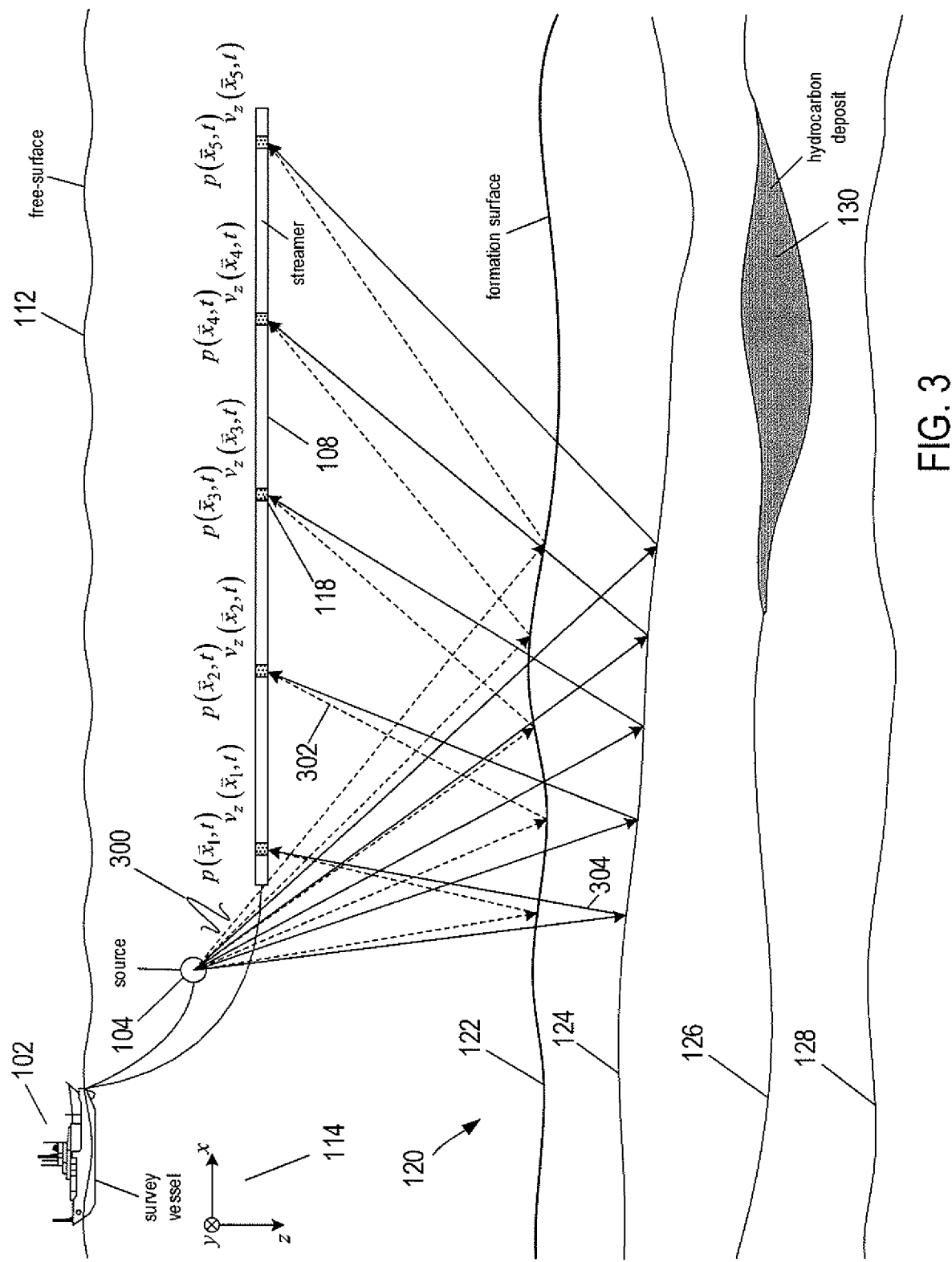
FIG. 3 shows an example of acoustic energy ray paths emanating from a source.

FIG. 3 shows example ray paths of an acoustic wavefield 300 that travels from the source 104 to or into the subterranean formation 120. Dashed-line rays, such as rays 302, represent acoustic energy reflected from the formation surface 122 to the receivers 118 located along the streamer 108, and solid-line rays, such as rays 304, represent acoustic energy reflected from the interface 124 to the receivers 118 located along the streamer 108. Note that for simplicity of illustration, a small number of ray paths are represented. Each pressure sensor may measure the pressure variation, and each particle motion sensor may measure the particle motion of the acoustic energy reflected from the formation surface 122 or interfaces 124, 126, and 128. In the example of FIG. 3, the particle motion sensors located at each receiver 118 measures vertical particle velocity of the wavefield emanating from the subterranean formation 120 in response to the acoustic wavefield 300. The pressure data and/or particle motion data generated at each receiver 118 may be time sampled and recorded as separate traces. In the example of FIG. 3, the collection of traces generated by the receivers 118 along the streamer 108 for a single activation of the source 104 may be collected to form a "common-shot gather." The traces generated by the receivers located along each of the other five streamers for the same activation may be collected to form separate common-shot gathers, each gather associated with one of the streamers.

Figure 4:
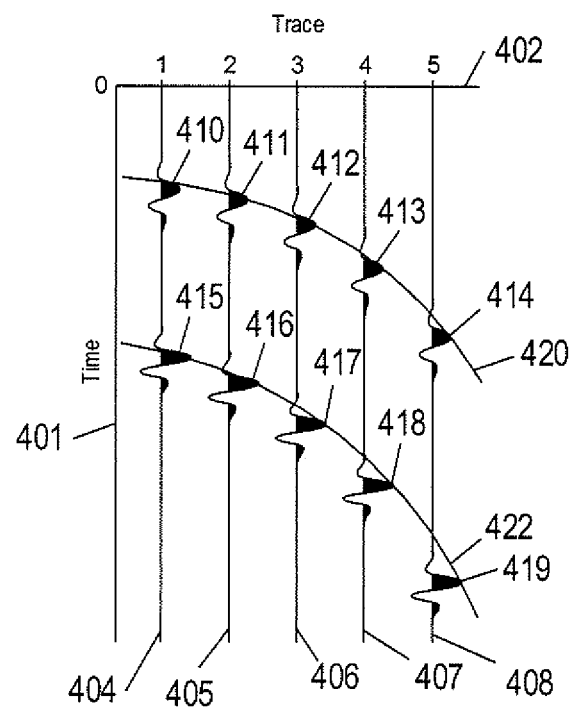
FIG. 4 shows a plot of a synthetic common-shot gather composed of example traces.

FIG. 4 shows a plot of a common-shot gather composed of example traces of the wavefield measured by the five receives located along the streamer 108 shown in FIG. 3. Vertical axis 401 represents time and horizontal axis 402 represents trace numbers, with trace "1" representing the seismic data generated by the receiver 118 located closest to the source 104, and trace "5" representing the seismic data generated by the receiver 118 located farthest away from the source 104. The traces 404-408 may represent variation in the amplitude of either the pressure data or the particle motion data measured by corresponding sensors of the five receivers 118. The example traces include wavelets or pulses 410-419 that represent the up-going wavefield measured by the pressure sensors or particle motion sensors. Peaks, colored black, and troughs of each trace represent changes in the amplitude. The distances along the traces 404-408 from time zero to the wavelets 410-414 represent two-way travel time of the acoustic energy output from the source 104 to the formation surface 122 and to the receivers 118 located along the streamer 108. The distances along the traces 404-408 from time zero to the wavelets 415-419 represents longer two-way travel time of the acoustic energy output from the source 104 to the interface 124 and to the same receivers 118 located along the streamer 108. The amplitude of the peak or trough of the wavelets 410-419 indicate the magnitude of the reflected acoustic energy recorded by the receivers 118.

The arrival times versus source-receiver offset is longer with increasing source-receiver offset. As a result, the wavelets generated by a formation surface, or a subterranean interface, are collectively called a "reflected wave" that tracks a curve. For example, curve 420 represents the distribution of the wavelets 410-414 reflected from the formation surface 122, which are called a "formation-surface reflected wave," and curve 422 represents the distribution of the wavelets 415-419 from the interface 124, which are called an "interface reflected wave."

Figure 5:
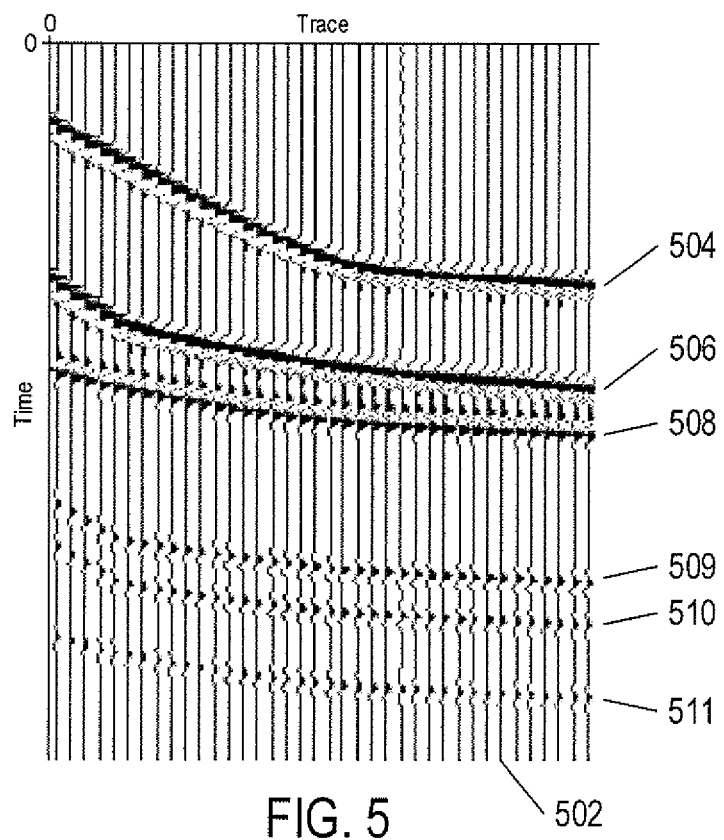
FIG. 5 shows an example expanded view of a synthetic gather composed of 38 traces.

FIG. 5 shows an expanded view of a gather composed of 38 traces. Each trace, such as trace 502, varies in amplitude over time and represents acoustic energy reflected from a subterranean formation surface and five different interfaces within the subterranean formation as measured by a pressure sensor or a particle motion sensor. In the expanded view, wavelets that correspond to reflections from the formation surface or an interface within the subterranean formation appear chained together to form reflected waves. For example, wavelets 504 with the shortest transit time represent a formation-surface reflected wave, and wavelets 506 represent an interface reflected wave emanating from an interface just below the formation surface. Reflected waves 508-511 represent reflections from interfaces located deeper within the subterranean formation.

The gather shown in FIG. 4 is sorted in a common-shot domain, and the gather shown in FIG. 5 is sorted into a common-receiver domain. A domain is a collection of gathers that share a common geometrical attribute with respect to the seismic data recording locations. The seismic data may be sorted into any suitable domain including a common-receiver domain, a common-receiver-station domain, or a common-midpoint domain.

Seismic data may be recorded in separate shot records while a survey vessel travels a sail line. A shot record may be created when the source is activated in a short time interval (e.g., about 1-3 seconds) followed by recording reflected wavefields in a longer recording time interval (e.g., about 8-12 seconds). The source elements may be simultaneously activated or activated at different times in the short time interval. FIG. 6 shows an example of a survey vessel 601 towing six streamers 602 and a source 603 along a sail line 604. FIG. 6 includes a time line 605 with NS source activation times denoted by $t_1$, $t_2$, $t_3$, $t_4$, and $t_{NS}$. Dots, such as dot 606, represent locations along sail line 604 where the source 603 is activated. As the survey vessel 601 travels the sail line 604 at a substantially constant rate of speed, the source 603 is activated at the source activation times, which correspond to source activation locations (e.g., dot 606) along the sail line 604. In the example of FIG. 6, seismic data is recorded in shot records. Each shot record is composed of the seismic data recorded in separate time intervals 608-611. In the example of FIG. 6, each time interval begins when the source 603 is activated and ends before a subsequent activation of the source 603.

QC methods described below are directed to near real-time evaluation of the noise content in seismic data recorded during a marine survey. The QC methods may be carried out onboard a survey vessel while the marine survey is being conducted, and/or the seismic data may be sent to an onshore seismic data processing facility that performs the QC methods on the seismic data and may transmit results back to the survey vessel in near real-time.

QC methods described below may be performed in near real-time so that noise in the seismic data may be assessed by QC personnel at any time during a marine survey. The term "near real-time" includes time delays that result from performing the QC methods onboard the survey vessel, and optionally transmitting relevant seismic data to an onshore facility, performing QC methods at the onshore facility and transmitting the QC results from the onshore facility back to the survey vessel. The term near real-time also refers to situations in which a time delay due to seismic data collection, transmission, and performing QC methods is insignificant or imperceptible. The term near real-time also refers to longer time delays that are still short enough to allow timely use of the results of the QC methods.

FIG. 7 shows a side-elevation view of an example seismic data acquisition system 700 that includes a survey vessel 702 towing a source 704 and streamers 706 in a body of water. The seismic data recorded in each shot record may be stored on the survey vessel 702 in a data-storage device and sent (e.g., via satellite communications) to an onshore seismic data processing facility 708. The seismic data may be collected in a shot record, and the QC methods described below may be applied onboard the survey vessel 702 in near real-time, or the QC methods may be applied to the seismic data at the onshore seismic data processing facility 708 to evaluate the noise content of the seismic data in near real-time. The results of the QC methods may be sent from the onshore data processing facility 708 to the survey vessel 702 to enable collaboration between onboard and onshore QC personnel regarding adjustment of survey parameters.

Figure 8B:
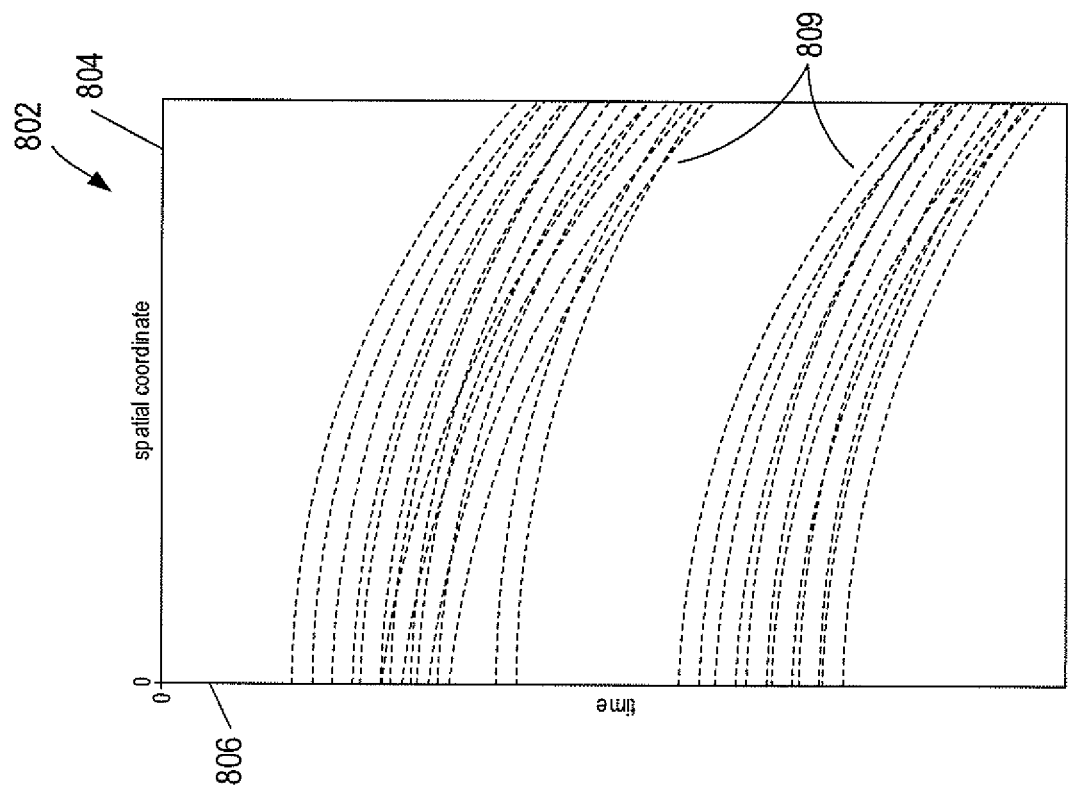
FIGS. 8A-8B show example common-shot gathers of pressure data and vertical velocity data.
Figure 8A:
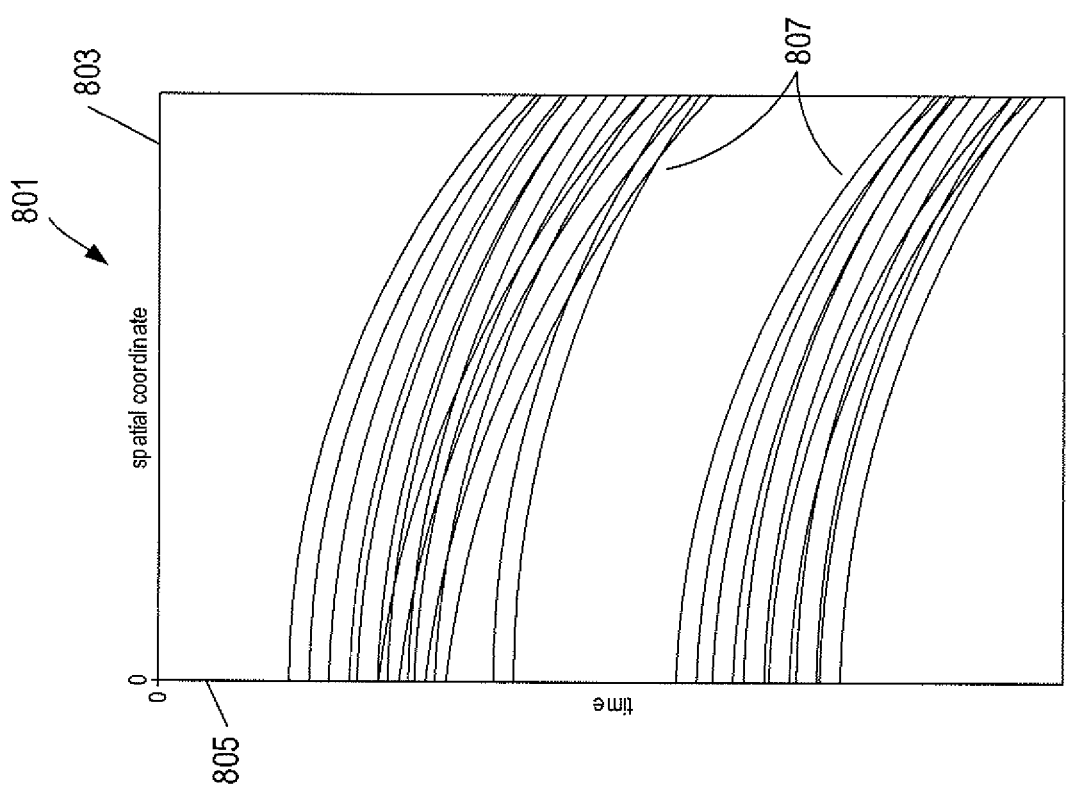

FIG. 8A shows an example common-shot gather 801 of pressure data, and FIG. 8B shows an example common-shot gather 802 of vertical velocity data. In FIGS. 8A and 8B, horizontal axes 803 and 804 represent spatial coordinates of the same receivers located along a streamer, and vertical axes 805 and 806 represent time. The pressure and vertical velocity data displayed in the common-shot gathers 801 and 802, respectively, are generated by collocated pressure and particle motion sensors. Solid curves in the common-shot gather 801, such as solid curves 807, represent measured pressure wavefield reflections from the formation surface, interfaces of a subterranean formation, and the free surface. Dashed curves in the common-shot gather 802, such as dashed curves 809, represent measured vertical velocity wavefield reflections from the same formations surface, interfaces of the same subterranean formation, and the free surface.

Note that although QC methods are described below with reference to the pressure and vertical velocity data generated by collocated pressure and particle motion sensors, QC methods are not intended to be limited to evaluating pressure and vertical velocity data. For the sake of convenience, vertical velocity data is used to describe the QC methods. QC methods likewise may be applied to pressure and particle displacement data, particle velocity data, or particle acceleration data.

Note also the QC methods are not intended to be limited to seismic data sorted into the common-shot domain, as represented by the common-shot gathers 801 and 802. QC methods described below may be applied to pressure and particle motion data generated by collocated pressure and particle motion sensors sorted into any domain. For example, QC methods may be applied to pressure and particle motion data sorted into the common-receiver domain, common-receiver station domain, or the common-midpoint domain.

The pressure and vertical velocity data are cross-ghosted to generate cross-ghosted pressure data and cross-ghosted vertical velocity data. Cross-ghosting normalizes the amplitudes of the two sets of seismic data. Cross-ghosted pressure data may be generated from the pressure data by first transforming the pressure data from the space-time ("s-t") domain to the wavenumber-frequency ("w-f") domain using a fast Fourier transform ("FFT") or a discrete Fourier transform ("DFT") as follows:

$$p(\vec{x}_r, t) \xrightarrow{FT} P(k_x, k_y, \omega | z_r) \quad (2)$$

where
$\omega$ is the angular frequency;
$k_x$ is the x-coordinate wavenumber; and
$k_y$ is the y-coordinate wavenumber.

The cross-ghosted pressure data may be calculated in the w-f domain as follows:

$$\tilde{P}(k_x, k_y, \omega | z_r) = O(k_x, k_y, \omega)(1+Z)P(k_x, k_y, \omega | z_r) \quad (3)$$

where
$(1+Z)$ is a particle motion sensor ghosting operator; and
$O(k_x, k_y, \omega)$ is obliquity scaling.

The parameter Z in the particle motion sensor ghosting operator is given by $$Z = e^{-ik_z 2z_r} \quad (4)$$

where
i is the imaginary unit $\sqrt{-1}$;

$$k_z = \sqrt{\left(\frac{\omega}{c}\right)^2 - k_x^2 - k_y^2} \;;$$

and
c is the acoustic wave propagation speed in water.
The obliquity scaling is given by:

$$O(k_x, k_y, \omega) = \frac{k_z c}{\omega} \quad (5)$$

Cross-ghosted vertical velocity data may be generated from the vertical velocity data by first transforming the vertical velocity data from the s-t domain to the w-f domain using an FFT or a DFT as follows:

$$v_z(\vec{x}_r, t) \xrightarrow{FT} V_z(k_x, k_y, \omega | z_r) \quad (6)$$

The cross-ghosted vertical velocity data may be calculated in the w-f domain as follows:

$$\tilde{V}_z(k_x, k_y, \omega | z_r) = (1-Z)V_z(k_x, k_y, \omega | z_r) \quad (7)$$

where $(1-Z)$ is a pressure sensor ghosting operator.

The cross-ghosted pressure data given by Equation (3) and the cross-ghosted vertical velocity data given by Equation (7) are transformed back to the space-time domain using an inverse FFT ("IFFT") or an inverse DFT ("IDFT") to obtain cross-ghosted pressure data in the s-t domain:

$$\tilde{P}(k_x, k_y, \omega | z_r) \xrightarrow{IFT} \tilde{p}(\vec{x}_r, t) \quad (8)$$

and obtain cross-ghosted vertical velocity data in the s-t domain:

$$\tilde{V}_z(k_x, k_y, \omega | z_r) \xrightarrow{IFT} \tilde{v}_z(\vec{x}_r, t) \quad (9)$$

Figure 9:
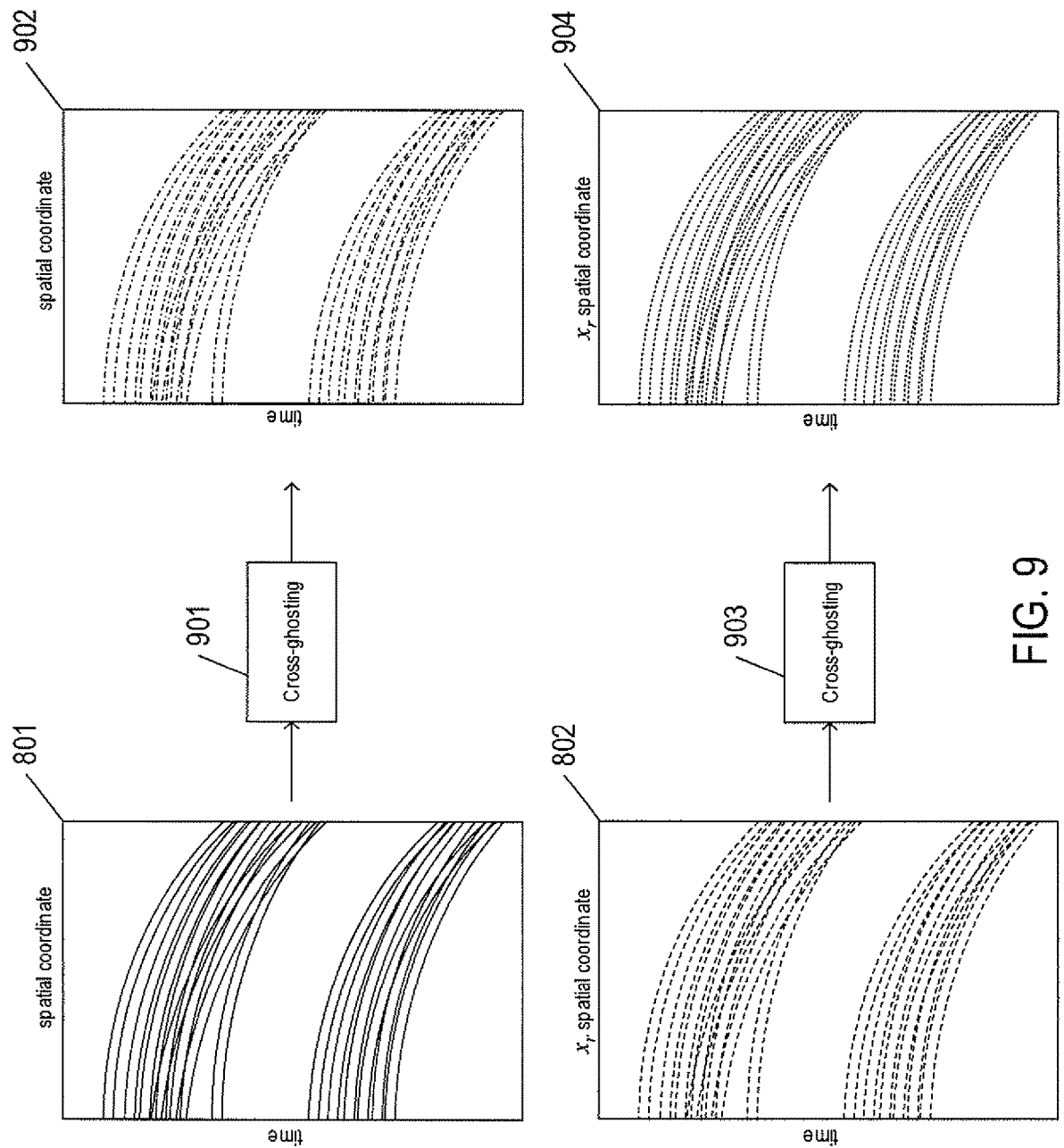
FIG. 9 shows an example of cross-ghosting gathers of pressure data and vertical velocity data to obtain cross-ghosted pressure data and cross-ghosted vertical velocity data.

FIG. 9 shows an example of cross-ghosting 901 applied to the common-shot gather 801 of pressure data to obtain a gather of cross-ghosted pressure data 902, and cross-ghosting 903 applied to the common-shot gather 802 of vertical velocity data to obtain a gather of cross-ghosted vertical velocity data 904. Cross-ghosting 901 may be applied to the entire common-shot gather 801 of pressure data or ensembles of traces of the common-shot gather 801 as described above with reference to Equations (2)-(5) to obtain the cross-ghosted gather 902 of pressure data represented by $\tilde{p}(\vec{x}_r, t)$. Cross-ghosting 903 may be applied to the entire common-shot gather 802 of vertical velocity data or ensembles of traces of the common-shot gather 802 to obtain the cross-ghosted gather 904 of vertical velocity data represented by $\tilde{v}_z(\vec{x}_r, t)$. Because cross-ghosting 901 and 903 normalize the amplitudes of the cross-ghosted pressure and vertical velocity data in the cross-ghosted gathers 902 and 904, $$\tilde{v}_z(\vec{x}_r, t) - \tilde{p}(\vec{x}_r, t) \approx 0 \quad (10)$$

for each receiver coordinate and time sample of the cross-ghosted pressure data $\tilde{p}(\vec{x}_r, t)$ and corresponding receiver coordinate time sample of cross-ghosted vertical velocity data $\tilde{v}_z(\vec{x}_r, t)$.

QC methods apply discrete wavelets and discrete wavelet transforms to the cross-ghosted pressure data gather 902 and the cross-ghosted vertical velocity data gather 904 in order to generate approximation and wavelet coefficients in temporal and spatial scales of a temporal and spatial scale domain. The approximation and wavelet coefficients may then be used to compute energies in the temporal and spatial scales.

In the following description, wavelet terminology and notation are introduced with a description of continuous wavelets and continuous wavelet transforms followed by a description of discrete wavelets and use of discrete wavelets to compute approximation and wavelet coefficients in temporal and spatial scales of a temporal and spatial scale domain.

A continuous wavelet in the time domain is given by $$\psi_{a,b}(t) = w(a)\psi\left(\frac{t-b}{a}\right) \quad (11)$$

where $\psi$ is a wavelet function also called a mother wavelet;
a is a dilation parameter called the temporal scale;
b is a temporal location in the time domain; and
w(a) is a weighting function.

The wavelet function $\psi$ has finite energy $$E = \int_{-\infty}^{\infty}\left|\psi\left(\frac{t-b}{a}\right)\right|^2 dt < \infty \quad (12a)$$

where $|\cdot|^2$ is the square of the modulus or absolute value, and $$\int_{-\infty}^{\infty}\psi\left(\frac{t-b}{a}\right)dt = 0 \quad (12b)$$

The wavelet function $\psi$ may be a real function or a complex function with real and imaginary parts (i.e., $\psi(t)=Re(\psi(t))+iIm(\psi(t))$). The wavelet function may be any function that satisfies the two conditions given by Equations (12a) and (12b). For example, the wavelet function may be a Mexican hat wavelet function, a Shannon wavelet function, a Morlet wavelet function, a Haar wavelet function, or any one of many different Daubechies wavelet functions.

Figure 10A:
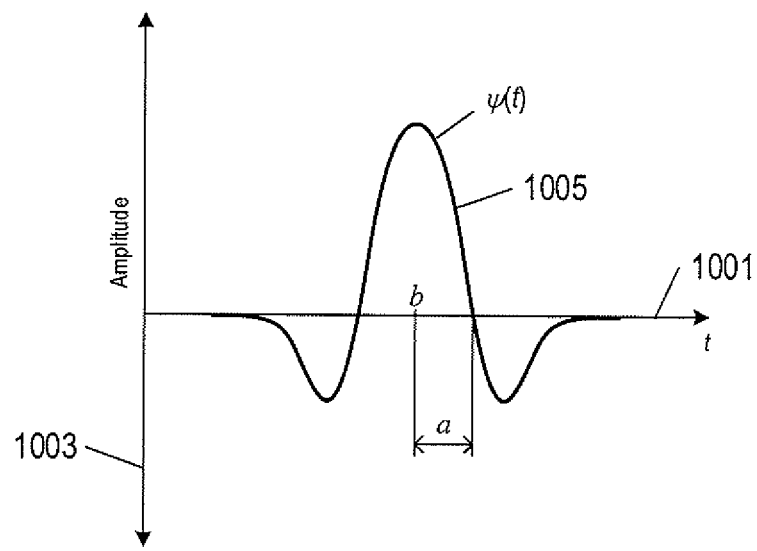
FIGS. 10A-10B show plots of an example real wavelet function and an example complex wavelet function, respectively.
Figure 10B:
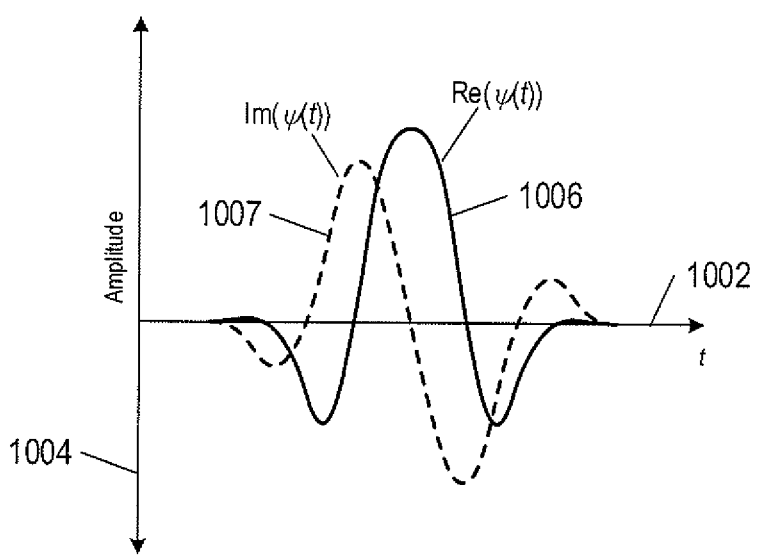

FIGS. 10A-10B show plots of an example real wavelet function and an example complex wavelet function, respectively. In FIGS. 10A-10B, axes 1001 and 1002 represent time, and axes 1003 and 1004 represent amplitude. In FIG. 10A, curve 1005 is an example of a real wavelet function called a Mexican hat wavelet function. In FIG. 10B, curves 1006 and 1007 represent a real part, $Re(\psi(t))$, and an imaginary part, $Im(\psi(t))$, respectively, of a complex wavelet function called the Morlet wavelet function.

Returning to Equation (11), the temporal scale a controls the dilation and contraction of the wavelet function, and the location of the wavelet along the time axis is controlled by the temporal location b. For example, the temporal scale a and temporal location b are represented for the Mexican hat wavelet function shown in FIG. 10A. The weighting function w(a) may be set equal to $1/\sqrt{a}$ for energy conservation, which ensures that wavelets with the same wavelet function but different scales have the same energy.

Figure 11:
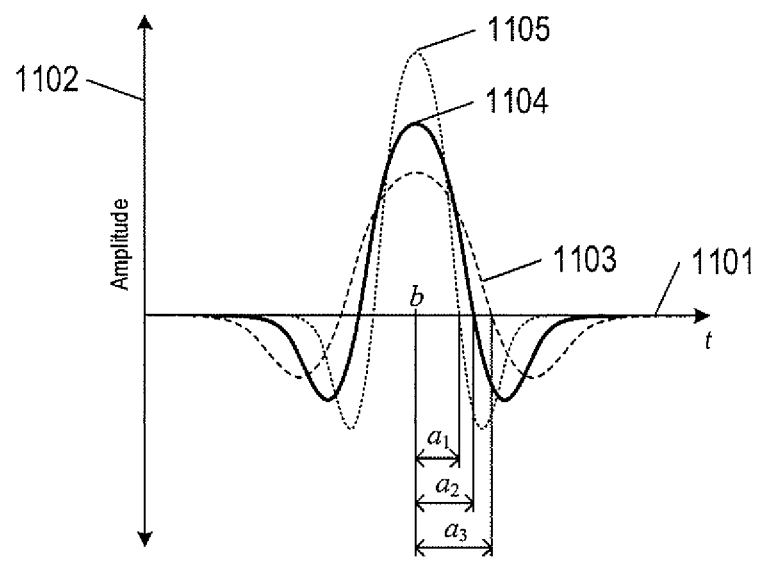
FIG. 11 shows a continuous wavelet plotted for three different temporal scales centered at the same temporal location.

FIG. 11 shows a plot of a continuous wavelet $\psi_{a,b}(t)$ with a weighting function equal to $1/\sqrt{a}$ plotted for three different temporal scales $a_1$, $a_2$ and $a_3$ centered at the same temporal location b. Axis 1101 represents time, and axis 1102 represents amplitude. Curves 1103-1105 represent the continuous wavelets $\psi_{a_1,b}(t)$, $\psi_{a_2,b}(t)$, and $\psi_{a_3,b}(t)$ with the same Mexican hat wavelet function at the three different temporal scales. As shown in FIG. 11, as the temporal scale increases, the width of the wavelet increases or dilates. Likewise, as the temporal scale decreases, the width of the wavelet decreases or contracts. Because the continuous wavelets have a weighting function equal to $1/\sqrt{a}$, the wavelets $\psi_{a_1,b}(t)$, $\psi_{a_2,b}(t)$, and $\psi_{a_3,b}(t)$ have the same energy (i.e., energy is conserved).

Figure 12:
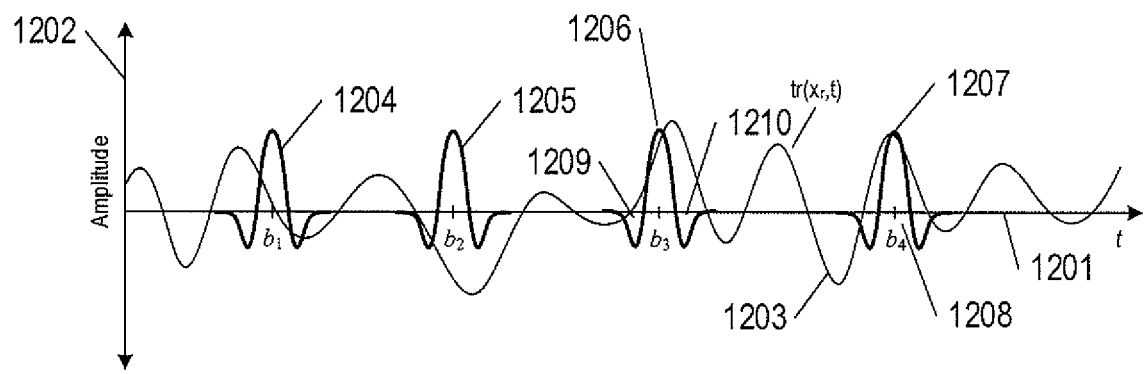
FIG. 12 shows a plot of a continuous wavelet located at four different temporal locations along a time axis.

FIG. 12 shows a plot of a continuous wavelet $\psi_{a,b}(t)$ located at four different temporal locations along a time axis. Axis 1201 represents time, and axis 1202 represents amplitude. Curve 1203 represents a trace, $tr(x_r,t)$, of seismic data generated by a pressure sensor or a particle motion sensor. Curves 1204-1207 represent the continuous wavelet $\psi_{a,b}(t)$ centered at four different temporal locations $b_1$, $b_2$, $b_3$, and $b_4$ along the time axis 1201.

The continuous wavelet transform of a trace $tr(x_T,t)$ is given by $$W(a,b) = \int_{-\infty}^{\infty} tr(x_r,t)\psi_{a,b}^*(t)dt \quad (13)$$

where "*" represents the complex conjugate.

When the wavelet function is real valued, $\psi_{a,b}^*(t)=\psi_{a,b}(t)$ Equation (13) is a continuous wavelet transform in which the trace $tr(x_r,t)$ is convolved with a set of wavelets of various temporal scales and locations. Time segments where the wavelet and the trace have positive values result in a positive value contribution to the wavelet transform. Similarly, time segments where the wavelet and the trace have negative values result in a positive value contribution to the wavelet transform. Time segments where the wavelet and the trace have opposite values result in a negative value contribution to the wavelet transform. For example, in FIG. 12, when the wavelet 1207 is centered at temporal location $b_4$, the time segment 1208 in which the wavelet and the trace 1203 have positive values result in a positive value contribution to the wavelet transform. By contrast, when the wavelet 1206 is centered at temporal location $b_3$, the time segments 1209 and 1210 in which the wavelet and the trace 1203 have opposite values result in negative value contributions to the wavelet transform.

The value of the wavelet transform depends on both the temporal location b and the temporal scale a. By varying the temporal scale a and the temporal location b, the wavelet transform may be used to identify coherent structures in the trace $tr(x_r,t)$. Because the temporal scale a is inversely proportional to the frequency (i.e., $a\sim1/f$), the wavelet transform may be used to investigate frequency changes in a trace over time. For example, by moving the wavelet $\psi_{a,b}(t)$ along the trace $tr(x_r,t)$ (i.e., increasing b) in the time domain coherent structures that relate to a specific temporal scale a in the trace $tr(x_r,t)$ may be identified. This process may be repeated over a range of temporal scales until the coherent structures within the trace $tr(x_r,t)$, from the largest to the smallest, are determined.

Figure 13A:
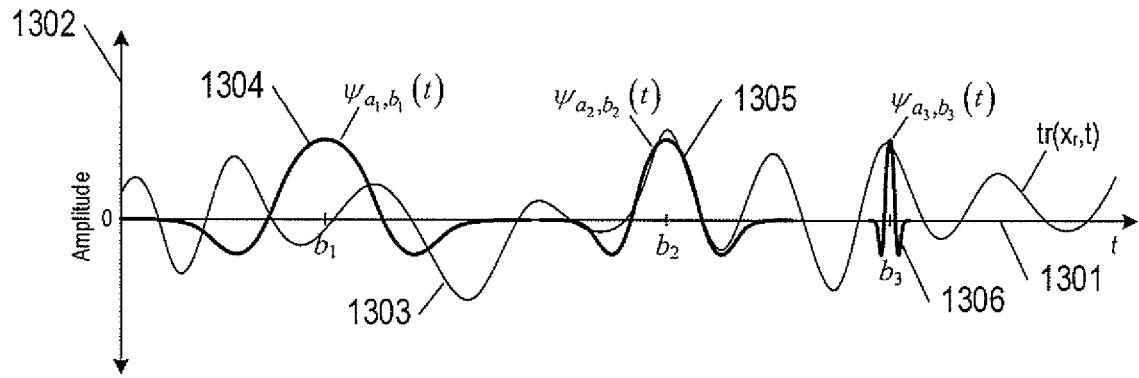
FIGS. 13A-13B show examples of different temporal locations and temporal scales for a wavelet transform.
Figure 13B:
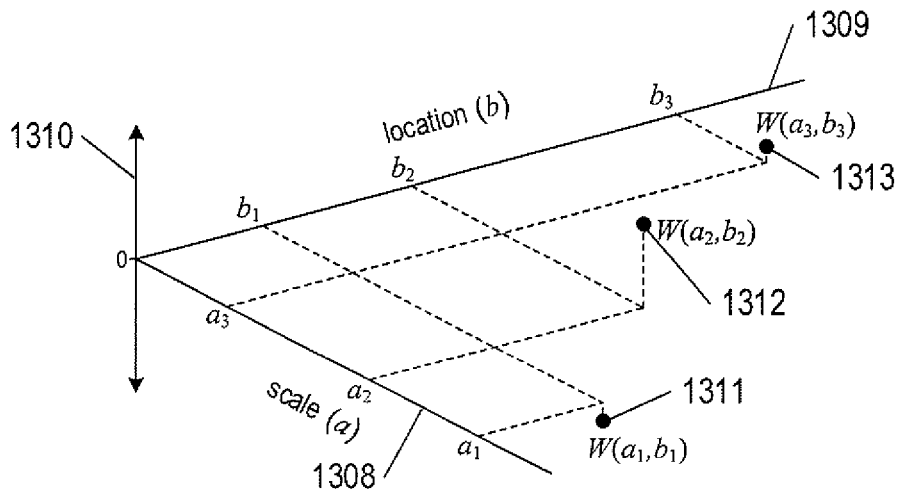

FIGS. 13A-13B show examples of different temporal locations and temporal scales for a wavelet transform. In FIG. 13A, axis 1301 represents time, and axis 1302 represents amplitude. Curve 1303 represents a trace $tr(x_r,t)$. Curves 1304-1306 represent a wavelet with different temporal scale and temporal location combinations $(a_1, b_a)$, $(a_2, b_2)$, and $(a_3, b_3)$. In FIG. 13B, axis 1308 represents a range of temporal scales (i.e., a>0), and axis 1309 represents a range of temporal locations. Vertical axis 1310 represents a range of wavelet transform values. Points 1311-1313 represents the wavelet transforms of the different temporal scale and location combinations $(a_1, b_1)$, $(a_2, b_2)$, and $(a_3, b_3)$, respectively. The wavelet 1304 centered at temporal location $b_1$ with a large temporal scale $a_1$ does not correlate or match the waveform of the trace within the time interval of the wavelet 1304, and the wavelet 1306 centered at temporal location $b_3$ with a small temporal scale $a_3$ also does not correlate or match the waveform of the trace within the time interval of the wavelet 1306. In these cases, the frequencies associated with the temporal scales $a_1$ and $a_3$ do not match constituent frequencies of the trace 1303 at the temporal locations $b_1$ and $b_3$. As a result, in FIG. 13B, the wavelet transform $W(a_1, b_1)$ 1311 has a small negative value and the wavelet transform $W(a_3, b_3)$ 1313 has a small positive value.

By contrast, as shown in FIG. 13A, the wavelet 1305 substantially matches or correlates with the waveform of the trace 1303 within the time interval of the wavelet 1305. In this case, the frequency associated with the temporal scale $a_2$ substantially matches the constituent frequencies of the trace 1303 at the location $b_2$. As a result, the wavelet transform $W(a_2, b_2)$ 1312, in FIG. 13B, is larger than the wavelet transforms $W(a_1, b_1)$ and $W(a_3, b_3)$.

Figure 14:
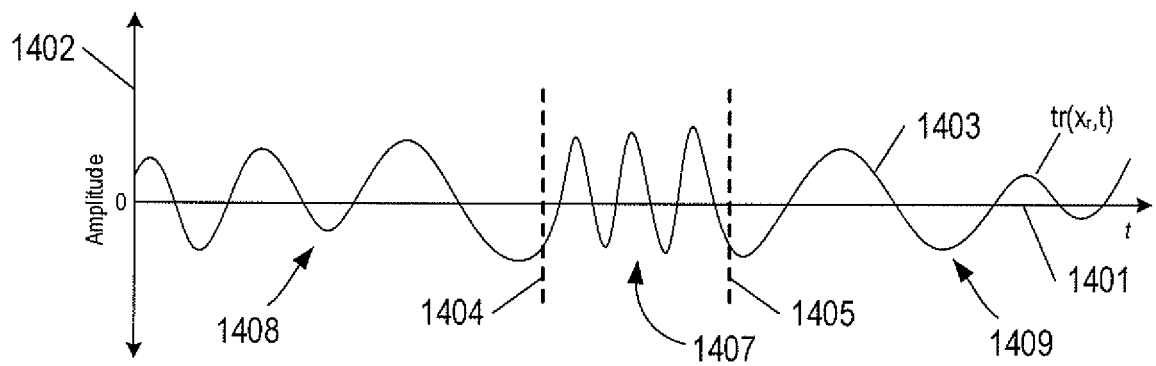
FIG. 14 shows an example of a trace that oscillates with different frequencies in different time intervals.

Wavelets with small temporal scales have a stronger match or correlation to higher frequency constituents of a trace, while wavelets with large temporal scales have a stronger match or correlation to low frequency constituents of the trace. FIG. 14 shows an example of a trace that oscillates with different frequencies in different time intervals. Axis 1401 represents time, and axis 1402 represents the amplitude of a trace represented by a curve 1403. Dashed lines 1404 and 1405 partition the trace 1403 into three different segments 1407-1409. Segment 1407 oscillates with higher frequency than segments 1408 and 1409. As a result, the magnitude of the wavelet transform is large for small temporal scales that substantially match constituent frequencies in the segment 1407 and the magnitude of the wavelet transform is large for large temporal scales that substantially match constituent frequencies in the segments 1408 and 1409.

When the wavelet has a complex wavelet function, the continuous wavelet transform is complex and may be represented by $$W(a,b) = \text{Re}(W(a,b)) + i\text{Im}(W(a,b)) \qquad (14)$$

where
Re(W(a, b)) is the real part of W(a, b); and
Im(W(a, b)) is the imaginary part of W(a, b).
Unlike real wavelets with real wavelet functions, complex wavelets may have separate phase and modulus components. The modulus is computed by $$|W(a,b)| = \sqrt{\text{Re}(W(a,b))^2 + i\text{Im}(W(a,b))^2} \qquad (15a)$$

and the phase is computed as follows:

$$\phi(a,b) = \tan^{-1}\left(\frac{\text{Re}(W(a,b))}{\text{Im}(W(a,b))}\right) \qquad (15b)$$

where $-\pi < \phi(a,b) < \pi$.

The magnitudes of the modulus |W(a, b)|, real part Re(W(a, b)), imaginary part Im(W(a, b)) and phase $\phi(a, b)$ may be used to investigate frequency changes in a trace over time, as described above with reference to FIGS. 13 and 14. For example, a zero phase corresponds to a maximum in the real part Re(W(a, b)) and a phase of $\pi$ (or $-\pi$) corresponds to a minimum in the real part Re(W(a, b)).

In practice, however, traces of a seismic data gather are of finite length and are composed of discrete time samples represented by Equation (1), and discrete wavelets and the discrete wavelet transform are applied to the discrete time samples. The discrete wavelet transform provides sufficient information for analysis of a trace, with a significant reduction in computational time by comparison to continuous wavelets and the continuous wavelet transform described above.

A discrete wavelet is given by $$\psi_{m,n}(t) = \frac{1}{\sqrt{a_0^m}} \psi\left(\frac{t - nb_0 a_0^m}{a_0^m}\right) \qquad (16)$$

where
$a_0$ is a fixed dilation step;
$b_0$ is a fixed location; and
m and n are integers.

The integers m and n control wavelet function dilation and location, respectively. The integer in is called the temporal scale index and the integer n is called the temporal location index. The dilation step $a_0$ is set equal to a value greater than one, and the location $b_0$ is set equal to a value greater than zero. The quantity, $a_0^m$, is called the temporal scale of the discrete wavelet. In Equation (16), the translation steps between locations in the time domain are $b_0 a_0^m$, which are directly proportional to the temporal scale, $a_0^m$.

A particular type of discrete wavelet is a dyadic grid wavelet in which fixed temporal scale step $a_0$ is set equal to two ($a_0=2$) and the fixed location $b_0$ is set equal to one ($b_0=1$). The dyadic grid wavelet is given by $$\psi_{m,n}(t) = \frac{1}{\sqrt{2^m}} \psi\left(\frac{t - n2^m}{2^m}\right) \qquad (17)$$

Discretization of the continuous wavelet transform represented by Equation (13) involves a discrete approximation of the transform integral computed on a discrete grid of temporal scales and locations, and is represented by $$W_r^{m,n} = \int_{-\infty}^{\infty} tr(x_r,t)\psi_{m,n}^*(t)dt \qquad (18)$$

The quantity, $W_r^{m,n}$, is called a wavelet coefficient in temporal scales which the subscript, r, identifies the trace or channel of a gather composed of R traces (i.e., r=0, . . . , R−1), and the superscripts m and n correspond to the temporal scale index and the temporal location index in Equations (16) and (17).

The wavelet coefficients in temporal scales $W_r^{m,n}$ may be computed by computing approximation coefficients in temporal scales according to $$U_r^{m,n} = \frac{1}{\sqrt{2}} \sum_{j=0}^{N_j-1} c_j U_r^{m-1,2n+j} \qquad (19a)$$

and the approximation coefficients in temporal scales are in turn used to compute the wavelet coefficients in temporal scales as follows:

$$W_r^{m,n} = \frac{1}{\sqrt{2}} \sum_{j=1}^{N_j} b_j U_r^{m-1,2n+j} \qquad (19b)$$

The temporal location index is n=0, . . . , N−1, as described in Equation (1), and the temporal scale index is m=1, . . . , M, where $N=2^M$, and M is the maximum number of temporal scale indices. The approximation coefficients may be initialized to $U_r^{0,n}=A(x_r, t_n)$ for each temporal location index. The coefficients $c_j$ in Equation (19a) are called scaling coefficients, and the coefficients $b_j$ in Equation (19b) are called wavelet function coefficients. The quantity $N_j$ is the number of scaling coefficients associated with a numerical representation of the discrete wavelet. The scaling coefficients satisfy the following constraints:

$$\sum_{j=0}^{N_j-1} c_j = 2 \quad (20a)$$

$$\sum_{j=0}^{N_j-1} c_j c_{j+2j'} = \begin{cases} 2 & j' = 0 \\ 0 & j' \neq 0 \end{cases} \quad (20b)$$

The wavelet coefficients are given by:

$$b_j = (-1)^j c_{N_j - j - 1} \quad (21)$$

For example, a Haar wavelet may have $N_j$ equal to 2 scaling coefficients. The scaling coefficients of the Haar wavelet are $c_0 = c_1 = 1$ and the wavelet coefficients of the Haar wavelet are $b_0 = 1$ and $b_1 = 1$.

In Equation (19a), the sequence of scaling coefficients $(1/\sqrt{2})c_j$ for $j = 0, \ldots, N_j - 1$ are a lowpass filter that passes low frequencies details of the trace. In Equation (19b), the sequence of wavelet coefficients $(1/\sqrt{2})b_j$ for $j = 0, \ldots, N_j - 1$ are a highpass filter that passes high frequencies of the trace. The superscript $2n+j$ of the approximation coefficients in Equations (19a) and (19b) controls subsampling by a factor of two.

Figure 15:
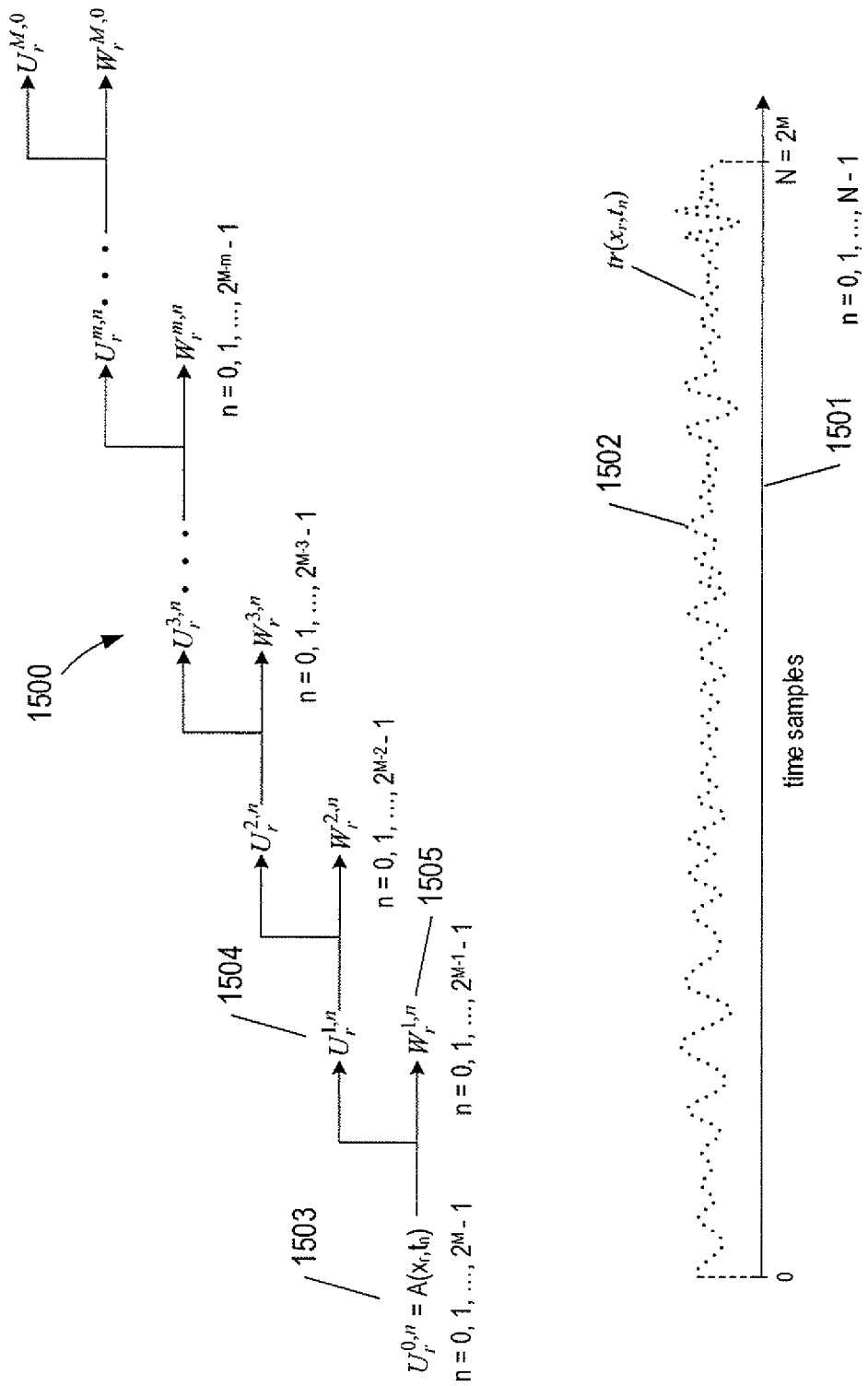
FIG. 15 shows a schematic diagram of computing wavelet coefficients in temporal scales.

FIG. 15 shows a schematic diagram 1500 that represents computing wavelet coefficients according to Equations (19a) and (19b). In FIG. 15, axis 1501 represents time, and dotted curve 1502 represents a discretized trace $tr(x_r, t_n)$ composed of N time samples. For example, the trace $tr(x_r, t_n)$ may represent a trace in the cross-ghosted pressure data gather 902 or a trace in the cross-ghosted vertical velocity data gather 904. In this example, the number of time samples is an integer power M of 2 (i.e., $N = 2^M$). Computation of approximation and wavelet coefficient generation begins 1503 with the temporal scale index in initialized to zero and approximation coefficients initialized to the data set of the trace amplitudes, $U_r^{0,n} = A(x_r, t_n)$ for $n = 0, 1, \ldots, 2^M - 1$. Next, for $n = 0, 1, \ldots, 2^{M-1} - 1$, the temporal scale index m is incremented (m=1), a set of approximation coefficients in temporal scales, $\{U_r^{1,n}\}$, 1504 are computed according to Equation (19a), and a set of wavelet coefficients in temporal scales, $\{W_r^{1,n}\}$, 1505 are computed according to Equation (19b). The schematic diagram 1500 represents generation of a set of $2^{M-m}$ wavelet coefficients in temporal scales, $\{W_r^{m,n}\}$, where $n = 0, 1, \ldots, 2^{M-m} - 1$, for each temporal scale index $1 \leq m \leq M$. Wavelet generation may stop for a fixed number of temporal scales less than M or when m=M with an approximation coefficient in a temporal scale, $U_r^{M,0}$, and a wavelet coefficient in a temporal scale, $W_r^{M,0}$.

The temporal scale $a_o^m$ (i.e., $2^m$ for a dyadic wavelet) controls the dilation of the discrete wavelet given by Equation (16). As the temporal scale index M is incrementally increased, the temporal scale $a_o^m$, is increased, and the approximation coefficients in temporal scales and wavelet coefficients in temporal scales correspond to lower frequency portions of the trace, as explained above with reference to FIGS. 13-14. In addition, for each temporal scale index, the approximation coefficients in temporal scales computed according to Equation (19a) correspond to lower constituent frequencies of the trace than the wavelet coefficients in temporal scales computed according to Equation (19b). In other words, for each temporal scale index, Equation (19a) operates as a low pass filter, and Equation (19b) operates as a high pass filter of the constituent frequencies of the trace $tr(x_r, t_n)$.

Figure 16:
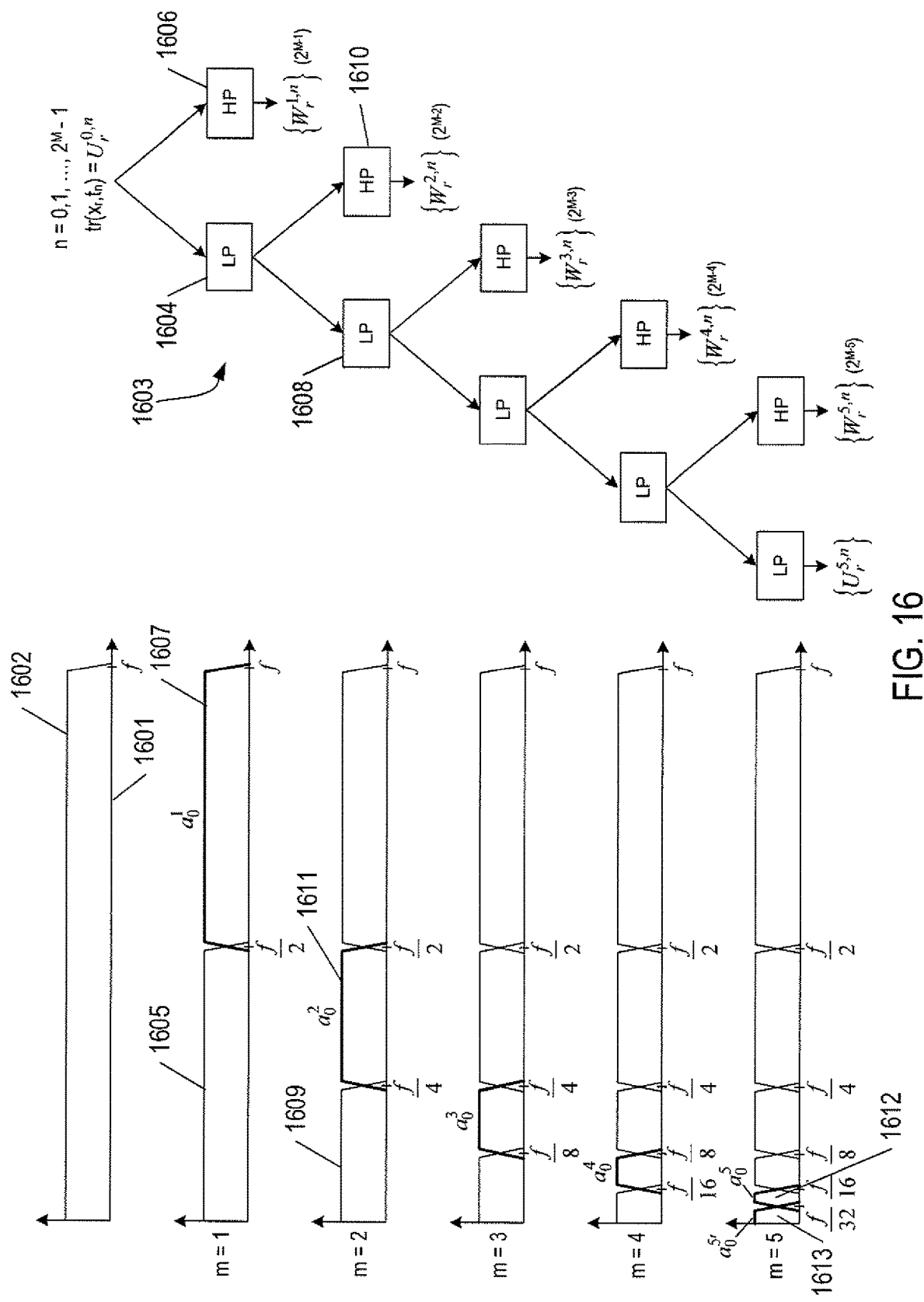
FIG. 16 shows how computation of approximation coefficients and wavelet coefficients in temporal scales operate as low pass and high pass filters, respectively.

FIG. 16 shows an example of how Equations (19a) and (19b) operate as low pass and high pass filters, respectively, for constituent frequencies of the trace shown in FIG. 15. In FIG. 16, axes, such as axis 1601, represent a frequencies domain. Bracket 1602 represents a frequency range of constituent frequencies of the trace $tr(x_r, t_n)$ shown in FIG. 15, where f represents the highest frequency of the frequency range 1602. FIG. 16 includes a diagram 1603 in which blocks labeled LP represent the low pass filter operation of Equation (19a), and blocks labeled HP represent the high pass filter operation of Equation (19b). When the temporal scale index m=1, the temporal scale of the discrete wavelet transform is $a_0^1$, and a set of approximation coefficients in temporal scales, $\{U_r^{1,n}\}$, output from low pass filter 1604 corresponds to constituent frequencies of the trace that lie within a low frequency range 1605, and a set of wavelet coefficients in temporal scales, $\{W_r^{1,n}\}$, output from high pass filter 1606 corresponds to constituent frequencies of the trace that lie within a high frequency range 1607. The set $\{W_r^{1,n}\}$, where $n = 0, 1, \ldots, 2^{M-1} - 1$, is composed of $2^{M-1}$ wavelet coefficients in temporal scales. When the temporal scale index m=2, the temporal scale of the discrete wavelet transform is $a_0^2 > a_1^1$, and a set of approximation coefficients in temporal scales, $\{U_r^{2,n}\}$, output from low pass filter 1608 corresponds to constituent frequencies of the trace that lie within a low frequency range 1609, and a set of wavelet coefficients in temporal scales, $\{W_r^{2,n}\}$, output from highpass filter 1610 corresponds to constituent frequencies of the trace that lie within a high frequency range 1611. The set $\{W_r^{2,n}\}$, where $n = 0, 1, \ldots, 2^{M-2} - 1$, is composed of $2^{M-2}$ wavelet coefficients. In the example of FIG. 16, the process is repeated up to temporal scale index m=5=M in which the set of wavelet coefficients in temporal scales $\{W_r^{5,n}\}$ corresponds to constituent frequencies of the trace in the frequency range 1612, and the set of approximation coefficients in temporal scales $\{U_r^{5,n}\}$ corresponds to constituent frequencies of the trace in the frequency range 1613.

In FIG. 16 and in subsequent figures, the temporal scales are used to denote the frequency ranges associated the sets of wavelet coefficients. Because the set of wavelet coefficients $\{W_r^{5,n}\}$ and the set of approximation coefficients $\{U_r^{5,n}\}$ are computed with the same temporal scale $a_0^5$, the temporal scale $a_0^{5'}$ is used to denote the frequency range 1613 of the set of approximation coefficients $\{U_r^{5,n}\}$.

Wavelet coefficient generation described above with reference to Equations (19a) and (19b) and FIGS. 15 and 16 is repeated for each trace in the cross-ghosted pressure data gather 902 and each trace in the cross-ghosted vertical velocity data gather 904. In particular, for each trace of the cross-ghosted gathers 902 and 904, a set of wavelet coefficients in temporal scales and a set of approximation coefficients in temporal scales are computed for each temporal scale index as described above with reference to Equations (19a) and (19b). The following pseudocode represents computation of approximation and wavelet coefficients in temporal scales for each trace of a gather

```
1    for r = 0, ..., R - 1 {      \\ r is the trace index
2        for n = 0, ..., N - 1 {  \\ n is the time sample index
3            U_r^{0,n} = A(x_r, t_n);
4        }
5        for m = 1, ..., M {       \\ m is temporal scale index
6            for n = 0, ..., N - 1 {
```

$$7 \qquad U_r^{m,n} = \frac{1}{\sqrt{2}} \sum_{j=0}^{N_j - 1} c_j U_r^{m-1, 2n+h};$$

$$W_r^{m,n} = \frac{1}{\sqrt{2}} \sum_{j=1}^{N_j} b_j U_j^{m-1,2n+j}; \quad (8)$$

9 }
10 }
11 }

Figure 17:
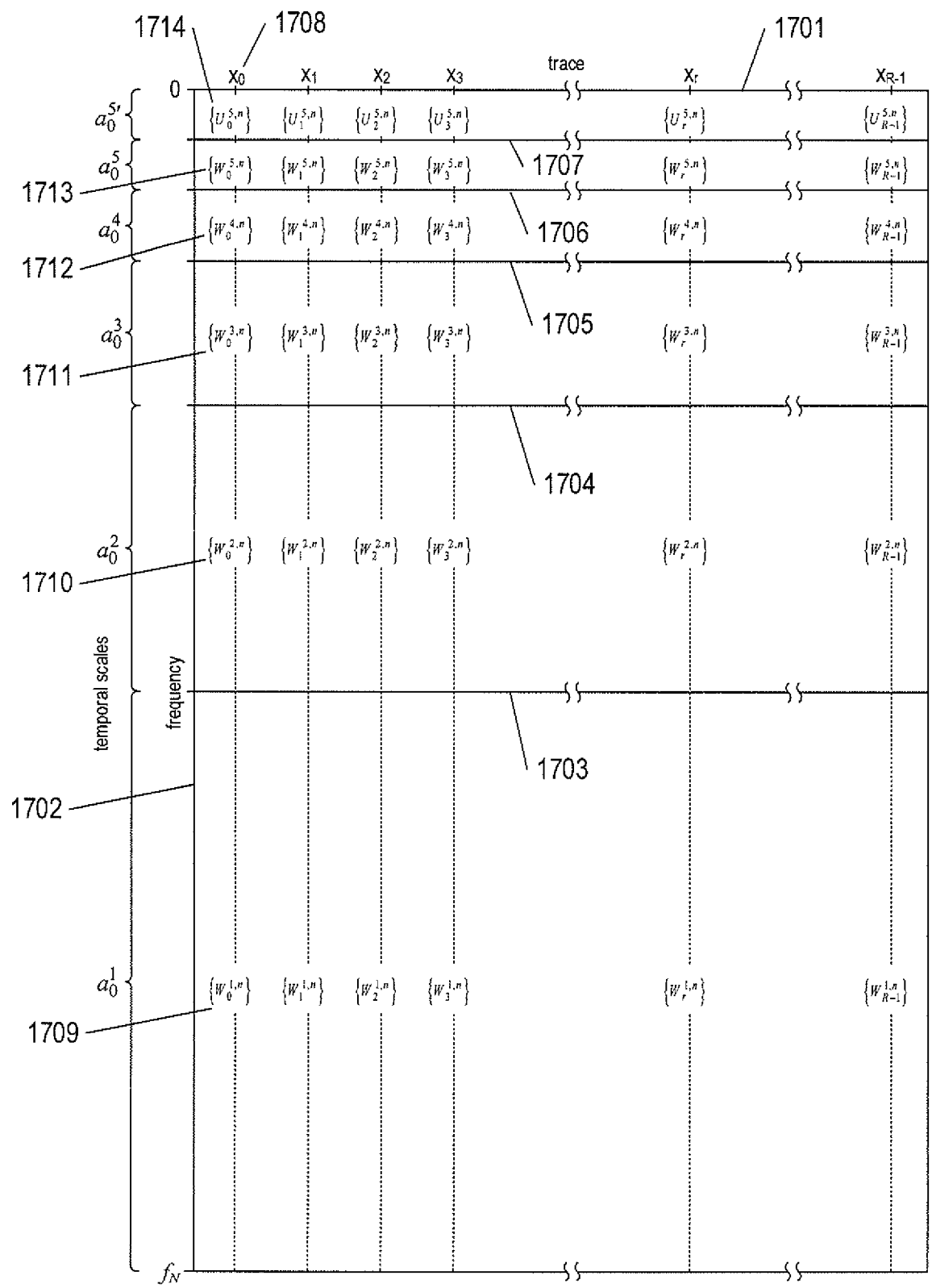
FIG. 17 shows sets of wavelet coefficients in temporal scales associated with different temporal scales computed for each trace of a gather.

FIG. 17 shows sets of approximation and wavelet coefficients in temporal scales computed for each trace of a gather. The gather may be the cross-ghosted pressure data gather 902 or the cross-ghosted vertical velocity data gather 904. Axis 1701 represents in-line or x-direction coordinates with the receiver coordinates, $x_r$, identified ($r=0, \ldots, R-1$). Axis 1702 represents a frequency range of constituent frequencies of each trace in the gather, with frequency $f_N$ representing the Nyquist frequency, which may be about twice the highest component frequency of the traces. Lines 1703-1707 separate the constituent frequency ranges associated with the temporal scales labeled $a_0^m$, where $m=1, 2, 3, 4, 5$ s. For example, temporal scale $a_0^1$ corresponds to the highest frequency range, and the temporal scale $a_0^2$ corresponds to the next highest frequency range. For each trace, sets of approximation and wavelet coefficients are computed in each temporal scale (i.e., temporal scale index), as described above with reference to Equations (19a) and (19b) and FIGS. 15 and 16. For example, for the trace with in-line coordinate $x_0$ 1708, sets of wavelet coefficients $\{W_0^{1,n}\}$ 1709, $\{W_0^{2,n}\}$ 1710, $\{W_0^{3,n}\}$ 1711, $\{W_0^{4,n}\}$ 1712, and $\{W_0^{5,n}\}$ 1713 are computed for temporal scales $a_0^1, a_0^2, a_0^3, a_0^4$, and $a_0^5$, respectively, and a set of approximation coefficients $\{U_0^{5,n}\}$ 1714 is also computed for temporal scale $a_0^{5'}$.

In practice, the range of constituent frequencies of the traces comprising a gather typically range from frequencies close to 0 Hz as a low limit up to the Nyquist frequency, $f_N$, as the high frequency limit. As a result, the approximation and wavelet coefficients in temporal scales may be computed for different constituent frequency ranges within the frequency range [0, $f_N$]. For example, in FIG. 17, the temporal scales $a_0^1, a_0^2, a_0^3, a_0^4, a_0^5$ and $a_0^{5'}$ corresponds to frequency ranges within the frequency range [0, $f_N$], as described above with reference to FIG. 16. The temporal scales may be determined from the sample rate (i.e., sample frequency) used to sample the reflected wavefield. For example, when the sample rate is 2 ms, the Nyquist frequency is 250 Hz, the temporal scales $a_0^1, a_0^2, a_0^3, a_0^4$, and $a_0^5$ corresponds to frequency ranges [125, 250], [62.5, 125], [31.25, 62.5], [15.6, 31.25], and [7.8, 15.6], and the temporal scale $a_0^{5'}$ corresponds to the frequency range [0, 7.8].

QC methods also apply a discrete wavelet transform to the approximation and wavelet coefficients in the temporal scales. The discrete wavelet transform in the spatial domain uses discrete spatial scale and spatial location parameters and is represented by $$\psi_{k,r}(x) = \frac{1}{\sqrt{e_0^k}} \psi\left(\frac{x - r d_0 e_0^k}{e_0^k}\right) \quad (22)$$

where
$e_0$ is a fixed spatial dilation step;
$d_0$ is a fixed spatial location; and
k and r are integers.

The integers k and r control wavelet function spatial dilation and spatial location, respectively. The integer r is the trace or channel index of a gather composed of R traces (i.e., $r=0, \ldots, R-1$) described above. The integer k is called the spatial scale index with $1 \le k \le K$, where K is the maximum number of spatial scale indices.

The spatial dilation step $e_0$ is set equal to a value greater than one, and the spatial location $d_0$ is set equal to a value greater than zero. The quantity, $e_0^k$, is called the spatial scale of the discrete wavelet given by Equation (22), and the translation steps between locations in the spatial domain are $d_0 e_0^k$, which are directly proportional to the spatial scale, $e_0^k$. A discrete dyadic grid wavelet may also be used by setting the fixed spatial scale step $e_0$ equal to two ($e_0=2$) and the fixed spatial location $d_0$ set equal to one ($d_0=1$).

The discrete wavelet transform of Equation (22) is applied to the approximation and wavelet coefficients on a discrete grid of spatial scales and spatial locations, and is represented mathematically by $$D_{k,r}^{m,n} = \int_{-\infty}^{\infty} U_r^{m,n} \psi_{k,r}^*(x) dx \quad (23a)$$

$$C_{k,r}^{m,n} = \int_{-\infty}^{\infty} W_r^{m,n} \psi_{k,r}^*(x) dx \quad (23b)$$

The approximation and wavelet coefficients depend on the temporal scale $a_o^m$ and on the spatial scale $e_o^k$. The quantity $D_{k,r}^{m,n}$ is called an approximation coefficient in a temporal and spatial scale, and the quantity $C_{k,r}^{m,n}$ is called a wavelet coefficient in a temporal and spatial scale.

In practice, the approximation and wavelet coefficients in temporal and spatial scales may be computed in a similar manner to the approximation and wavelet coefficients in temporal scales described above with reference to Equations (19a) and (19b). The approximation coefficients in temporal and spatial scales may be computed according to $$D_{k,r}^{m,n} = \frac{1}{\sqrt{2}} \sum_{j=0}^{N_j-1} c_j D_{k-1,2r+j}^{m,n} \quad (24a)$$

and the approximation coefficients in temporal and spatial scales are in turn used to compute the wavelet coefficients in temporal and spatial scales as follows:

$$C_{k,r}^{m,n} = \frac{1}{\sqrt{2}} \sum_{j=1}^{N_j} b_j D_{k-1,2r+j}^{m,n} \quad (24b)$$

The approximation coefficient are initialized to $D_{0,r}^{m,n} = W_r^{m,n}$ (or $D_{0,r}^{m,n} = U_r^{m,n}$ for temporal scale $a_0^{M_t}$ and temporal scale index m=M) for each spatial location index $r=0, \ldots, R-1$. Note that the wavelet transforms of Equations (24a) and (24b) uses the same scaling and wavelet function coefficients ($c_j, b_j$) used in Equations (19a) and (19b).

Figure 18:
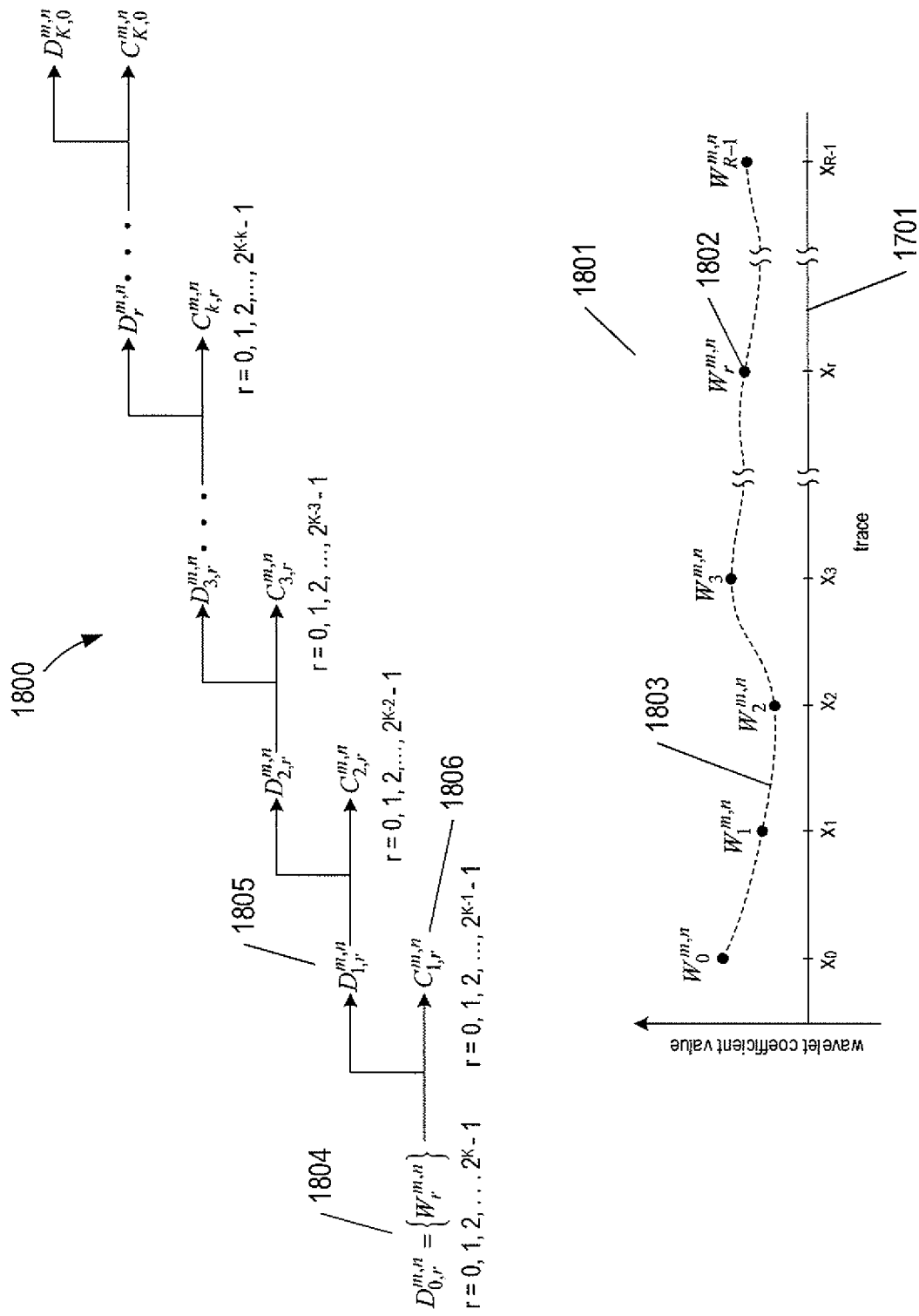
FIG. 18 shows a schematic diagram of computing spatial wavelet coefficients.

FIG. 18 shows a schematic diagram 1800 that represents computing approximation and wavelet coefficients in temporal and spatial scales according to Equations (24a) and (24b). In FIG. 18, values of wavelet coefficients in temporal scales 1801 associated with a temporal scale $a_0^m$, time sample index n, and R traces of a gather are represented by dots, such as dot 1802. The set of wavelet coefficients in temporal scales, $\{W_r^{m,n}\}_{r=0}^{R-1}$, are treated as a spatial oscillating wave in the in-line or x-direction, as indicated by dashed curve 1803. The approximation and wavelet coefficients are computed for each set of wavelet coefficients in temporal scales, $\{W_r^{m,n}\}_{r=0}^{R-1}$, (and for each set of approximations coefficients $\{U_r^{m,n}\}_{r=0}^{R-1}$ in temporal scales) associated with temporal scale $a_0^m$ and time sample index n. In this example, the number of wavelet coefficients in temporal and spatial scales is an integer power K of 2 (i.e., $R=2^K$). Computation of approximation and wavelet coefficients begins at 1804 with the spatial scale index k initialized to zero, and approximation coefficients in temporal and spatial scales initialized to the wavelet coefficients in temporal scales, $D_{0,r}^{m,n}=W_r^{m,n}$, for $r=0, 1, \ldots, 2^K-1$. Next, for $r=0, 1, \ldots, 2^{K-1}-1$, the spatial scale index k is incremented (k=1) and a set of approximation coefficients in temporal and spatial scales $\{D_{1,r}^{m,n}\}$ 1805 are computed according to Equation (24a), and a set of wavelet coefficients in temporal and spatial scales $\{C_{1,r}^{m,n}\}$ 1806 are computed according to Equation (24b). The schematic diagram 1800 represents generation of a set of $2^{K-k}$ wavelet coefficients in temporal and spatial scales $\{C_{k,r}^{m,n}\}$, where $r=0, 1, \ldots, 2^{K-k}-1$, for each spatial scale index $1 \leq k \leq K$. Computation of wavelet coefficients in temporal and spatial scales may stop when k=K with an approximation coefficient in temporal and spatial scale, $D_{K,0}^{m,n}$, and a wavelet coefficient in a temporal and spatial scale, $C_{K,0}^{m,n}$.

The spatial scale $e_o^k$ controls the dilation of the discrete wavelet given by Equation (22). As a result, for each iteration in which k is incrementally increased, the spatial scale is increased and the approximation and wavelet coefficients in temporal and spatial scales corresponds to lower wavenumbers of the set of wavelet coefficients in temporal scales $\{W_r^{m,n}\}_{r=0}^{R-1}$ in the spatial domain. For each spatial scale index, the approximation coefficients in temporal and spatial scales computed according to Equation (24a) correspond to lower constituent wavenumbers than the wavelet coefficients in temporal and spatial scales computed according to Equation (24b). In other words, for each spatial scale index, Equation (24a) operates as a low wavenumber filter and Equation (24b) operates as a high wavenumber filter of the constituent wavenumbers of the sets of the approximation and wavelet coefficients in the temporal scales.

Figure 19:
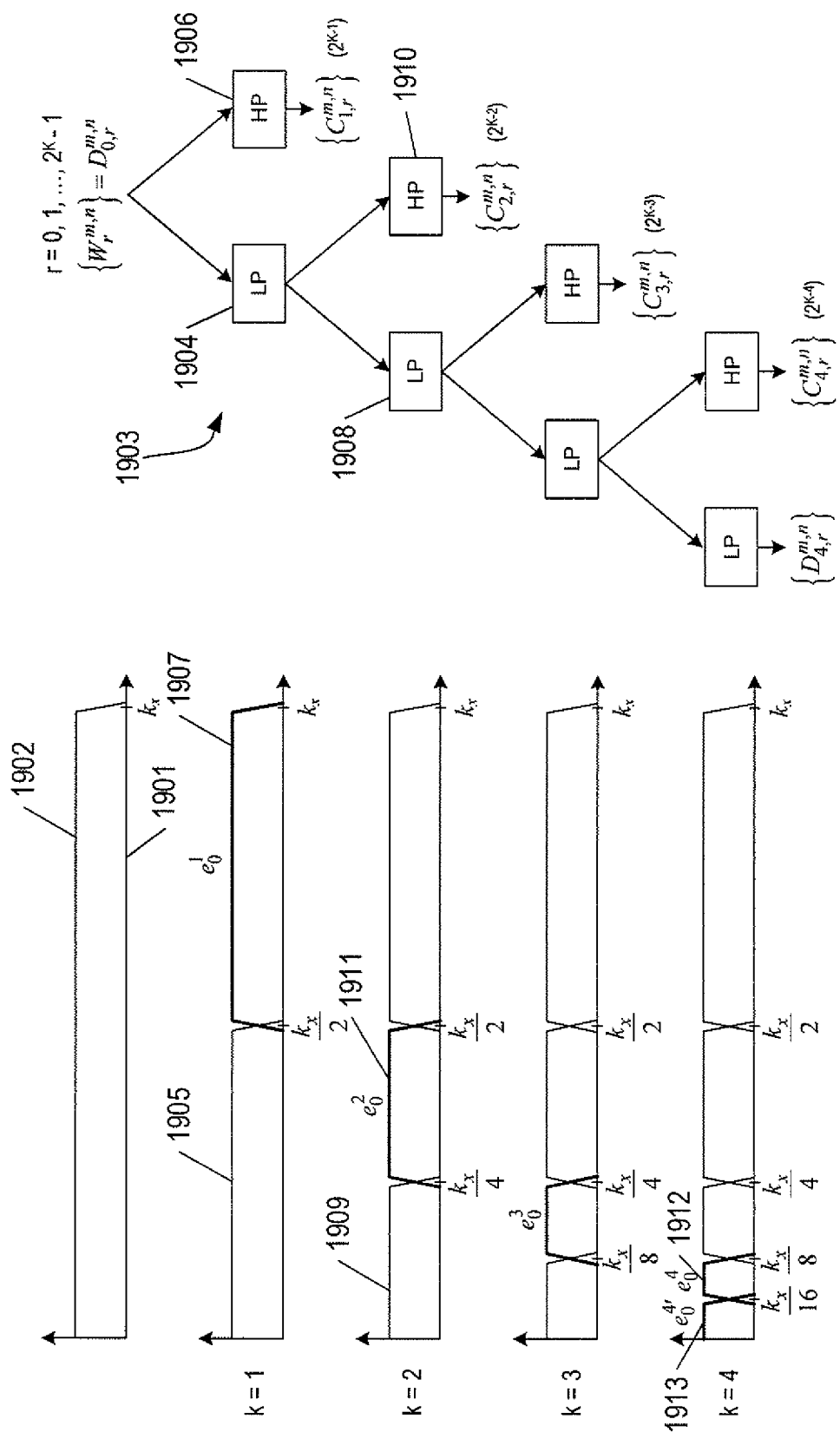
FIG. 19 shows how computation of approximation coefficients and wavelet coefficients in temporal and spatial scales operate as low pass and high pass wavenumber filters, respectively.

FIG. 19 shows an example of how Equations (24a) and (24b) operate as low pass and high pass wavenumber filters, respectively, for constituent wavenumbers of the set of wavelet coefficients in temporal scales $\{W_r^{m,n}\}_{r=0}^{R-1}$. In FIG. 19, axes, such as axis 1901, represent a wavenumber domain. Bracket 1902 represents a wavenumber range of constituent wavenumbers of the set of wavelet coefficients in temporal scales $\{W_r^{m,n}\}_{r=0}^{R-1}$, where $k_x$ represents the highest wavenumber of the wavenumber range 1902. FIG. 19 includes a diagram 1903 in which blocks labeled LP represent the low pass wavenumber filter operation of Equation (24a) and blocks labeled HP represent the high pass wavenumber filter operation of Equation (24b). When spatial scale index k=1, the spatial scale of the discrete wavelet transform is $e_0^1$ and a set of approximation coefficients in temporal and spatial scales, $\{D_{1,r}^{m,n}\}$, output from low pass wavenumber filter 1904 corresponds to a low wavenumber range 1905, and a set of wavelet coefficients in temporal and spatial scales, $\{C_{1,r}^{m,n}\}$, output from high pass wavenumber filter 1906 correspond to a high wavenumber range 1907. The set $\{C_{1,r}^{m,n}\}$, where $r=0, 1, \ldots, 2^{K-1}-1$, is composed of $2^{K-1}$ wavelet coefficients in temporal and spatial scales. When spatial scale index k=2, the spatial scale is $e_0^2 > e_0^1$ and a set of approximation coefficients in temporal and spatial scales, $\{D_{2,r}^{m,n}\}$, output from low pass filter 1908 corresponds to a low wavenumber range 1909, and a set of wavelet coefficients in temporal and spatial scales, $\{C_{2,r}^{m,n}\}$, output from high pass wavenumber filter 1910 corresponds to a high wavenumber range 1911. The set $\{C_{2,r}^{m,n}\}$, where $r=0, 1, \ldots, 2^{K-2}-1$, is composed of $2^{K-2}$ wavelet coefficients in temporal and spatial scales. In the example of FIG. 19, the process is repeated up to spatial scale index k=4=K in which the set of wavelet coefficients in temporal and spatial scales $\{C_{2,r}^{m,n}\}$ corresponds to constituent wavenumbers in the wavenumber range 1912 and the set of approximation coefficients in temporal and spatial scales $\{D_{4,r}^{m,n}\}$ corresponds to constituent wavenumbers in the wavenumber range 1913.

In FIG. 19 and in subsequent figures, the spatial scales are used to denote the wavenumber ranges associated with the sets of wavelet coefficients. Because the set of wavelet coefficients $\{C_{4,r}^{m,n}\}$ and the set of approximation coefficients $\{D_{4,r}^{m,n}\}$ are computed with the same spatial scale $e_0^4$, the spatial scale $e_0^{4'}$ is used to denote the wavenumber range 1913 of the set of approximation coefficients $\{D_{4,r}^{m,n}\}$.

The following pseudocode represents computation of approximation and wavelet coefficients in temporal and spatial scales in temporal and spatial scales:

```
1    for m = 1, ..., M {
2      for n = 0, ..., N - 1 {
3        for r = 0, ..., R - 1 {  \\ r is the trace index
4          D_{0,r}^{m,n} = W_r^{m,n};
5        }
6        for k = 1, ..., K {  \\ k is spatial scale index
7          for r = 0, ..., R - 1 {
8
             D_{k,r}^{m,n} = (1/√2) Σ_{j=0}^{N_j-1} c_j D_{k-1,2r+j}^{m,n};

9
             C_{k,r}^{m,n} = (1/√2) Σ_{j=1}^{N_j} b_j D_{k-1,2r+j}^{m,n};

10        }
11      }
12    }
```

Figure 20:
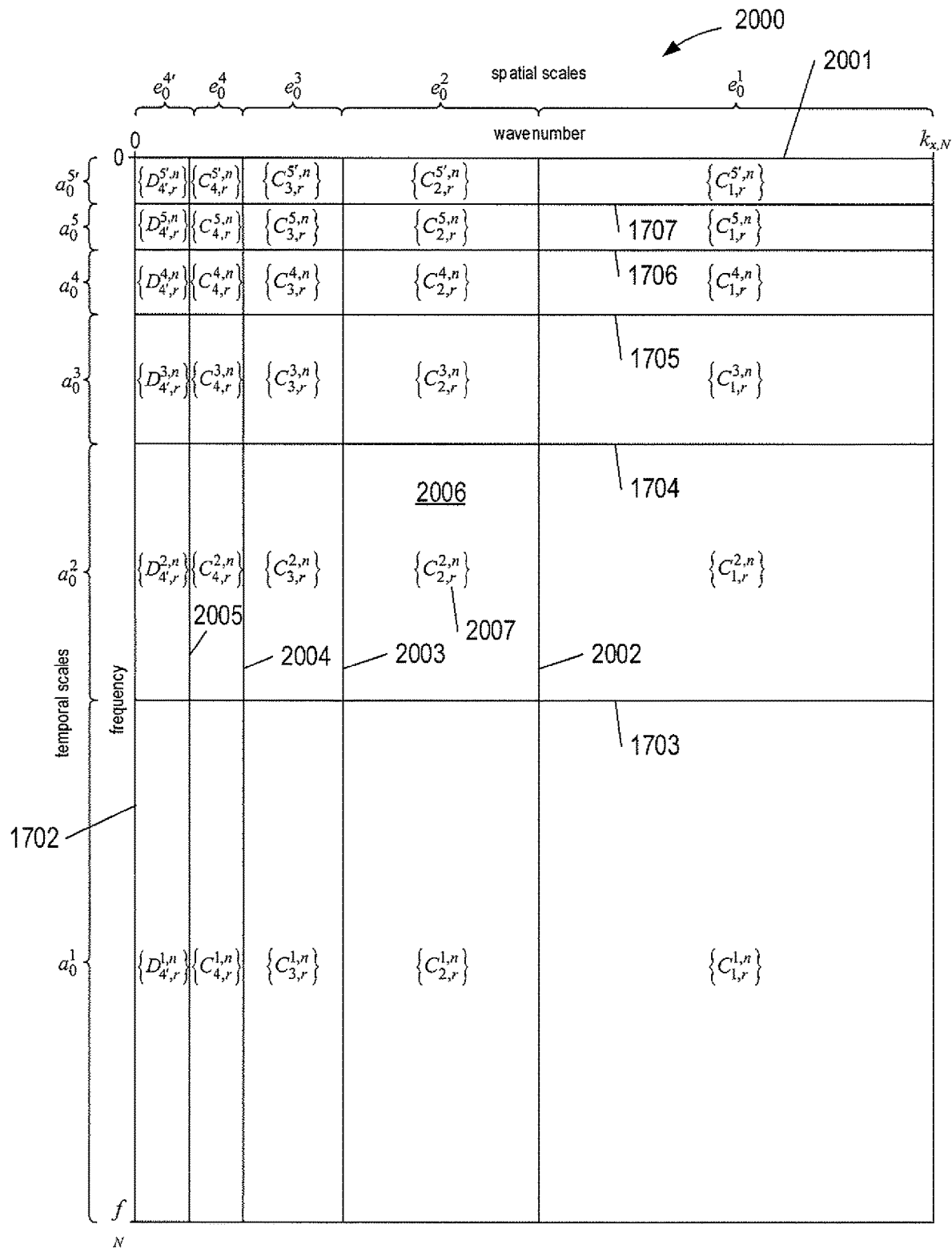
FIG. 20 shows a temporal and spatial scale domain with wavelet coefficients in temporal and spatial scales computed for different temporal and spatial scales.

FIG. 20 shows an example of a temporal and spatial scale domain 2000. Axis 2001 represents wavenumbers. Lines 2002-2005 separate the wavenumber ranges of the spatial scales labeled $e_0^k$, where k=1, 2, 3, 4, 4'. For example, spatial scale $e_0^1$ corresponds to the highest wavenumber range, and spatial scale $e_0^2$ corresponds to the second highest wavenumber range. Each cell, such as cell 2006, represents a temporal and spatial scale denoted by $(a_0^m, e_0^k)$. A set of approximation coefficients or wavelet coefficients is computed for each temporal and spatial scale, as described above with reference to Equations (24a) and (24b) and FIGS. 18 and 19. For example, a set of wavelet coefficients in temporal and spatial scales $\{C_{2,r}^{2,n}\}$ 2006 are computed for temporal and spatial scale $(a_0^2, e_0^2)$ 2006 where $n=0, \ldots, 2^{M-2}-1$ and $r=0, \ldots, 2^{K-2}-1$. The set $\{C_{2,r}^{2,n}\}$ 2007 is composed of $2^{M-2} \times 2^{K-2}$ wavelet coefficients in temporal and spatial scales computed from the wavelet coefficients in temporal scales $W_r^{2,n}$ in the temporal scale $a_0^2$ in FIG. 17 with a spatial scale $e_0^2$. Sets of approximation coefficients $\{D_{k,r}^{m,n}\}$ are in temporal and spatial scales $(a_0^m, e_0^{4'})$, for m=1, 2, 3, 4, 5. Sets of wavelet coefficients $\{C_{k,r}^{5',n}\}$ are in temporal and spatial scales $(a_0^{5'}, e_0^k)$, for k=1, 2, 3, 4. A set of approximation coefficients $\{D_{4,r}^{5',n}\}$ is in temporal and spatial scale $(a_0^{5'}, e_0^{4'})$.

The methods to compute approximation and wavelet coefficients in temporal and spatial scales described above with reference to Equations (16)-(24) and FIGS. (15)-(20) are used to separately compute approximation and wavelet coefficients in temporal and spatial scales in temporal and spatial scales of temporal and spatial scale domains for the cross-ghosted pressure data gather 902 and the cross-ghosted vertical velocity data gather 904.

Figure 21:
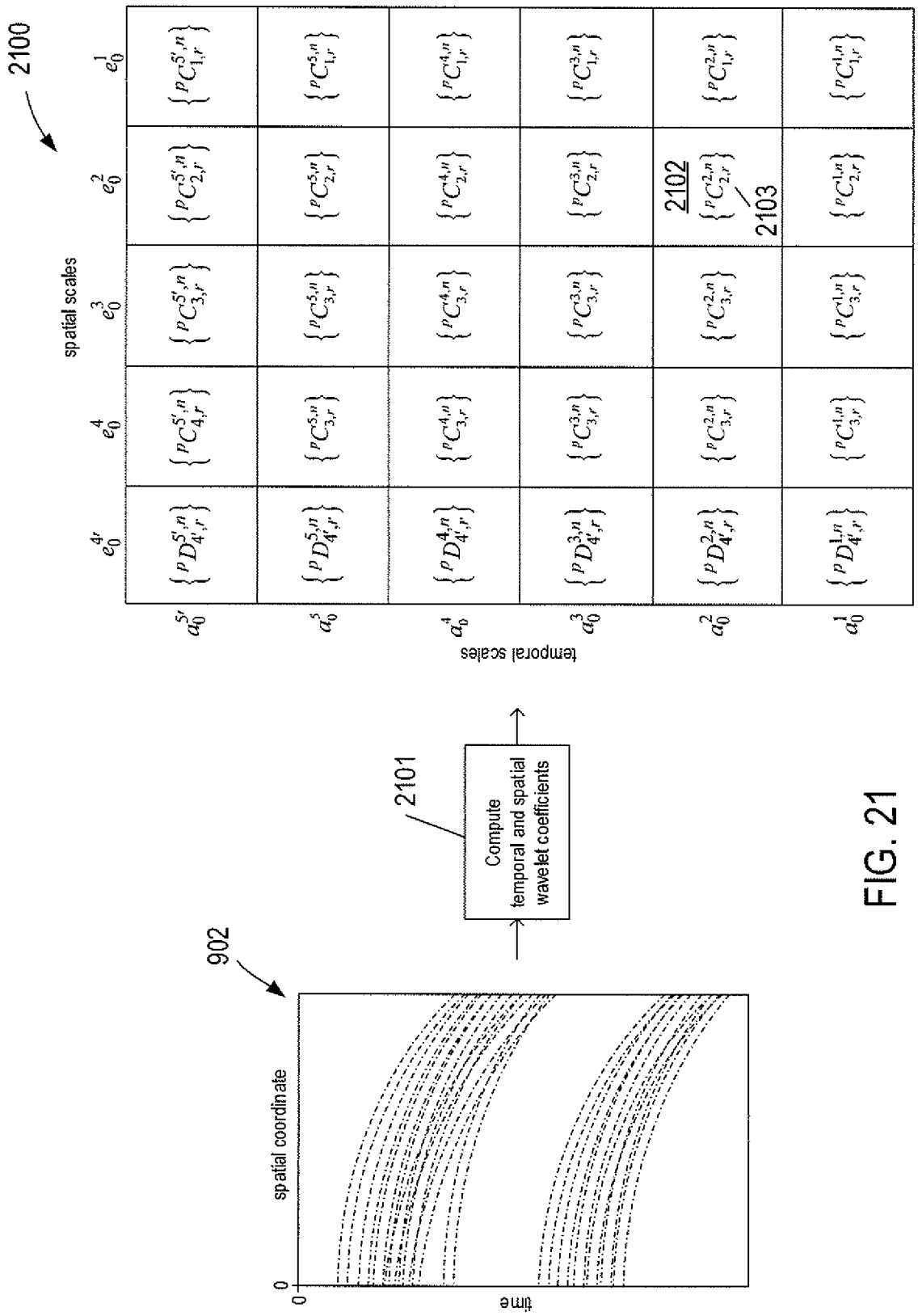
FIG. 21 shows a temporal and spatial scale domain with pressure wavelet coefficients in temporal and spatial scales computed from a gather of cross-ghosted pressure data.

FIG. 21 shows a temporal and spatial scale domain 2100 with pressure wavelet coefficients in temporal and spatial scales computed from the cross-ghosted pressure data gather 902. Block 2101 represents computing approximation and wavelet coefficients in temporal and spatial scales of the temporal and spatial scale domain 2100, as described above with reference to FIGS. 16-20. Each of the temporal and spatial scales $(a_0^m, e_0^k)$, where m=1, 2, 3, 4, 5, 5' and k=1, 2, 3, 4, 4', has a set of pressure wavelet coefficients in temporal and spatial scales, $\{^pC_{k,r}^{m,n}\}$, or a set of, $\{^pD_{k,r}^{m,n}\}$, where the superscript, p, indicates the coefficients are computed from the cross-ghosted pressure data gather 902. For example, a set of wavelet coefficients in temporal and spatial scales, $\{^pC_{2,r}^{2,n}\}$, 2103 are in the temporal and spatial scale $(a_0^2, e_0^2)$ 2102.

Figure 22:
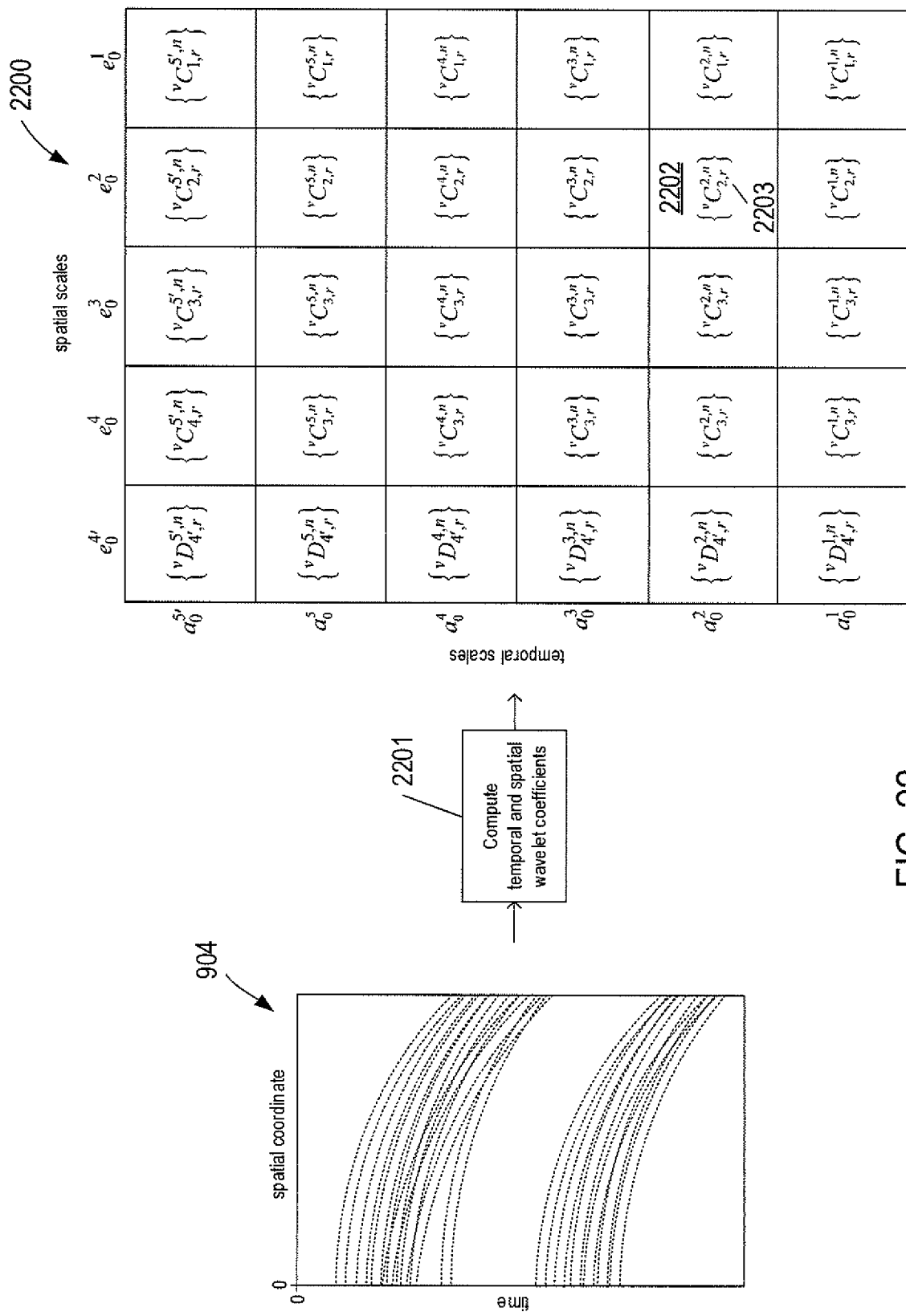
FIG. 22 shows a temporal and spatial scale domain with vertical velocity wavelet coefficients in temporal and spatial scales computed from a gather of cross-ghosted vertical velocity data.

FIG. 22 shows a temporal and spatial scale domain 2200 with vertical velocity wavelet coefficients in temporal and spatial scales computed from the cross-ghosted vertical velocity data gather 904. Block 2201 represents computing approximation and wavelet coefficients in temporal and spatial scales in temporal and spatial scales of the temporal and spatial scale domain 2200, as described above with reference to FIGS. 16-20. Each of the temporal and spatial scales $(a_0^m, e_0^k)$, where m=1, 2, 3, 4, 5, 5' and k=1, 2, 3, 4, 4', has a set of vertical velocity wavelet coefficients in temporal and spatial scales, $\{^vC_{k,r}^{m,n}\}$, or a set of vertical velocity approximation coefficients in temporal and spatial scales, $\{^vD_{k,r}^{m,n}\}$, where the superscript, v, indicates the coefficients are computed from the cross-ghosted vertical velocity data gather 904. For example, a set of wavelet coefficients in temporal and spatial scales, $\{^vC_{2,r}^{2,n}\}$, 2203 are computed in the temporal and spatial scale $(a_0^2, e_0^2)$ 2202.

The cross-ghosted pressure data gather 902 and the cross-ghosted vertical velocity data gather 904 may also be transformed using a Hilbert transform. The Hilbert transform is applied to each trace in the cross-ghosted gathers 902 and 904 and may be represented as a convolution as follows:

$$\tilde{tr}^H(\vec{x}_r, t) = tr(\vec{x}_r, t) * \frac{-1}{\pi t} \tag{25}$$

The discrete Hilbert transform may be represented by $$\tilde{tr}^H(\vec{x}_r, i) = \frac{1}{N} \sum_{n=0}^{N-1} A(\vec{x}_r, t_n)[1-(-1)^{n-i}]\coth\left[\frac{\pi(n-i)}{N}\right] \tag{26}$$

where i=0, . . . , N−1.
The Hilbert transform of Equation (26) may be applied to each trace of cross-ghosted pressure data gather 902 and each trace of the cross-ghosted vertical velocity data gather 904 to obtain a gather of Hilbert transformed cross-ghosted pressure data, $\tilde{p}^H(\vec{x}_r, t)$, and obtain a gather of Hilbert transformed cross-ghosted vertical velocity data, $\tilde{v}_z^H(\vec{x}_r, t)$.

The methods for computing wavelet coefficients in temporal and spatial scales described above with reference to Equations (16)-(24) and FIGS. (15)-(20) may then be used to compute approximation and wavelet coefficients in temporal and spatial scales in temporal and spatial scales of temporal and spatial scale domains for the gather of Hilbert transformed cross-ghosted pressure data $\tilde{p}^H(\vec{x}_r, t)$ and for the gather of Hilbert transformed cross-ghosted vertical velocity data $\tilde{v}_z^H(\vec{x}_r, t)$.

Figure 23:
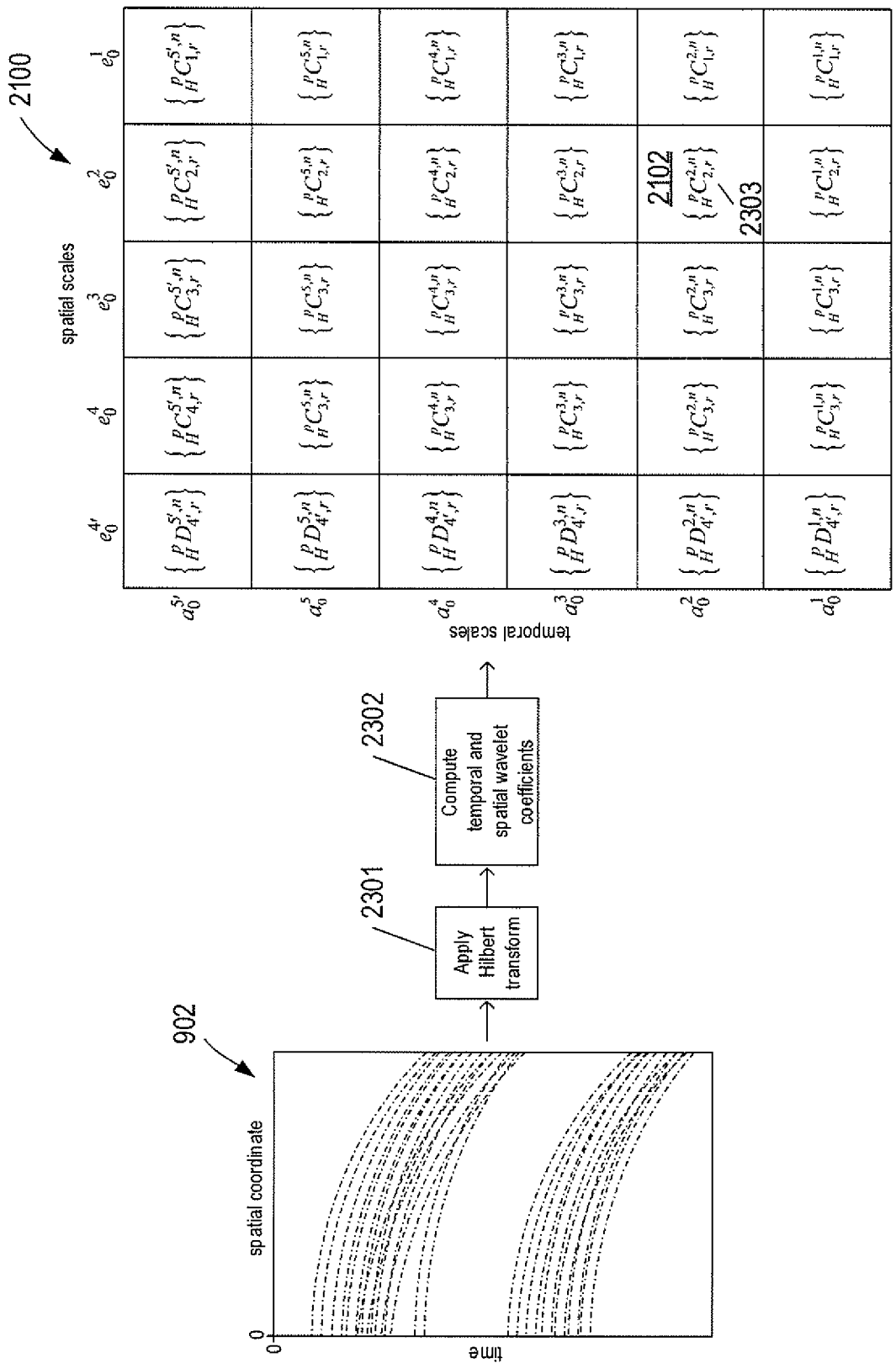
FIG. 23 shows computation of Hilbert transformed pressure approximation and wavelet coefficients in temporal and spatial scales based on cross-ghosted pressure data.

FIG. 23 shows the temporal and spatial scale domain 2100 with approximation and wavelet coefficients in temporal and spatial scales computed for the gather of Hilbert transformed cross-ghosted pressure data, $\tilde{p}^H(\vec{x}_r, t)$. Block 2301 represents transforming the cross-ghosted pressure data gather 902 to obtain a gather of Hilbert transformed cross-ghosted pressure data as described above with reference to Equations (25) and (26). Block 2302 represents computing approximation and wavelet coefficients in temporal and spatial scales of the temporal and spatial scale domain 2100 for Hilbert transformed cross-ghosted pressure data, $\tilde{p}^H(\vec{x}_r, t)$, as described above with reference to FIGS. 16-20. Each of the temporal and spatial scales $(a_0^m, e_0^k)$, where m=1, 2, 3, 4, 5, 5' and k=1, 2, 3, 4, 4', has a set of Hilbert transformed pressure wavelet coefficients in temporal and spatial scales, $\{_H^pC_{k,r}^{m,n}\}$, or a set of Hilbert transformed pressure approximation coefficients in temporal and spatial scales, $\{_H^pD_{k,r}^{m,n}\}$, where the subscript, H, indicates the wavelet coefficients are computed from the Hilbert transformed cross-ghosted pressure data $\tilde{p}^H(\vec{x}_r, t)$. For example, a set of Hilbert transformed pressure wavelet coefficients, $\{_H^pC_{2,r}^{2,n}\}$, 2303 are in the temporal and spatial scale $(a_0^2, e_0^2)$ 2102.

Figure 24:
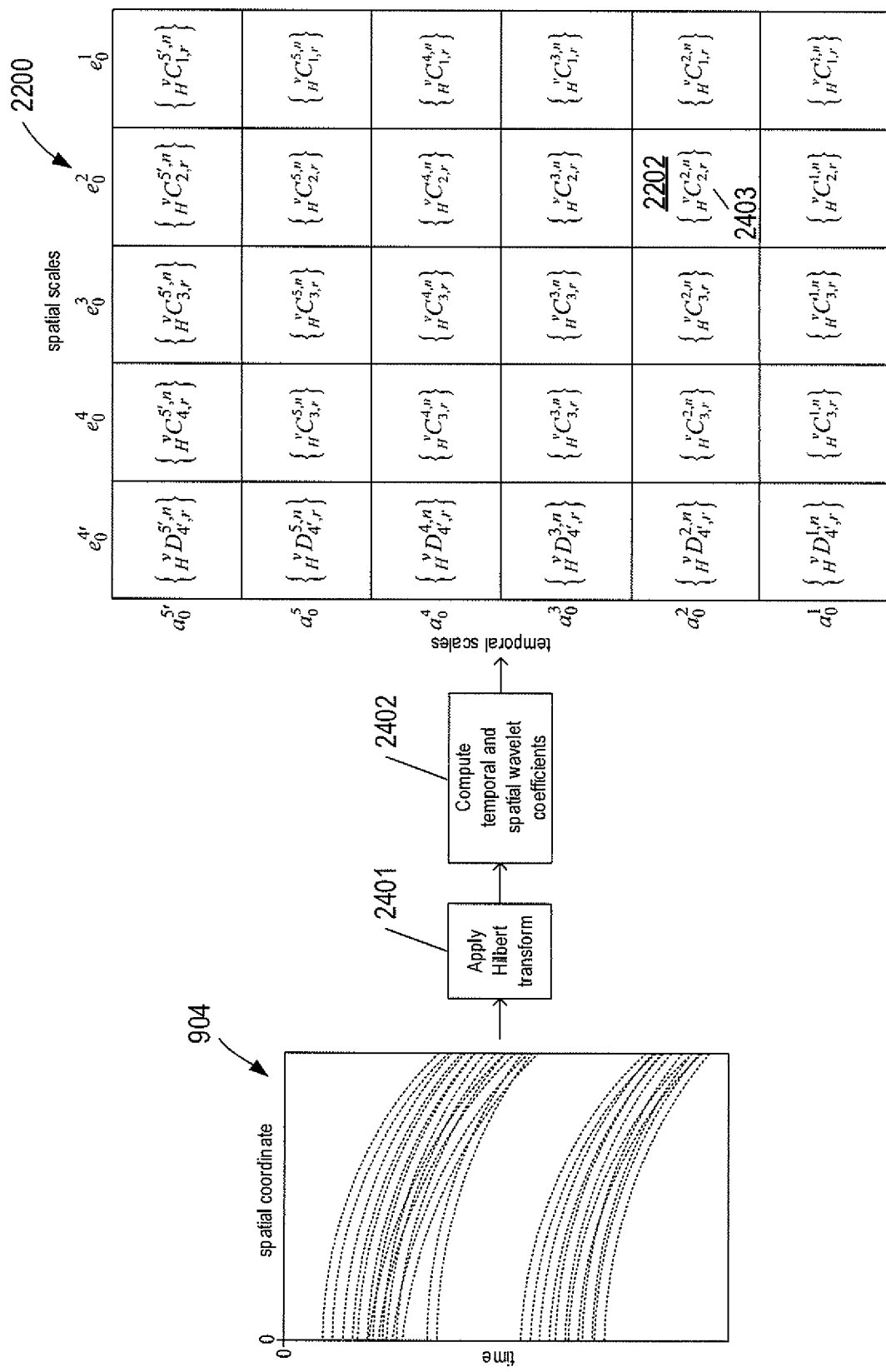
FIG. 24 shows computation of Hilbert transformed particle motion approximation and wavelet coefficients in temporal and spatial scales based on cross-ghosted particle motion data.

FIG. 24 shows the temporal and spatial scale domain 2200 with approximation and wavelet coefficients in temporal and spatial scales computed for Hilbert transformed cross-ghosted vertical velocity data, $\tilde{v}_z^H(\vec{x}_r, t)$. Block 2401 represents transforming the cross-ghosted vertical velocity data gather 904 to obtain Hilbert transformed cross-ghosted vertical velocity data as described above with reference to Equations (25) and (26). Block 2402 represents computing approximation and wavelet coefficients in temporal and spatial scales of the temporal and spatial scale domain 2200 for Hilbert transformed cross-ghosted vertical velocity data, $\tilde{v}_z^H(\vec{z}_r, t)$, as described above with reference to FIGS. 16-20. Each of the temporal and spatial scales $(a_0^m, e_0^k)$, where m=1, 2, 3, 4, 5 and k=1, 2, 3, 4, has a set of Hilbert transformed vertical velocity wavelet coefficients in temporal and spatial scales, $\{_H^vC_{k,r}^{m,n}\}$, or a Hilbert transformed vertical velocity approximation coefficients in temporal and spatial scales, $\{_H^vD_{k,r}^{m,n}\}$, computed from the Hilbert transformed cross-ghosted vertical velocity data $\tilde{v}_z^H(\vec{x}_r, t)$. For example, a set of Hilbert transformed vertical velocity wavelet coefficients, $\{_H^vC_{2,r}^{2,n}\}$, 2403 are computed in the temporal and spatial scale $(a_0^2, e_0^2)$ 2202.

Pressure energies may be computed in each of the temporal and spatial scales of the temporal and spatial scale domain based on the approximation and wavelet coefficients in each of the temporal and spatial scales. For each temporal and spatial scale in the temporal and spatial scale domain, a set of pressure energies may be computed from a set of pressure wavelet coefficients in temporal and spatial scales, $\{^pC_{k,r}^{m,n}\}$, and a corresponding set of Hilbert transformed pressure wavelet coefficients in temporal and spatial scales, $\{_H^pC_{k,r}^{m,n}\}$, as follows:

$$^{P}E_{k,r}{}^{m,n} = \sqrt{(^{P}C_{k,r}{}^{m,n})^2 + (^{P}_{H}C_{k,r}{}^{m,n})^2} \quad (27a)$$

for n=0, ..., $2^{M-m}-1$ and r=0, ..., $2^{K-k}-1$.

A set of pressure energies may be computed from a set of pressure approximation coefficients in temporal and spatial scales, $\{^{P}D_{k,r}{}^{m,n}\}$, and a corresponding set of Hilbert transformed pressure approximation coefficients in temporal and spatial scales, $\{^{P}_{H}D_{k,r}{}^{m,n}\}$, as follows:

$$^{P}E_{k,r}{}^{m,n} = \sqrt{(^{P}D_{k,r}{}^{m,n})^2 + (^{P}_{H}D_{k,r}{}^{m,n})^2} \quad (27b)$$

for n=0, ..., $2^{M-m}-1$ and r=0, ..., $2^{K-k}-1$.

FIG. 25 shows the temporal and spatial scale domain 2100 with a set of pressure energies computed for each temporal and spatial scale as described above with reference to Equations (27a) and (27b). For example, a set of pressure energies $\{^{P}E_{k,r}{}^{m,n}\}$ 2501 in temporal and spatial scale 2102 is computed from the set of wavelet coefficients in temporal and spatial scales, $\{^{P}C_{2,r}{}^{2,n}\}$, 2103 in FIG. 21 and the set of Hilbert transformed pressure wavelet coefficients in temporal and spatial scales, $\{^{P}_{H}C_{2,r}{}^{2,n}\}$, 2303 in FIG. 23 in accordance with Equation (27a).

Vertical velocity energies may be computed in each of the temporal and spatial scales of the temporal and spatial scale domain based on the approximation and wavelet coefficients in each of the temporal and spatial scales. For each temporal and spatial scale in the temporal and spatial scale domain, a set of vertical velocity energies may be computed from a set of vertical velocity wavelet coefficients in temporal and spatial scales, $\{^{v}C_{k,r}{}^{m,n}\}$, and a corresponding set of Hilbert transformed vertical velocity wavelet coefficients in temporal and spatial scales, $\{^{v}_{H}C_{k,r}{}^{m,n}\}$, as follows:

$$^{v}E_{k,r}{}^{m,n} = \sqrt{(^{v}C_{k,r}{}^{m,n})_2 + (^{v}_{H}C_{k,r}{}^{m,n})^2} \quad (28a)$$

for n=0, ..., $2^{M-m}-1$ and r=0, ..., $2^{K-k}-1$.

A set of vertical velocity energies may be computed from a set of vertical velocity approximation coefficients in temporal and spatial scales, $\{^{v}D_{k,r}{}^{m,n}\}$, and a corresponding set of Hilbert transformed vertical velocity approximation coefficients in temporal and spatial scales, $\{^{v}_{H}D_{k,r}{}^{m,n}\}$, as follows:

$$^{v}E_{k,r}{}^{m,n} = \sqrt{(^{v}D_{k,r}{}^{m,n})^2 + (^{v}_{H}D_{k,r}{}^{m,n})^2} \quad (28b)$$

for n=0, ..., $2^{M-m}-1$ and r=0, ..., $2^{K-k}-1$

FIG. 26 shows the temporal and spatial scale domain 2200 with a set of vertical velocity energies computed for each temporal and spatial scale as described above with reference to Equations (28a) and (28b). For example, a set of vertical velocity energies $\{^{v}E_{k,r}{}^{m,n}\}$ 2601 in temporal and spatial scale 2202 is computed from the set of vertical velocity wavelet coefficients in temporal and spatial scales, $\{^{v}C_{2,r}{}^{2,n}\}$, 2203 in FIG. 22 and the set of Hilbert transformed vertical velocity wavelet coefficients in temporal and spatial scales, $\{^{v}_{H}C_{2,r}{}^{2,n}\}$, 2403 in FIG. 24 in accordance with Equation (28a).

The pressure energies in each temporal and spatial scale $(a_0^m, e_0^k)$ are compared with the vertical velocity energies in a corresponding temporal and spatial scale $(a_0^m, e_0^k)$ using a pressure counter, $B^p(m, k)$, a vertical velocity counter, $B^v(m, k)$, and a balance counter, $B^b(m, k)$. The pressure counter keeps track of the number of pressure energies that are greater than the vertical velocity energies. The vertical velocity counter keeps track of the number of vertical velocity energies that are greater than pressure energies. The balance counter keeps track of the number the pressure energies and vertical velocity energies that are approximately equal.

The pressure counter, vertical velocity counter, and balance counter associated with a temporal and spatial scale $(a_0^m, e_0^k)$ are updated as follows. For each index n and index r, when $$|^{v}E_{k,r}{}^{m,n} - ^{P}E_{k,r}{}^{m,n}| < \delta \quad (29a)$$

where $\delta$ is a small number (e.g., $\delta=0.01$), the pressure energy $^{P}E_{k,r}{}^{m,n}$ is approximately equal to the vertical velocity energy $^{v}E_{k,r}{}^{m,n}$. As result, a value "0" is added to the pressure counter $B^p(m, k)$, a value "0" is added to the vertical velocity counter $B^v(m, k)$, and a value "0.5" is added to the balance counter $B^b(m, k)$.

Alternatively, when the condition in Equation (29a) is not satisfied and $$^{P}E_{k,r}{}^{m,n} > ^{v}E_{k,r}{}^{m,n} \quad (29b)$$

a value "0" is added to the pressure counter $B^p(m, k)$, a value "1" is added to the vertical velocity counter $B^v(m, k)$; and a value "0" is added to the balance counter $B^b(m, k)$. For example, the value "1" indicates that the vertical velocity wavelet coefficient contains less noise while a value of "0" indicates that the pressure wavelet coefficient contains more noise.

Alternatively, when the condition in Equation (29a) is not satisfied and $$^{P}E_{k,r}{}^{m,n} < ^{v}E_{k,r}{}^{m,n} \quad (29c)$$

a value "1" is added to the pressure counter $B^p(m, k)$, a value "0" is added to the vertical velocity counter $B^v(m, k)$; and a value "0" is added to the balance counter $B^b(m, k)$. For example, the value "1" indicates that the pressure wavelet coefficient contains less noise while a value of "0" indicates that the vertical velocity wavelet coefficient contains more noise.

In an alternative implementation, the pressure counter is incremented when the pressure energy is greater than the particle motion energy and the vertical velocity counter is incremented when the particle motion energy is greater than the pressure energy.

The counters $B^p(m, k)$, $B^v(m, k)$, and $B^b(m, k)$ may be used as pressure, vertical velocity, and balance energy scores in each temporal and spatial scale as follows:

$$^{p}n_k^m = B^p(m,k) \quad (30a)$$

$$^{v}n_k^m = B^v(m,k) \quad (30b)$$

$$^{b}n_k^m = B^b(m,k) \quad (30c)$$

In an alternative implementation, the counters $B^p(m, k)$, $B^v(m, k)$, and $B^b(m, k)$ may be averaged in order to obtain pressure, vertical velocity, and balance energy scores in each temporal and spatial scale as follows:

$$^{p}n_k^m = \frac{B^p(m,k)}{2^{M-m}+2^{K-k}} \quad (31a)$$

$$^{v}n_k^m = \frac{B^v(m,k)}{2^{M-m}+2^{K-k}} \quad (31b)$$

$$^{b}n_k^m = \frac{B^b(m,k)}{2^{M-m}+2^{K-k}} \quad (31c)$$

Figure 27:
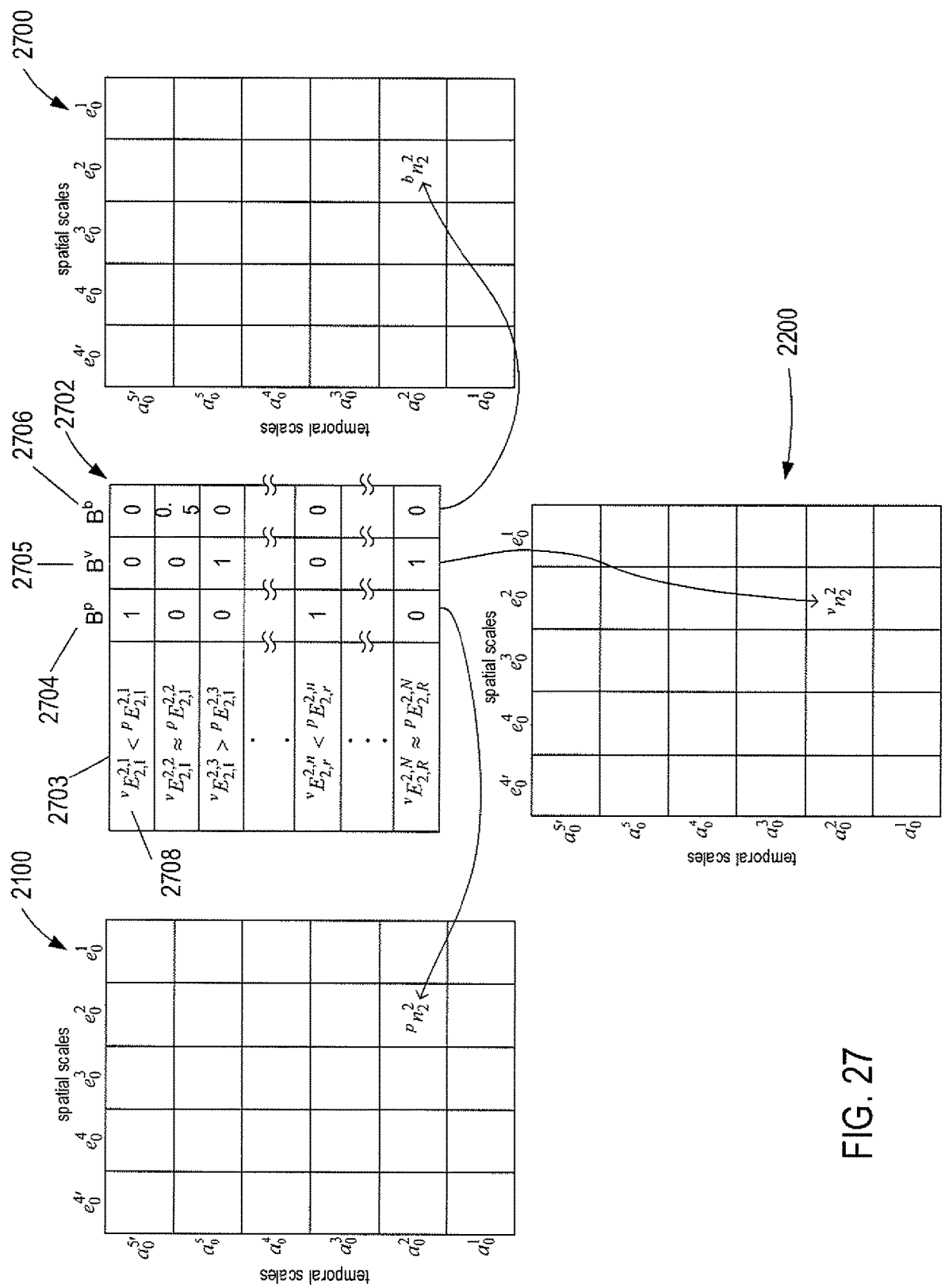
FIG. 27 shows an example of pressure, vertical velocity and balance energy scores.

FIG. 27 shows an example of determining pressure, vertical velocity, and balance energy scores for the temporal and spatial scale $(a_0^2, e_0^2)$ in the pressure and vertical velocity temporal and spatial scale domains 2100 and 2200 and a temporal and spatial domain 2700 for the balance energy scores. Table 2702 includes a column 2703 of cells in which the pressure and vertical velocity energies associated with the temporal and spatial scale $(a_0^2, e_0^2)$ are compared. Table 2702 includes columns 2704-2706 with cells that contain the values assigned to a pressure counter $B^p(2,2)$, a vertical velocity counter $B^v(2,2)$, and a balance counters $B^b(2,2)$ based on the relative magnitude of the pressure and vertical velocity energies in column 2703. For example, in cell 2708, $^vE_{2,1}^{2,1} < {}^pE_{2,1}^{2,1}$ results in a value "1" added to the pressure counter $B^p(2,2)$ and a value "0" is added to the vertical velocity and balance counters $B^v(2,2)$ and $B^b(2,2)$, respectively. The values in the counters $B^p(2,2)$, $B^v(2,2)$ and $B^b(2,2)$ may be averaged according to Equations (31a)-(31c) to obtain a pressure energy score ${}^p n_2^2$, a vertical velocity energy score ${}^v n_2^2$, and a balance energy score ${}^b n_2^2$, respectively.

FIGS. 28A-28C show separate example representative pressure, vertical velocity, and balance energy scores, respectively, for each of the temporal and spatial scales in the temporal and spatial domains 2100, 2200, and 2700. The pressure, vertical velocity, and balance energy scores in the same temporal and spatial scales may be compared to evaluate noise is seismic data collected in a shot a record. Alternatively, the pressure, vertical velocity, and balance energy scores in same temporal and spatial scales may be compared for two or more shot records in order to evaluate how noise may be changing along a sail line.

The energy scores may be compared in order to identify which of the pressure and vertical velocity data contains less overall noise by computing an overall average energy score for the pressure and vertical velocity energy scores:

$$Ave(x) = \frac{1}{M+K} \sum_{m=1}^{M} \sum_{k=1}^{K} {}^x n_k^m \qquad (32)$$

where x denotes "p," "v," and "b";

For example, the pressure energy scores of the temporal and spatial scales in FIG. 28A may be averaged to obtain Ave(p) and the vertical velocity scores of the temporal and spatial scales in FIG. 28B may be averaged to obtain Ave(v). When Ave(p)>Ave(v), the pressure data contains less overall noise than the vertical velocity data, and when Ave(p)<Ave(v), the pressure data contains more overall noise than the vertical velocity data.

The energy scores associated with individual temporal and spatial scales may be compared in order to identify which of the pressure and vertical velocity data contains less noise in individual temporal and spatial scales and the results may be reported, such as displayed on a monitor or other display device. When ${}^p n_k^m > {}^v n_k^m$ for temporal and spatial scale $(a_0^m, e_0^k)$, the pressure data contains less noise than the vertical velocity data over the frequency and wavenumber range associated with the temporal and spatial scale $(a_0^m, e_0^k)$. When ${}^p n_k^m < {}^v n_k^m$ for temporal and spatial scale $(a_0^m, e_0^k)$, the pressure data contains more noise than the vertical velocity data over the frequency and wavenumber range associated with the temporal and spatial scale $(a_0^m, e_0^k)$. When ${}^p n_k^m \approx {}^v n_k^m$ in temporal and spatial scale $(a_0^m, e_0^k)$, the pressure data and the vertical velocity data are balanced and have about the same amount of noise over the frequency and wavenumber range associated with the temporal and spatial scale $(a_0^m, e_0^k)$.

The energy scores of a shot record may also be compared with the energy scores of a future or previous shot record and the results may be reported, such as displayed on a monitor or other display device. Comparisons between different shot records may be used to monitor how noise is changing during a marine survey or how noise changes in response to changes in the marine survey. For example, let Ave($p_1$) be an average overall energy score for the pressure data obtained in a first shot record and let Ave($p_2$) be an average overall energy score for the pressure data obtained in a second shot record. When Ave($p_1$)>Ave($p_2$), the pressure data obtained in the first shot record contains less noise than the pressure data obtained in the second shot record, which may be an indication that noise is increasing. On the other hand, when Ave($p_1$)<Ave($p_2$), the pressure data obtained in the first shot record contains more noise than the pressure data obtained in the second shot record, which may be an indication that noise levels are decreasing, perhaps as a result of changes in the survey. Analogous comparisons may be made with the vertical velocity energy scores obtained for two shot records.

Comparisons may also be made with respect to temporal and spatial scales for different shot records. The energy scores associated with certain temporal and spatial scales may be compared over a number of shot records in order to identify trends. For example, let ${}^p n_k^m(p_1)$ be a pressure energy score in a particular temporal and spatial scale associated with a first shot record, let ${}^p n_k^m(p_2)$ be a pressure energy score in the same temporal and spatial scale associated with a second shot record, and let ${}^p n_k^m(p_3)$ be a pressure energy score in the same temporal and spatial scale associated with a third shot record. When ${}^p n_k^m(p_1) > {}^p n_k^m(p_2) > {}^p n_k^m(p_3)$, the noise associated with the pressure data in the temporal and spatial scale $(a_0^m, e_0^k)$ is increasing. By contrast, when ${}^p n_k^m(p_1) < {}^p n_k^m(p_2) < {}^p n_k^m(p_3)$, the noise associated with the pressure data in the temporal and spatial scale $(a_0^m, e_0^k)$ is decreasing. Analogous comparisons may be made with the vertical velocity energy scores obtained for three shot records In order to improve the efficiency of marine surveys and/or the quality of the seismic data acquired, survey parameters of an ongoing marine survey may be adjusted in response to the pressure and vertical velocity energy scores as follows:

(1) The adjustments may be selective in nature. In other words, no change is made to the actual practice of acquiring a seismic data along a sail line, but the pressure energy scores and vertical velocity energy scores may be used to determine whether the data can be accepted after seismic data has been collected along the sail line. For example, when the pressure energy scores or vertical velocity energy scores in a temporal and spatial scale or combination of temporal and spatial scales fall below a threshold for one or more consecutive shot records, the seismic data may be accepted or rejected and discarded, and the survey vessel may be steered on a different course based on this decision.

(2) The adjustments may be to the manner in which operations are conducted and acquisition equipment is maintained. For example, the balance of the pressure energy scores versus the vertical velocity energy scores in certain temporal and spatial scales or combinations of temporal and spatial scales may change over the course of the survey as a noise problem develops. As a result, the speed of the survey vessel may be adjusted to maintain the desired balance in the temporal and spatial scales. In addition, the balance of the pressure energy scores versus vertical velocity energy scores in certain temporal and spatial scales or combination of temporal spatial scales may change because of degradation of a particular area of streamer. As a result, cleaning or replacement of particular equipment, such as receivers, can be correctly prioritized.

(3) The adjustments may be made to the design of the survey configuration such that geophysical properties of the survey are modified. For example, the temporal scale in which the pressure energy scores and vertical velocity scores are balanced may move to a higher-frequency scale as a noise problem develops. In response, the streamer depth profile is moved shallower, so that the receiver notches move correspondingly higher and pressure deghosting is possible at higher frequencies than would otherwise be the case.

(4) The adjustments may be made to treatment of noise during seismic data processing. For example, the vertical velocity energy scores in certain temporal and spatial scales may indicate that the vertical velocity noise may be reduced by more aggressive statistical attenuation than would otherwise be applied. In addition, at each temporal and spatial scale the pressure energy scores and vertical velocity scores may be used as indicators to guide the weighting of pressure and vertical velocity measurements at each temporal and spatial scale in subsequent processing.

Figure 29:
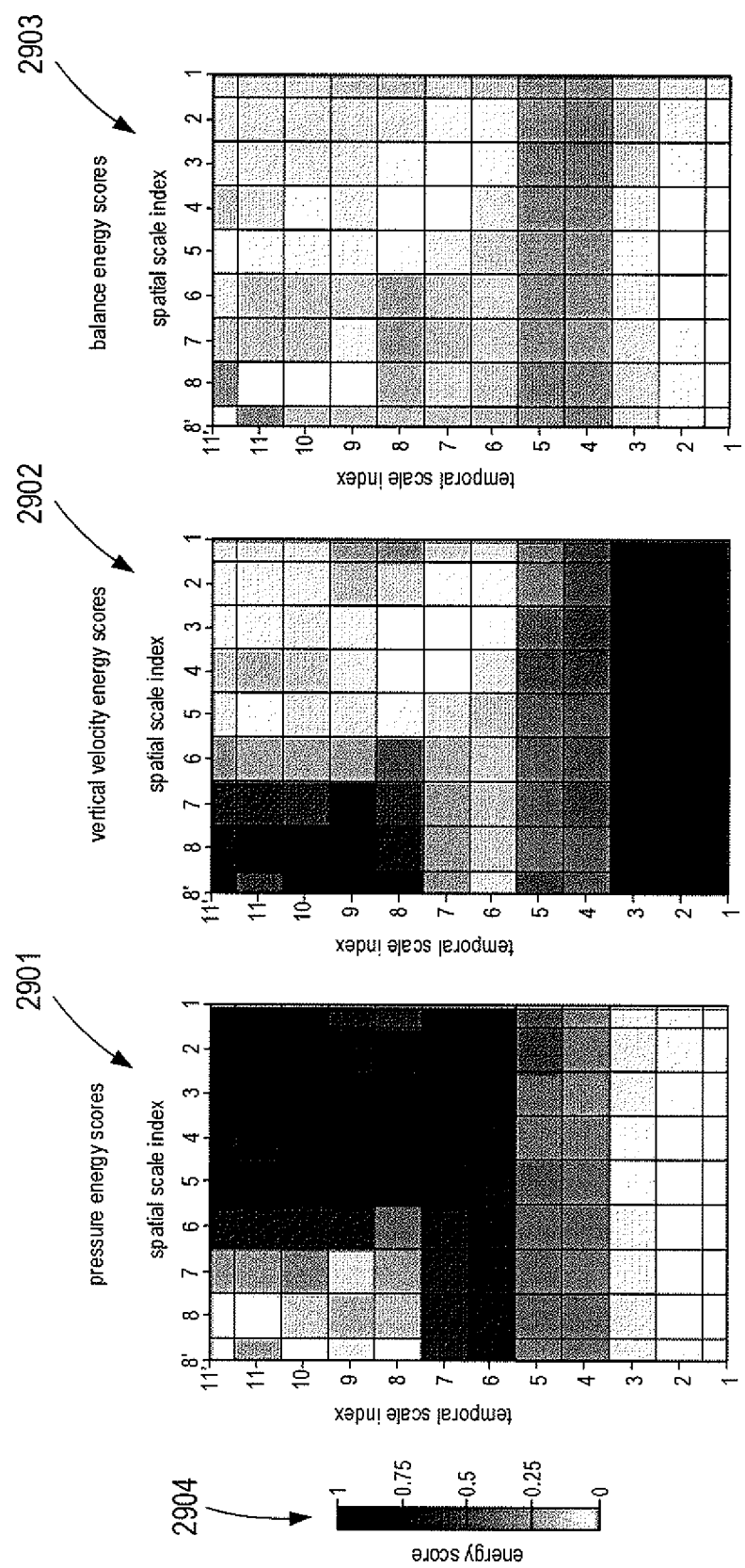
FIG. 29 shows example pressure, vertical velocity, and balance energy scores for pressure data and vertical velocity data obtained in a first shot record.

FIG. 29 shows example pressure energy scores 2901, vertical velocity energy scores 2902, and balance energy scores 2903 obtained as described above from pressure data and vertical velocity data generated by collocated pressure and particle motion sensors in a first shot record. Note that for the sake of illustration, the temporal and spatial scales are drawn with the same frequency and wavenumber ranges. For example, even though temporal scale indices 3, 4, and 5 appear to have the same frequency ranges, temporal scale index 5 corresponds to a frequency range of 8-16 Hz, temporal scale index 4 corresponds to a frequency range of 16-32 Hz, and temporal scale index 3 corresponds to a frequency range 32-64 Hz. A gray scale 2904 represents a continuous range of energy scores with higher energy scores represented by darker shades of gray, and lower energy scores are represented by lighter shades of gray. Darker shaded temporal and spatial scales indicate less noise is present, while lighter shaded temporal and spatial scales indicate more noise is present. In the example of FIG. 29, the temporal and spatial scales with temporal scale indices 4 and 5 are gray for both the pressure and vertical velocity energy scores 2901 and 2902, which indicates the pressure and vertical velocity data contain about the same amount of noise in the 8-32 Hz frequency range. Darker shaded temporal and spatial scales with temporal scale indices 2 and 3 of the vertical velocity energy scores indicate that the vertical velocity data contains less noise than the pressure data over the range of frequencies 32-128 Hz.

Figure 30:
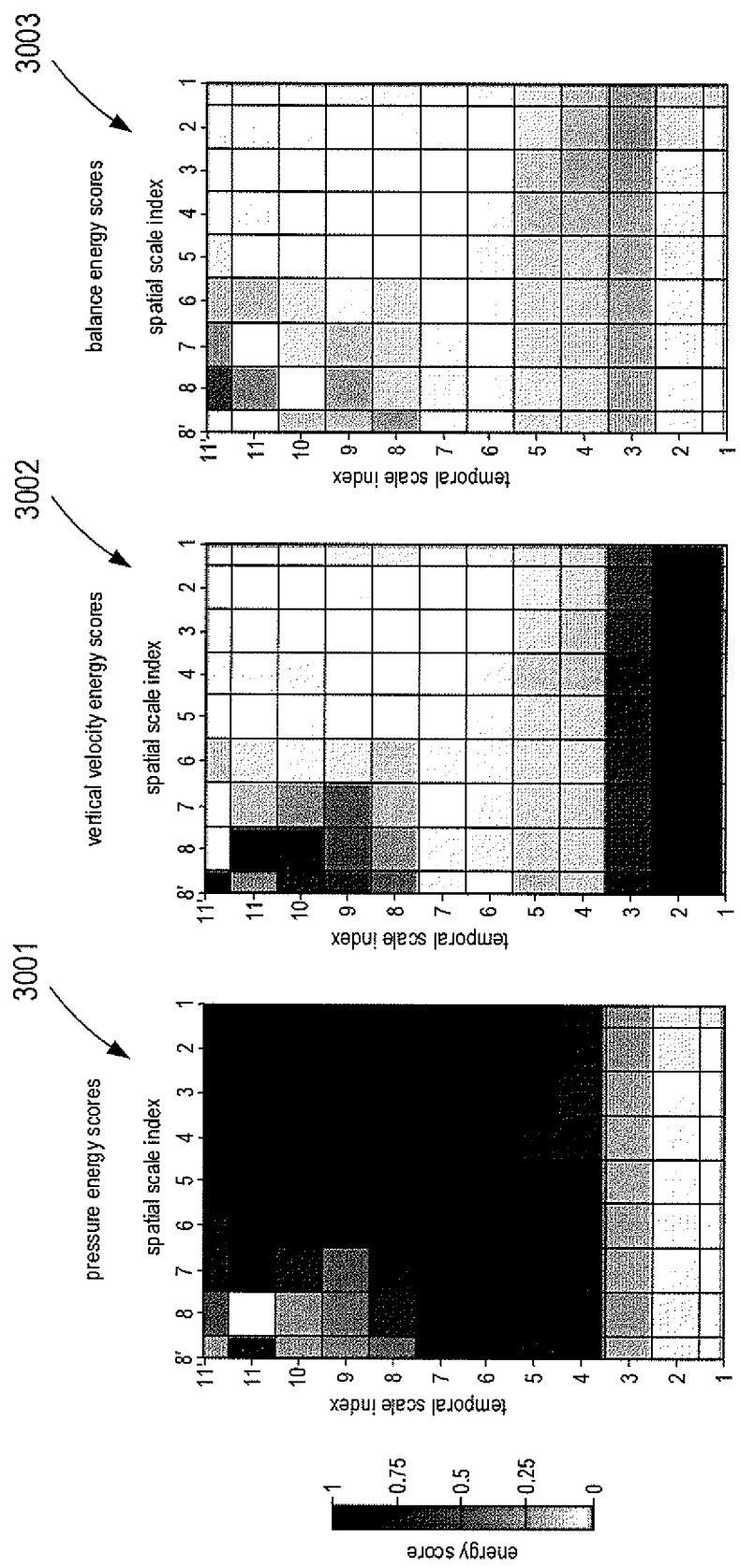
FIG. 30 shows example pressure, vertical velocity, and balance energy scores for pressure data and vertical velocity data obtained in a second shot record.

FIG. 30 shows example pressure energy scores 3001, vertical velocity energy scores 3002, and balance energy scores 3003 obtained as described above from pressure data and vertical velocity data generated by collocated pressure and particle motion sensors in a second shot record. For example, the energy scores 3001-3003 may have been obtained using the same pressure and particle motions sensors used to generate the energy scores 2901-2903 in FIG. 29. In the example of FIG. 30, the temporal and spatial scales with temporal scale indices 4 and 5 are darker for the pressure energy scores 3001 than for the vertical velocity energy scores 3002, which indicates the pressure data contains less noise than the vertical velocity data in the 8-32 Hz frequency range.

Comparison of FIGS. 29 and 30 reveals that temporal scale indices 4 and 5 of the pressure energy scores 3001 are darker than the corresponding temporal scale indices 4 and 5 of the pressure energy scores 2901, which indicates that pressure data obtained in the second shot record has less noise than the pressure data obtain in the first shot record over the frequency range of about 8-32 Hz. Comparison of vertical velocity energy scores 2902 and 3002 also reveals that while traveling a sail line, the noise in the vertical velocity data has increased, as indicated by lighter shading in temporal scale indices 4 and 5 of vertical velocity energy scores 3002 than for the same temporal scale indices 4 and 5 in vertical velocity energy scores 2902. The noise in temporal scale index 3 in pressure energy scores 3001 and vertical velocity energy scores 3002 indicates that noise is more evenly distributed between the pressure and vertical velocity data for the second shot record.

Evaluation of the energy scores in FIGS. 29 and 30 may translate into towing the streamers shallower in order to move the hydrophone spectral notch to a higher frequency. For example, the streamers may be towed at a depth of 20 meters below the free surface so that a first notch in the spectral domain of the pressure data is greater than 32 Hz. Further evaluation of the energy scores in FIGS. 29 and 30 may also translate into a decision to slow the speed of the survey vessel in order to decrease vertical velocity sensor noise observed in temporal scale indices 4 and 5 of the vertical velocity energy scores 3002. Alternatively, a decision may be to maintain the survey setup but target noise removal in the frequency ranges associated with temporal scale indices 4 and 5 using seismic data processing of the pressure and vertical velocity data obtained in the second shot record.

Figure 31:
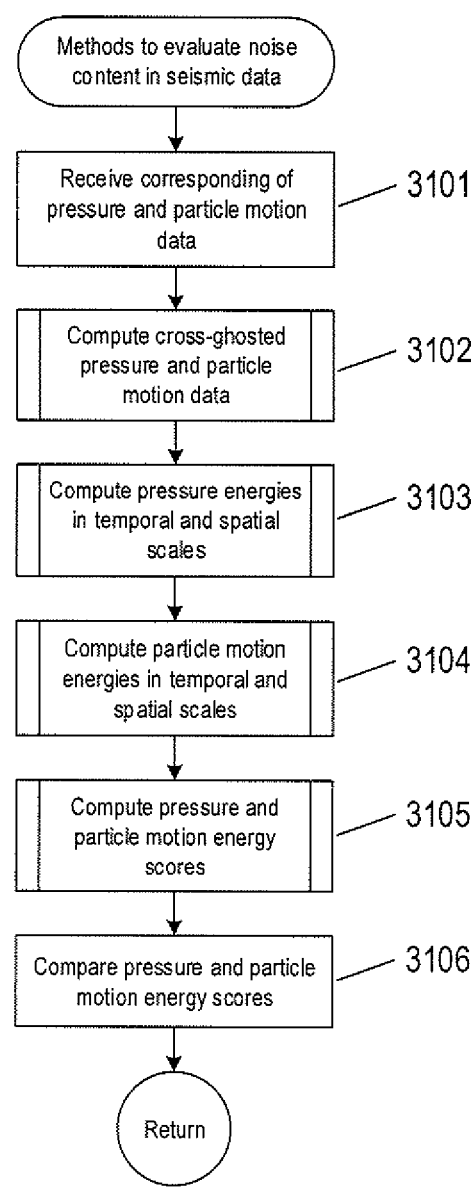
FIG. 31 shows a control-flow diagram of a method to evaluate noise content in seismic data.

FIG. 31 shows a control-flow diagram of a method to evaluate noise content in seismic data. In block 3101, pressure and particle motion data are received. The pressure and particle motion data may be composed of traces of pressure and particle motion data generated by collocated pressure and particle motion sensors of a seismic data acquisition system. In block 3102, a routine "compute cross-ghost pressure and particle motion data" is called to cross-ghost the pressure data and particle motion data. In block 3103, a routine "compute pressure energies in temporal and spatial scales" is called to compute pressure energies based on the cross-ghosted pressure data. In block 3104, a routine "compute particle motion energies in temporal and spatial scales" is called to compute particle motion energies based on the cross-ghosted particle motion data. In block 3105, a routine "compute pressure and particle motion energy scores" is called to compute pressure energy scores based on the pressure energies and compute particle motion energy scores based on the particle motion energies. In block 3106, the pressure and particle motion energy scores are compared and may be compared with pressure and particle motion energy scores of previous shot records, as described above with reference to FIGS. 29 and 30.

Figure 32:
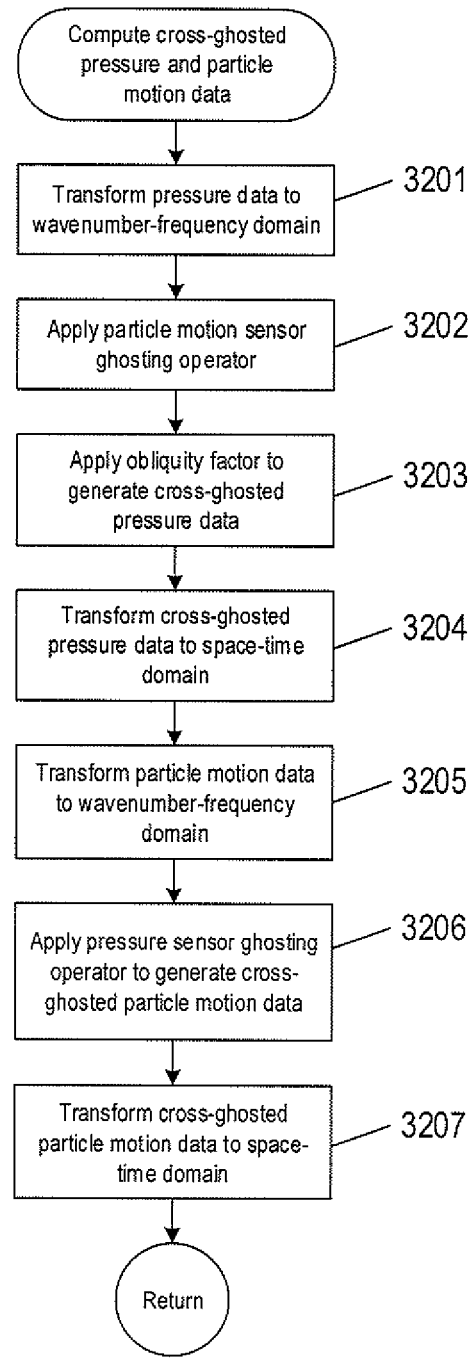
FIG. 32 shows a control-flow diagram of the routine "compute cross-ghosted pressure and vertical velocity data" called in FIG. 31.

FIG. 32 shows a control-flow diagram of the routine "compute cross-ghosted pressure and particle motion data" called in block 3102 of FIG. 31. In block 3201, the pressure data is transformed to the w-f domain using an FFT or a DFT, as described above with reference to Equation (2). In block 3202, a particle motion sensor ghosting operator is applied as described above with reference to Equations (3) and (4). In block 3203, an obliquity factor is applied as described above with reference to Equations (3) and (5). In block 3204, cross-ghosted pressure data is transformed form the w-f domain to the s-t domain using an IFFT or an IDFT, as described above with reference to Equation (8). In block 3205, the particle motion data is transformed from to the w-f domain. In block 3206, pressure sensor ghosting operator is applied to the particle motion data to generate cross-ghosted particle motion data, as described above with reference to Equation (7). In block 3207, the cross-ghosted particle motion data is transformed from the w-f domain to the s-t domain.

Figure 33:
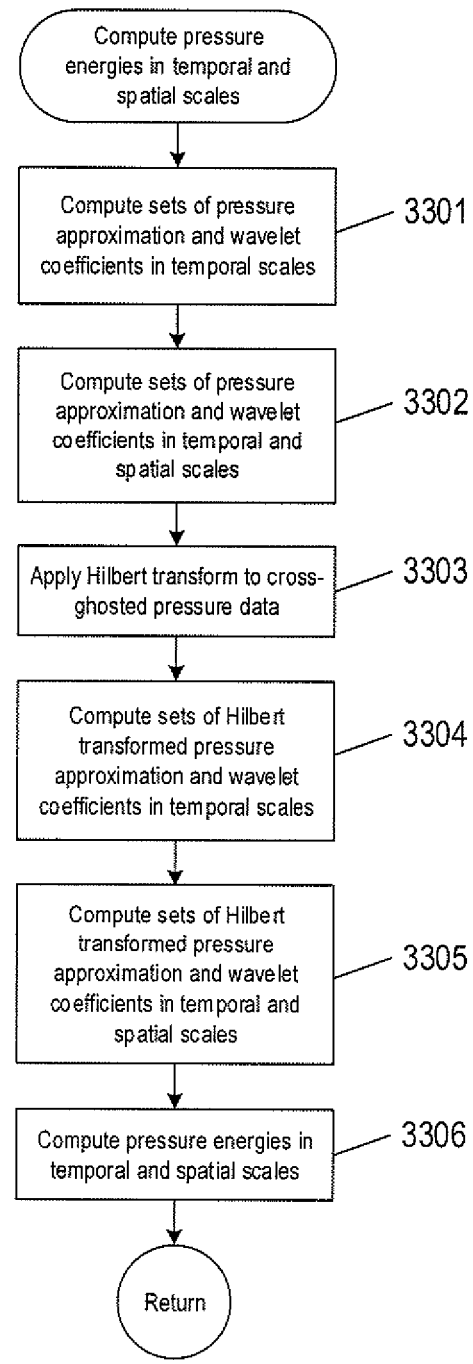
FIG. 33 shows a control-flow diagram of the routine "compute pressure energies in temporal and spatial scales" called in FIG. 31.

FIG. 33 shows a control-flow diagram of the routine "compute pressure energies in temporal and spatial scales" called in block 3102 of FIG. 31. In block 3301, a set of pressure approximation coefficients in a temporal scale and sets of pressure wavelet coefficients in temporal scales for each trace of the cross-ghosted pressure data, as described above with reference to FIGS. 15-17. In block 3302, sets of pressure approximation coefficients in temporal and spatial scales and sets of pressure wavelet coefficients in temporal and spatial scales are computed based on the sets of pressure approximation coefficients in temporal scales and sets of pressure wavelet coefficients in the temporal scales computed in block 3301, as described above with reference to FIG. 18-20 and FIG. 21. In block 3303, a Hilbert transformation is applied to the cross-ghosted pressure data to compute Hilbert transformed cross-ghosted pressure data, as described above with reference to Equations (25) and (26). In block 3304, a set of Hilbert transformed pressure approximation coefficients in a temporal scale and sets of Hilbert transformed pressure wavelet coefficients in temporal scales are computed for each trace in the Hilbert transformed cross-ghosted pressure data as described above with reference to FIGS. 15-17. In block 3305, sets of Hilbert transformed pressure approximation coefficients in temporal and spatial scales and sets of Hilbert transformed pressure wavelet coefficients in the temporal and spatial scales are computed based on the sets of Hilbert transformed pressure approximation coefficients in temporal scales and the sets of Hilbert transformed pressure wavelet coefficients in temporal scales computed in block 3304. In block 3306, the pressure energies are computed from the pressure approximation coefficients and the Hilbert transformed pressure approximation coefficients in the same temporal and spatial scales and the pressure energies are computed from pressure wavelet coefficients and Hilbert transformed pressure wavelet coefficients in the same temporal and spatial scales, as described above with reference to FIG. 18-20 and FIG. 23.

Figure 34:
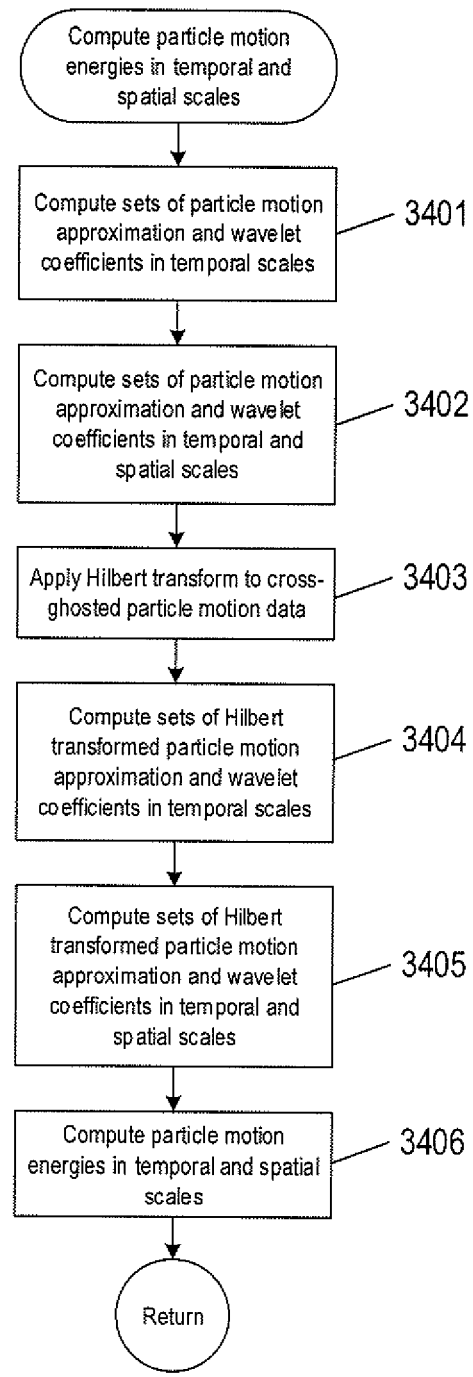
FIG. 34 shows a control-flow diagram of the routine "compute particle motion energies in temporal and spatial scales" called in FIG. 31.

FIG. 34 shows a control-flow diagram of the routine "compute particle motion energies in temporal and spatial scales" called in block 3103 of FIG. 31. In block 3401, a set of particle motion approximation coefficients in a temporal scale and sets of particle motion wavelet coefficients in temporal scales for each trace of the cross-ghosted particle motion data, as described above with reference to FIGS. 15-17. In block 3402, sets of particle motion approximation coefficients in temporal and spatial scales and sets of particle motion wavelet coefficients in temporal and spatial scales are computed based on the sets of particle motion approximation coefficients in temporal scales and sets of particle motion wavelet coefficients in the temporal scales computed in block 3401, as described above with reference to FIG. 18-20 and FIG. 22. In block 3403, a Hilbert transformation is applied to the cross-ghosted particle motion data to compute Hilbert transformed cross-ghosted particle motion data, as described above with reference to Equations (25) and (26). In block 3404, a set of Hilbert transformed particle motion approximation coefficients in a temporal scale and sets of Hilbert transformed particle motion wavelet coefficients in temporal scales are computed for each trace in the Hilbert transformed cross-ghosted particle motion data as described above with reference to FIGS. 15-17. In block 3405, sets of Hilbert transformed particle motion approximation coefficients in temporal and spatial scales and sets of Hilbert transformed particle motion wavelet coefficients in the temporal and spatial scales are computed based on the sets of Hilbert transformed particle motion approximation coefficients in temporal scales and the sets of Hilbert transformed particle motion wavelet coefficients in temporal scales computed in block 3404. In block 3406, the particle motion energies are computed from the particle motion approximation coefficients and the Hilbert transformed particle motion approximation coefficients in the same temporal and spatial scales and the particle motion energies are computed from particle motion wavelet coefficients and Hilbert transformed particle motion wavelet coefficients in the same temporal and spatial scales, as described above with reference to FIG. 18-20 and FIG. 24.

Figure 35:
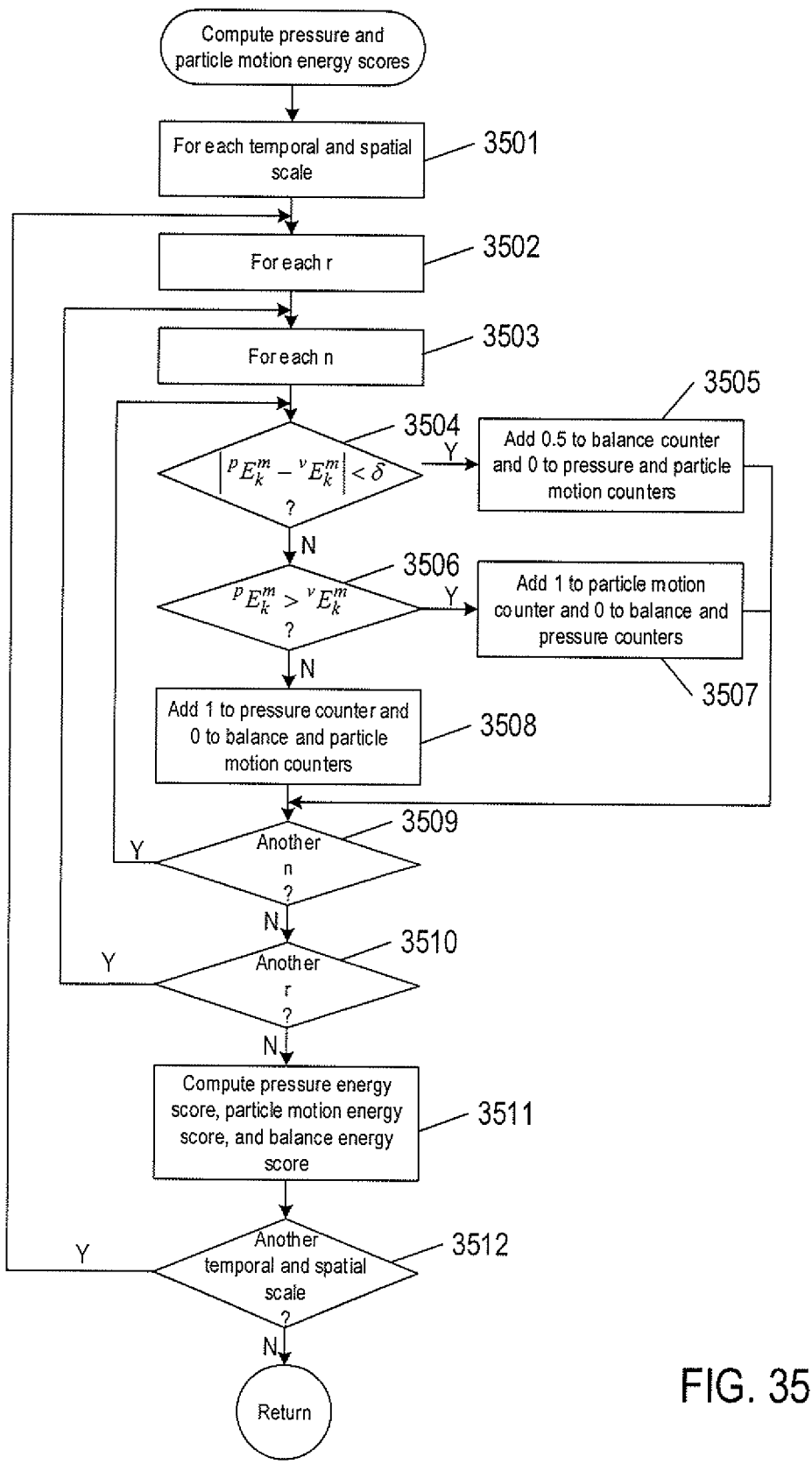
FIG. 35 shows a control-flow diagram of the routine "compute pressure and particle motion energy scores" called in FIG. 31.

FIG. 35 shows a control-flow diagram of the routine "compute pressure and particle motion energy scores" called in block 3105 of FIG. 31. A for-loop beginning in block 3501 repeats the operations of blocks 3502-3512 for each temporal and spatial scale. A for-loop beginning in block 3502 repeats the operations of blocks 3503-3510 for receiver indices r. A for-loop beginning in block 3503 repeats the operations of blocks 3504-3508 for time sample indices n. In decision block 3504, when the difference between the pressure and particle motion energies is small, as described above with reference to Equation (29a), control flows to block 3505, otherwise, control flows to decision block 3506. In block 3505, a value "0" is added to a pressure counter and a particle motion counter and a value "0.5" is added to a balance counter, as described above with reference to FIG. 27. In decision block 3506, when the pressure energy is greater than the particle motion energy, as described above with reference to Equation (29b), control flows to block 3507, otherwise, control flows to block 3508. In block 3507, a value "0" is added to the pressure counter and the balance counter, and a value "1" is added to the particle motion counter. In block 3508, a value "0" is added to the particle motion counter and the balance counter, and a value "1" is added to the pressure counter. In decision block 3509, the operations represented by blocks 3504-3508 are repeated for another index n, otherwise control flows to decision block 3510. In decision block 3510, the operations represented by blocks 3503-3509 are repeated for another index r, otherwise control flows to block 3511. In block 3511, pressure, particle motion and balance energy scores are computed as described above with reference to Equation (30). In decision block 3512, the operations represented by blocks 3502-3511 are repeated for another temporal and spatial scale.

Figure 36:
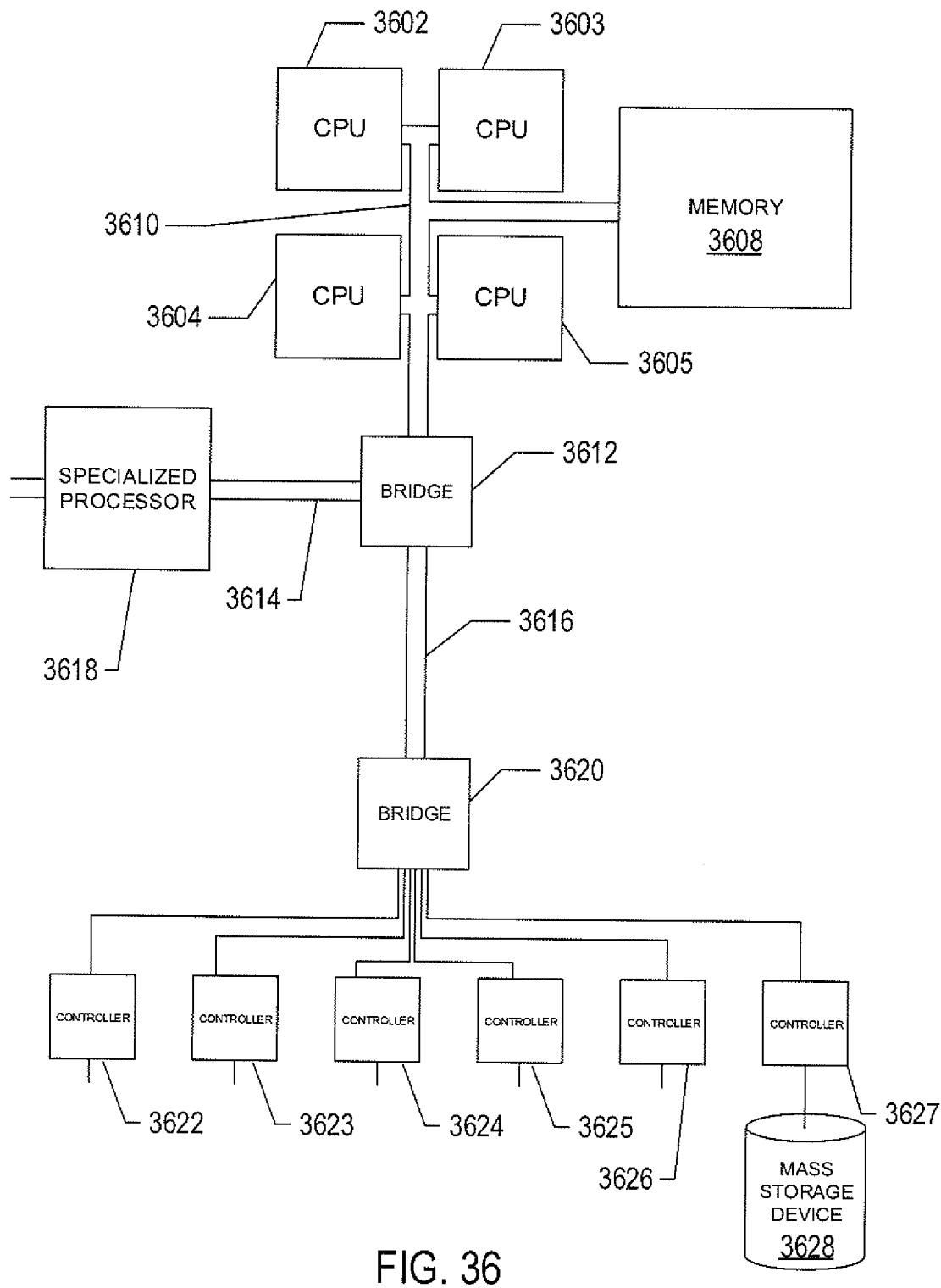
FIG. 36 shows an example of a computer system that executes efficient methods to evaluate noise content in seismic data collected during a marine survey.

FIG. 36 shows an example of a computer system that executes efficient methods to evaluate seismic data collected during a marine survey and therefore represents a geophysical-analysis data-processing system. The internal components of many small, mid-sized, and large computer systems as well as specialized processor-based storage systems can be described with respect to this generalized architecture, although each particular system may feature many additional components, subsystems, and similar, parallel systems with architectures similar to this generalized architecture. The computer system contains one or multiple central processing units ("CPUs") 3602-3605, one or more electronic memories 3608 interconnected with the CPUs by a CPU/memory-subsystem bus 3610 or multiple busses, a first bridge 3612 that interconnects the CPU/memory-subsystem bus 3610 with additional busses 3614 and 3616, or other types of high-speed interconnection media, including multiple, high-speed serial interconnects. The busses or serial interconnections, in turn, connect the CPUs and memory with specialized processors 3618, such as a graphics processor, and with one or more additional bridges 3620, which are interconnected with high-speed serial links or with multiple controllers 3622-3627, such as controller 3627, that provide access to various different types of computer-readable media, such as computer-readable medium 3628, electronic displays, input devices, and other such components, subcomponents, and computational resources. The electronic displays, including visual display screen, audio speakers, and other output interfaces, and the input devices, including mice, keyboards, touch screens, and other such input interfaces, together constitute input and output interfaces that allow the computer system to interact with human users. Computer-readable medium 3628 is a data-storage device, including electronic memory, optical or magnetic disk drive, USB drive, flash memory and other such data-storage device. The computer-readable medium 3628 can be used to store machine-readable instructions that encode the computational methods described above and can be used to store encoded data that includes the energy scores, during store operations, and from which encoded data can be retrieved, during read operations, by computer systems, data-storage systems, and peripheral devices.

The mathematical formulas and gathers presented above are not, in any way, intended to mean or suggest an abstract idea or concept. The mathematical formulas and mathematical descriptions are used as a concise way of symbolically describing specific computational operations that may be performed on seismic data obtained from actual measuring devices (i.e., pressure sensors and particle motion sensors) deployed to measure actual wavefields generated during a marine survey. In general, the field of seismic data processing uses mathematical formulas and mathematical descriptions as a concise way of symbolically describing and representing computational operations performed on seismic data to yield useful information about the earth's interior. The mathematical formulas and methods described above are ultimately implemented on physical computer hardware, data-storage devices, and communications systems in order to obtain results that also represent physical and concrete concepts of the earth's interior. For example, as explained above, an actual pressure wavefield emanating from an actual subterranean formation after being illuminated with a source wavefield is composed of actual physical pressure waves that are sampled using physical and concrete pressure and particle motion sensors. The pressure sensors in turn produce electrical or optical signals that encode pressure data and particle motion data that represents the pressure wavefield and is physically recorded on data-storage devices and undergoes computational processing using hardware as describe above. The particle motion sensors in turn produce electrical or optical signals that encode particle motion data that represents the particle motion wavefield and is physically recorded on data-storage devices and undergoes computational processing using hardware as describe above.

The methods and systems disclosed herein may form a geophysical data product indicative of certain properties of a subterranean formation. The geophysical data product may include geophysical data such as pressure data, particle motion data, cross-ghosted pressure data, cross-ghosted particle motion data, pressure approximation and wavelet coefficients, particle motion approximation and wavelet coefficients, pressure energies in temporal and spatial scales, particle motion energies in temporal and spatial scales, and pressure and particle motion energy scores in temporal and spatial scales. The pressure and particle motion data collected as result of changes to marine survey parameters as a result of evaluating pressure and particle motion energy scores also forms a geophysical data product. The geophysical data product may be stored on a non-transitory computer-readable medium as described above. The geophysical data product may be produced offshore (i.e., by equipment on the survey vessel 102) or onshore (i.e., by equipment at an onshore seismic data processing facility 708) either within the United States or in another country. When the geophysical data product is produced offshore or in another country, it may be imported onshore to a data-storage facility in the United States. Once onshore in the United States, geophysical analysis may be performed on the geophysical data product.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. In a process for reducing noise content in seismic data recorded in a marine survey of a subterranean formation, the specific improvement comprising:
    computing cross-ghosted pressure data and cross-ghosted particle motion data from recorded pressure data and particle motion data generated by corresponding pressure and particle motion sensors collocated in one or more streamers;
    computing pressure energies in temporal and spatial scales of a temporal and spatial scale domain based on the cross-ghosted pressure data;
    computing particle motion energies in the temporal and spatial scales based on the cross-ghosted particle motion data;
    computing pressure energy scores in the temporal and spatial scales based on the pressure energies;
    computing particle motion energy scores in the temporal and spatial scales based on the particle motion energies;
    comparing pressure energy scores and particle motion energy scores to determine noise content in the pressure data and the particle motion data; and
    adjusting parameters of the marine survey based on the noise content, thereby reducing noise content in recorded pressure and particle motion data obtained in the marine survey.

2. The process of claim 1, wherein computing cross-ghosted pressure data and cross-ghosted particle motion data comprises:
    transforming the pressure data from a space-time domain to a wavenumber-frequency domain;
    applying a particle motion sensor ghosting operator;
    applying an obliquity scaling factor to the pressure data to generate cross-ghost pressure data in the wavenumber-frequency domain;
    transforming the cross-ghost pressure data to the space-time domain;
    transforming the particle motion data from a space-time domain to a wavenumber-frequency domain;
    applying a pressure sensor ghosting operator to the particle motion data to generate cross-ghost particle motion data in the wavenumber-frequency domain; and
    transforming the cross-ghost particle motion data to the space-time domain.

3. The process of claim 1, wherein computing the pressure energies in the temporal and spatial scales comprises:
   computing a set of pressure approximation coefficients in a temporal scale and sets of pressure wavelet coefficients in temporal scales for each trace of the cross-ghosted pressure data;
   computing sets of pressure approximation coefficients in temporal and spatial scales and sets of pressure wavelet coefficients in temporal and spatial scales based on the sets of pressure approximation coefficients in temporal scales and sets of pressure wavelet coefficients in the temporal scales;
   applying a Hilbert transform to the cross-ghosted pressure data to generate Hilbert transformed cross-ghosted pressure data;
   computing a set of Hilbert transformed pressure approximation coefficients in a temporal scale and sets of Hilbert transformed pressure wavelet coefficients in temporal scales for each trace in the Hilbert transformed cross-ghosted pressure data;
   computing sets of Hilbert transformed pressure approximation coefficients in temporal and spatial scales and sets of Hilbert transformed pressure wavelet coefficients in the temporal and spatial scales based on the sets of Hilbert transformed pressure approximation coefficients in temporal scales and the sets of Hilbert transformed pressure wavelet coefficients in temporal scales; and
   computing the pressure energies from the pressure approximation coefficients and Hilbert transformed pressure approximation coefficients in the same temporal and spatial scales and the pressure energies from pressure wavelet coefficients and Hilbert transformed pressure wavelet coefficients in the same temporal and spatial scales.

4. The process of claim 1, wherein computing the particle motion energies in the temporal and spatial scales comprises:
   computing a set of particle motion approximation coefficients in a temporal scale and sets of particle motion wavelet coefficients in temporal scales for each trace of the cross-ghosted pressure data;
   computing sets of particle motion approximation coefficients in temporal and spatial scales and sets of particle motion wavelet coefficients in temporal and spatial scales based on the sets of pressure approximation in temporal scales and sets of pressure wavelet coefficients in the temporal scales;
   applying a Hilbert transform to the cross-ghosted particle motion data to generate Hilbert transformed cross-ghosted particle motion data;
   computing a set of Hilbert transformed particle motion approximation coefficients in a temporal scale and sets of Hilbert transformed particle motion wavelet coefficients in temporal scales for each trace in the Hilbert transformed cross-ghosted particle motion data;
   computing sets of Hilbert transformed particle motion approximation coefficients in temporal and spatial scales and sets of Hilbert transformed particle motion wavelet coefficients in the temporal and spatial scales based on the sets of Hilbert transformed particle motion approximation coefficients in temporal scales and the sets of Hilbert transformed particle motion wavelet coefficients in temporal scales; and
   computing the particle motion energies from the particle motion approximation coefficients and Hilbert transformed particle motion approximation coefficients in the same temporal and spatial scales and the particle motion energies from pressure wavelet coefficients and Hilbert transformed particle motion wavelet coefficients in the same temporal and spatial scales.

5. The process of claim 1, wherein computing pressure energy scores and particle motion energy scores comprises:
   for each temporal and spatial scale in the temporal and spatial scale domain,
      for each pressure energy and particle motion energy in the temporal and spatial scale,
         when the pressure energy is greater than the particle motion energy, incrementing a particle motion counter,
         when the pressure energy is less than the particle motion energy, incrementing a pressure counter, and
         when the pressure energy is approximately equal to the particle motion energy, incrementing a balance counter:
            averaging the particle motion counter to generate the particle motion energy score;
            averaging the pressure counter to generate the pressure energy score; and
            averaging the balance counter.

6. The process of claim 1, wherein comparing pressure energy and particle motion energy scores comprises:
   in one or more temporal and spatial scales of the temporal and spatial scale domain,
      when the pressure energy score is approximately equal to the particle motion energy score, reporting the pressure data and the vertical velocity data have about the same amount of noise over the frequency and wavenumber range associated with the temporal and spatial scale;
      when the pressure energy score is greater than the particle motion energy score, reporting the pressure data contains less noise than the vertical velocity data over the frequency and wavenumber range associated with the temporal and spatial scale; and
      when the pressure energy score is less than the particle motion energy score, reporting the pressure data contains more noise than the vertical velocity data over the frequency and wavenumber range associated with the temporal and spatial scale.

7. The process of claim 1, wherein comparing pressure energy scores comprises:
   in one or more temporal and spatial scales of the temporal and spatial scale domain,
      when the pressure energy score is greater than a pressure energy score of a previous shot record, reporting noise in the pressure data is decreasing; and
      when the pressure energy score is less than a pressure energy score of a previous shot record, reporting noise in the pressure data is increasing.

8. The process of claim 1, wherein comparing particle motion energy scores comprises:
   in one or more temporal and spatial scales of the temporal and spatial scale domain,
      when the particle motion energy score is greater than a particle motion energy score of a previous shot record, reporting noise in the particle motion data is decreasing; and
      when the particle motion energy score is less than a particle motion energy score of a previous shot record, reporting noise in the particle motion data is increasing.

9. The process of claim 1 wherein adjusting the parameters of the marine survey based on the noise content comprises performing one or more of:
discarding and re-acquiring seismic data when one of the pressure energy scores and particle motion energy scores falls below a threshold in one or more temporal and spatial scales for two or more consecutive shot records;
adjusting survey vessel speed to maintain a balance between pressure and particle motion energy cores in one or more temporal scales;
adjusting streamer depth when the balance between pressure and particle motion energy cores in one or more temporal scales moves to higher-frequency temporal scales associated with changes to the noise environment;
applying statistical noise attenuation to the pressure data when the pressure energy score decreases for two or more consecutive shot records; and
applying statistical noise attenuation to the particle motion data when the particle motion energy score decreases for two or more consecutive shot records.

10. A method to manufacture a geophysical data product, the method comprising:
activating a source above the subterranean formation to generate a source wavefield;
cross-ghosting pressure data and particle motion data generated by pressure and particle motion sensors collocated in one or more streamers in response to activating the source;
computing pressure energy scores and particle motion energy scores in temporal and spatial scales of a temporal and spatial scale domain based on the cross-ghosted pressure data and the cross-ghosted particle motion data;
comparing pressure energy scores and particle motion energy scores to determine noise content in the pressure data and the particle motion data;
adjusting marine survey parameters based on the noise content in the pressure and particle motion data; and
based on the adjusted marine survey parameters, recording pressure data and particle motion data in one or more non-transitory computer-readable media for each activation of a source, thereby creating the geophysical data product.

11. A computer system to evaluate noise content in seismic data recorded during a marine survey of a subterranean formation, the system comprising:
one or more processors;
one or more data-storage devices; and
machine-readable instructions stored in the one or more data-storage devices that when executed control the one or more processors to perform operations comprising:
computing cross-ghosted pressure data and cross-ghosted particle motion data from pressure data and particle motion data generated by pressure and particle motion sensors collocated in one or more streamers;
computing pressure energies in temporal and spatial scales of a temporal and spatial scale domain based on the cross-ghosted pressure data and particle motion energies in the temporal and spatial scales based on the cross-ghosted particle motion data;
computing pressure energy scores in the temporal and spatial scales based on the pressure energies and particle motion energy scores in the temporal and spatial scales based on the particle motion energies;
comparing pressure energy scores and particle motion energy scores to determine noise content in the pressure data and the particle motion data; and
recording pressure data and particle motion data in one or more non-transitory computer-readable media with parameters of the marine survey adjusted based on the noise content.

12. The system of claim 11, wherein computing cross-ghosted pressure data and cross-ghosted particle motion data comprises:
transforming the pressure data from a space-time domain to a wavenumber-frequency domain;
applying a particle motion sensor ghosting operator;
applying an obliquity scaling factor to the pressure data to generate cross-ghost pressure data in the wavenumber-frequency domain;
transforming the cross-ghost pressure data to the space-time domain;
transforming the particle motion data from a space-time domain to a wavenumber-frequency domain;
applying a pressure sensor ghosting operator to the particle motion data to generate cross-ghost particle motion data in the wavenumber-frequency domain; and
transforming the cross-ghost particle motion data to the space-time domain.

13. The system of claim 11, wherein computing the pressure energies in the temporal and spatial scales comprises:
computing a set of pressure approximation coefficients in a temporal scale and sets of pressure wavelet coefficients in temporal scales for each trace of the cross-ghosted pressure data;
computing sets of pressure approximation coefficients in temporal and spatial scales and sets of pressure wavelet coefficients in temporal and spatial scales based on the sets of pressure approximation in temporal scales and sets of pressure wavelet coefficients in the temporal scales;
applying a Hilbert transform to the cross-ghosted pressure data to generate Hilbert transformed cross-ghosted pressure data;
computing a set of Hilbert transformed pressure approximation coefficients in a temporal scale and sets of Hilbert transformed pressure wavelet coefficients in temporal scales for each trace in the Hilbert transformed cross-ghosted pressure data;
computing sets of Hilbert transformed pressure approximation coefficients in temporal and spatial scales and sets of Hilbert transformed pressure wavelet coefficients in the temporal and spatial scales based on the sets of Hilbert transformed pressure approximation coefficients in temporal scales and the sets of Hilbert transformed pressure wavelet coefficients in temporal scales; and
computing the pressure energies from the pressure approximation coefficients and Hilbert transformed pressure approximation coefficients in the same temporal and spatial scales and the pressure energies from pressure wavelet coefficients and Hilbert transformed pressure wavelet coefficients in the same temporal and spatial scales.

14. The system of claim 11, wherein computing the particle motion energies in the temporal and spatial scales comprises:
computing a set of particle motion approximation coefficients in a temporal scale and sets of particle motion wavelet coefficients in temporal scales for each trace of the cross-ghosted pressure data;

computing sets of particle motion approximation coefficients in temporal and spatial scales and sets of particle motion wavelet coefficients in temporal and spatial scales based on the sets of pressure approximation in temporal scales and sets of pressure wavelet coefficients in the temporal scales;

applying a Hilbert transform to the cross-ghosted particle motion data to generate Hilbert transformed cross-ghosted particle motion data;

computing a set of Hilbert transformed particle motion approximation coefficients in a temporal scale and sets of Hilbert transformed particle motion wavelet coefficients in temporal scales for each trace in the Hilbert transformed cross-ghosted particle motion data;

computing sets of Hilbert transformed particle motion approximation coefficients in temporal and spatial scales and sets of Hilbert transformed particle motion wavelet coefficients in the temporal and spatial scales based on the sets of Hilbert transformed particle motion approximation coefficients in temporal scales and the sets of Hilbert transformed particle motion wavelet coefficients in temporal scales; and computing the particle motion energies from the particle motion approximation coefficients and Hilbert transformed particle motion approximation coefficients in the same temporal and spatial scales and the particle motion energies from pressure wavelet coefficients and Hilbert transformed particle motion wavelet coefficients in the same temporal and spatial scales.

15. The system of claim 11, wherein computing pressure energy scores and particle motion energy scores comprises:
for each temporal and spatial scale in the temporal and spatial scale domain,
for each pressure energy and particle motion energy in the temporal and spatial scale,
when the pressure energy is greater than the particle motion energy, incrementing a particle motion counter,
when the pressure energy is less than the particle motion energy, incrementing a pressure counter;
averaging the particle motion counter to generate the particle motion energy score; and
averaging the pressure counter to generate the pressure energy score.

16. The system of claim 11, wherein comparing pressure energy and particle motion energy scores comprises:
in one or more temporal and spatial scales of the temporal and spatial scale domain,
when the pressure energy score is approximately equal to the particle motion energy score, reporting the pressure data and the vertical velocity data have about the same amount of noise over the frequency and wavenumber range associated with the temporal and spatial scale;
when the pressure energy score is greater than the particle motion energy score, reporting the pressure data contains less noise than the vertical velocity data over the frequency and wavenumber range associated with the temporal and spatial scale; and
when the pressure energy score is less than the particle motion energy score, reporting the pressure data contains more noise than the vertical velocity data over the frequency and wavenumber range associated with the temporal and spatial scale.

17. The system of claim 11, wherein comparing pressure energy scores comprises:
in one or more temporal and spatial scales of the temporal and spatial scale domain,
when the pressure energy score is greater than a pressure energy score of a previous shot record, reporting noise in the pressure data is decreasing; and
when the pressure energy score is less than a pressure energy score of a previous shot record, reporting noise in the pressure data is increasing.

18. The system of claim 11, wherein comparing particle motion energy scores comprises:
in one or more temporal and spatial scales of the temporal and spatial scale domain,
when the particle motion energy score is greater than a particle motion energy score of a previous shot record, reporting noise in the particle motion data is decreasing; and
when the particle motion energy score is less than a particle motion energy score of a previous shot record, reporting noise in the particle motion data is increasing.

19. The system of claim 11 wherein recording the pressure data and the particle motion data with parameters of the marine survey adjusted based on the noise content comprises performing one or more of:
discarding and re-acquiring seismic data when one of the pressure energy scores and particle motion energy scores falls below a threshold in one or more temporal and spatial scales for two or more consecutive shot records;
adjusting survey vessel speed to maintain a balance between pressure and particle motion energy cores in one or more temporal scales;
adjusting streamer depth when the balance between pressure and particle motion energy cores in one or more temporal scales moves to higher-frequency temporal scales associated with changes to the noise environment;
applying statistical noise attenuation to the pressure data when the pressure energy score decreases for two or more consecutive shot records; and
applying statistical noise attenuation to the particle motion data when the particle motion energy score decreases for two or more consecutive shot records.

20. A non-transitory computer-readable medium having machine-readable instructions encoded thereon for enabling one or more processors of a computer system to perform the operations comprising:
computing cross-ghosted pressure data and cross-ghosted particle motion data from pressure data and particle motion data generated by corresponding pressure and particle motion sensors recorded during a marine survey of a subterranean formation;
computing pressure energies in temporal and spatial scales of a temporal and spatial scale domain based on the cross-ghosted pressure data and particle motion energies in the temporal and spatial scales based on the cross-ghosted particle motion data;
computing pressure energy scores in the temporal and spatial scales based on the pressure energies and particle motion energy scores in the temporal and spatial scales based on the particle motion energies;
comparing pressure energy scores and particle motion energy scores to determine noise content in the pressure data and the particle motion data; and recording pressure data and particle motion data in one or more non-transitory computer-readable media with parameters of the marine survey adjusted based on the noise content.

21. The medium of claim 20, wherein computing cross-ghosted pressure data and cross-ghosted particle motion data comprises:
transforming the pressure data from a space-time domain to a wavenumber-frequency domain;
applying a particle motion sensor ghosting operator;
applying an obliquity scaling factor to the pressure data to generate cross-ghost pressure data in the wavenumber-frequency domain;
transforming the cross-ghost pressure data to the space-time domain;
transforming the particle motion data from a space-time domain to a wavenumber-frequency domain;
applying a pressure sensor ghosting operator to the particle motion data to generate cross-ghost particle motion data in the wavenumber-frequency domain; and
transforming the cross-ghost particle motion data to the space-time domain.

22. The medium of claim 20, wherein computing the pressure energies in the temporal and spatial scales comprises:
computing a set of pressure approximation coefficients in a temporal scale and sets of pressure wavelet coefficients in temporal scales for each trace of the cross-ghosted pressure data;
computing sets of pressure approximation coefficients in temporal and spatial scales and sets of pressure wavelet coefficients in temporal and spatial scales based on the sets of pressure approximation in temporal scales and sets of pressure wavelet coefficients in the temporal scales;
applying a Hilbert transform to the cross-ghosted pressure data to generate Hilbert transformed cross-ghosted pressure data;
computing a set of Hilbert transformed pressure approximation coefficients in a temporal scale and sets of Hilbert transformed pressure wavelet coefficients in temporal scales for each trace in the Hilbert transformed cross-ghosted pressure data;
computing sets of Hilbert transformed pressure approximation coefficients in temporal and spatial scales and sets of Hilbert transformed pressure wavelet coefficients in the temporal and spatial scales based on the sets of Hilbert transformed pressure approximation coefficients in temporal scales and the sets of Hilbert transformed pressure wavelet coefficients in temporal scales; and
computing the pressure energies from the pressure approximation coefficients and Hilbert transformed pressure approximation coefficients in the same temporal and spatial scales and the pressure energies from pressure wavelet coefficients and Hilbert transformed pressure wavelet coefficients in the same temporal and spatial scales.

23. The medium of claim 20, wherein computing the particle motion energies in the temporal and spatial scales comprises:
computing a set of particle motion approximation coefficients in a temporal scale and sets of particle motion wavelet coefficients in temporal scales for each trace of the cross-ghosted pressure data;
computing sets of particle motion approximation coefficients in temporal and spatial scales and sets of particle motion wavelet coefficients in temporal and spatial scales based on the sets of pressure approximation in temporal scales and sets of pressure wavelet coefficients in the temporal scales;
applying a Hilbert transform to the cross-ghosted particle motion data to generate Hilbert transformed cross-ghosted particle motion data;
computing a set of Hilbert transformed particle motion approximation coefficients in a temporal scale and sets of Hilbert transformed particle motion wavelet coefficients in temporal scales for each trace in the Hilbert transformed cross-ghosted particle motion data;
computing sets of Hilbert transformed particle motion approximation coefficients in temporal and spatial scales and sets of Hilbert transformed particle motion wavelet coefficients in the temporal and spatial scales based on the sets of Hilbert transformed particle motion approximation coefficients in temporal scales and the sets of Hilbert transformed particle motion wavelet coefficients in temporal scales; and
computing the particle motion energies from the particle motion approximation coefficients and Hilbert transformed particle motion approximation coefficients in the same temporal and spatial scales and the particle motion energies from pressure wavelet coefficients and Hilbert transformed particle motion wavelet coefficients in the same temporal and spatial scales.

24. The medium of claim 20, wherein computing pressure energy scores and particle motion energy scores comprises:
for each temporal and spatial scale in the temporal and spatial scale domain,
for each pressure energy and particle motion energy in the temporal and spatial scale,
when the pressure energy is greater than the particle motion energy, incrementing a particle motion counter,
when the pressure energy is less than the particle motion energy, incrementing a pressure counter;
averaging the particle motion counter to generate the particle motion energy score; and
averaging the pressure counter to generate the pressure energy score.

25. The medium of claim 20, wherein comparing pressure energy and particle motion energy scores comprises:
in one or more temporal and spatial scales of the temporal and spatial scale domain,
when the pressure energy score is approximately equal to the particle motion energy score, reporting the pressure data and the vertical velocity data have about the same amount of noise over the frequency and wavenumber range associated with the temporal and spatial scale;
when the pressure energy score is greater than the particle motion energy score, reporting the pressure data contains less noise than the vertical velocity data over the frequency and wavenumber range associated with the temporal and spatial scale; and
when the pressure energy score is less than the particle motion energy score, reporting the pressure data contains more noise than the vertical velocity data over the frequency and wavenumber range associated with the temporal and spatial scale.

26. The medium of claim 20, wherein comparing pressure energy scores comprises:
in one or more temporal and spatial scales of the temporal and spatial scale domain, when the pressure energy score is greater than a pressure energy score of a previous shot record, reporting noise in the pressure data is decreasing; and when the pressure energy score is less than a pressure energy score of a previous shot record, reporting noise in the pressure data is increasing.

27. The medium of claim 20, wherein comparing particle motion energy scores comprises:

in one or more temporal and spatial scales of the temporal and spatial scale domain, when the particle motion energy score is greater than a particle motion energy score of a previous shot record, reporting noise in the particle motion data is decreasing; and when the particle motion energy score is less than a particle motion energy score of a previous shot record, reporting noise in the particle motion data is increasing.

28. The medium of claim 20 wherein recording the pressure data and the particle motion data with parameters of the marine survey adjusted based on the noise content comprises performing one or more of:

discarding and re-acquiring seismic data when one of the pressure energy scores and particle motion energy scores falls below a threshold in one or more temporal and spatial scales for two or more consecutive shot records;

adjusting survey vessel speed to maintain a balance between pressure and particle motion energy cores in one or more temporal scales;

adjusting streamer depth when the balance between pressure and particle motion energy cores in one or more temporal scales moves to higher-frequency temporal scales associated with changes to the noise environment;

applying statistical noise attenuation to the pressure data when the pressure energy score decreases for two or more consecutive shot records; and applying statistical noise attenuation to the particle motion data when the particle motion energy score decreases for two or more consecutive shot records.

* * * * *